US012711703B2

(12) United States Patent
Mazumdar et al.

(10) Patent No.: US 12,711,703 B2
(45) Date of Patent: Aug. 18, 2026

(54) TECHNIQUES FOR SELECTION AND INCLUSION OF VIRTUAL ASSETS IN A VIRTUAL SCENE

(71) Applicant: NVIDIA Corporation, Santa Clara, CA (US)

(72) Inventors: Amrita Mazumdar, San Francisco, CA (US); James Allan Douglas Cameron, Fredericton (CA); Konstantin I. Shkurko, Yardley, PA (US); Ruthie D. Lyle, Durham, NC (US); Pratyush Mahapatra, San Bruno, CA (US)

(73) Assignee: NVIDIA Corporation, Santa Clara, CA (US)

(*) Notice: Subject to any disclaimer, the term of this patent is extended or adjusted under 35 U.S.C. 154(b) by 94 days.

(21) Appl. No.: 18/532,890

(22) Filed: Dec. 7, 2023

(65) Prior Publication Data

US 2025/0191287 A1 Jun. 12, 2025

(51) Int. Cl.
*G06T 17/00* (2006.01)
*G06T 13/20* (2011.01)

(52) U.S. Cl.
CPC .............. *G06T 17/00* (2013.01); *G06T 13/20* (2013.01)

(58) Field of Classification Search
CPC ................................ G06T 17/00; G06T 13/20
See application file for complete search history.

(56) References Cited

U.S. PATENT DOCUMENTS

2008/0176658 A1* 7/2008 Wright .................... A63F 13/10 463/42
2009/0253517 A1* 10/2009 Bererton ................. A63F 13/71 463/43
2017/0236055 A1* 8/2017 Lin ........................ G06N 3/047 706/20
2017/0371935 A1* 12/2017 Nguyen ................ G06F 16/287
2019/0317974 A1* 10/2019 Chamberlin ............ G06F 16/29

OTHER PUBLICATIONS

Savva et al. (NPL)—SceneSuggest: Context-driven 3D Scene Design (Year: 2017).*

(Continued)

*Primary Examiner* — Daniel F Hajnik
*Assistant Examiner* — Adeel Bashir
(74) *Attorney, Agent, or Firm* — Lowenstein Sandler LLP

(57) ABSTRACT

A request is received for a virtual asset of a virtual asset data store for inclusion in a virtual scene. The request includes first characteristic data including characteristics associated with the requested virtual asset. One or more virtual assets of the virtual asset data store are associated with tags obtained from an output of an artificial intelligence (AI) model. Tags are obtained for the requested virtual asset based on the first characteristic data and second characteristic data associated with an additional virtual asset of the virtual scene. A determination is made, based on tags for virtual assets of the virtual data store, of whether the virtual asset data store identifies a virtual asset that satisfies criteria with respect to the obtained tags for the requested asset. Upon determining that the criteria are satisfied, the virtual asset is provided for inclusion in the virtual scene in accordance with the request.

20 Claims, 20 Drawing Sheets

(56) References Cited

OTHER PUBLICATIONS

Adobe Experience Manager Assets (NPL)—Adobe Experience Manager Assets Product Overview (Year: 2019).*
Lin et al. (NPL)—Magic3D: High-Resolution Text-to-3D Content Creation (Year: 2022).*
Qi et al. (NPL)—PointNet: Deep Learning on Point Sets for 3D Classification and Segmentation (Year: 2017).*
Corey Goldfeder et al.,"Autotagging to Improve Text Search for 3D Models", https://www.researchgate.net/publication/4344534_Autotagging_to_improve_text_search_for_3D_models, Jul. 2008, pp. 355-358.

* cited by examiner

PLATFORM 120

APPLICATION 122

ASSET ENGINE 132

SERVER MACHINE(S) 130

ASSET ENGINE 132

NETWORK 104

CLIENT DEVICE 102N

CLIENT DEVICE 102A

PREDICTIVE SYSTEM(S) 180

ASSET GENERATION ENGINE 184

ASSET TAGGING ENGINE 182

DATA STORE 110

400

TECHNIQUES FOR SELECTION AND INCLUSION OF VIRTUAL ASSETS IN A VIRTUAL SCENE

TECHNICAL FIELD

At least one embodiment pertains to techniques for selection and inclusion of virtual assets in a virtual scene. At least one embodiment pertains generally to obtaining tags for a virtual asset to be included in a virtual scene based on characteristic data for the asset.

BACKGROUND

Designers and developers of virtual scenes or virtual environments (e.g., video game environments, animated motion picture environments, etc.) utilize three-dimensional (3D) animation techniques to create immersive and visually captivating experiences for users accessing the virtual scenes or environments. Assets (e.g., characters, objects, design elements, etc.) in these virtual scenes can be significantly complex and detailed and therefore, it can be time consuming for a designer or developer to create and animate each object of a virtual scene. Other designers or developers may have designed a virtual asset that is suitable for inclusion in the virtual scene or virtual environment (e.g., the virtual asset has the same or similar style as the objects in the virtual scene, etc.). However, it can be difficult for designers or developers to identify or otherwise access virtual assets designed by other designers or developers that are suitable for the virtual scene or environment they are creating.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EMBODIMENTS

Figure 1:
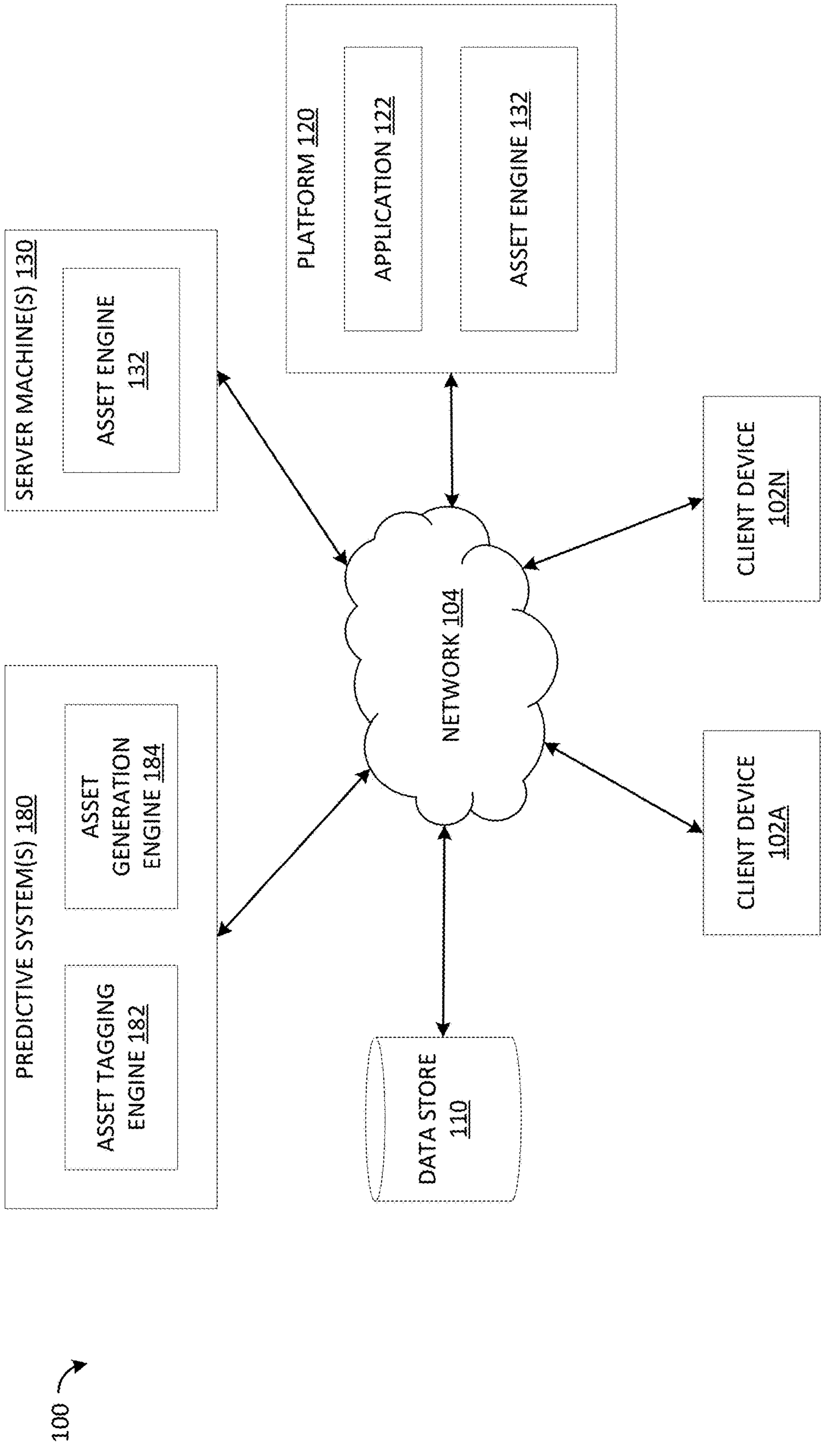
FIG. 1 depicts an illustrative computer system architecture, according to at least one embodiment.

Embodiments of the present disclosure relate to techniques for selection and inclusion of virtual assets in a virtual scene. An online platform can provide users with tools to design and/or develop assets (e.g., three-dimensional (3D) assets) in a virtual scene or a virtual environment. A virtual asset can include a character, a virtual object, a design element, and so forth, that is included in a virtual scene or a virtual environment. Some assets can be complex and/or can involve a high level of detail. For example, a character or object for inclusion in a video game environment can have several clothing items, accessories, gear, etc. that are unique to the character or object (e.g., distinct from clothing items, accessories, gear, etc. of other characters or objects). In some instances, each character and/or object in the virtual environment can have its own unique clothing items, accessories, gear, etc. that each have a high level of complexity or detail. Further, each object in the virtual scene can be developed according to a common style or design for that virtual scene. For example, a virtual scene of an interior of a home can have a mid-century modern interior design style or a minimalist interior design style. Accordingly, a designer or developer can create each object in the virtual scene (and/or design each detail of each object) to correspond to the mid-century modern interior design style or the minimalist interior design style.

In view of the above, it can take a designer or developer a significant amount of time (e.g., weeks, months, years, etc.) to create and animate each virtual asset (e.g., character or object, and the clothing items, accessories, gear, etc. associated with each character or object in a virtual environment). In some instances, 3D graphics design and development tools can consume a significant amount of computing resources (e.g., memory resources, processing resources, etc.) of a system. The larger the amount of time to create and animate a virtual asset (e.g., a character or object and the associated clothing items, accessories, gear, etc.), the larger amount of computing resources are consumed in the system.

Such computing resources are unavailable to other processes of the system, which can increase an overall latency and decrease an overall efficiency of the system.

In some instances, users may create and/or modify objects in virtual scenes that have the same or a similar style to other virtual scenes designed or developed by other users. For example, a user may create/modify a virtual piece of furniture (e.g., a virtual couch, a virtual dresser, etc.) having a mid-century modern interior design style. Another user may create another virtual scene that includes objects having the mid-century modern interior design style and may wish to include a piece of furniture having the design style in their virtual environment. Some platforms enable users to share virtual assets with other users for inclusion in their virtual scenes. For example, some platforms enable a user to provide a virtual asset created by the user for inclusion in a database (or other such data structure) that is searchable by other users. The user can provide asset tags with the virtual asset, which indicate characteristics of the virtual asset. For example, the user that created/modified the virtual asset of the piece of furniture having the mid-century modern design style can provide, with the virtual asset, a tag of "furniture," mid-century modern design style," and so forth for inclusion with the virtual asset in the database. Another user can search the database (e.g., using a search interface for the database via a client device of the user) to identify assets of the database that they want to include in their virtual scene. For example, the user that wishes to include a piece of furniture having the mid-century modern design style can search for virtual assets that have a tag of "furniture," mid-century modern design style," and so forth. If a virtual asset having such tags is identified based on the search, the platform can provide a model file for the virtual asset to the client device of the user and the client device can update the virtual scene to include the virtual asset based on the provided model file.

As indicated above, virtual assets can have a high level of complexity and detail. Accordingly, it can be difficult for a creator of the virtual assets to assign appropriate tags to the virtual assets that accurately and clearly indicate the characteristics of the virtual asset. It is similarly difficult for a user that is searching for assets to determine the particular characteristics of the virtual asset that they wish to search for (e.g., in view of the virtual scene they are creating) in the database and determine appropriate search tags that correspond to such characteristics. In some instances, tags referenced by user searches may be overly broad and may not adequately represent the characteristics of the virtual asset that the user is searching for. For example, a user may be unaware that a design style for their virtual scene is a mid-century modern design style and accordingly, may search the database for virtual assets having the tag of "furniture" or "couch." Such search may identify a significantly large number of virtual assets having such tag, many of which do not fit the design style for the user's scene. The user may spend a significant amount of time reviewing the virtual assets identified by the search to identify an appropriate virtual asset for their scene, which may never be identified. In such instances, the user may create/modify the asset themselves (e.g., using the tools/resources provided by the platform to the user's client device), which, as indicated above, can consume a large amount of computing resources. In another example, a user that has created virtual asset may not assign tags to the virtual asset that accurately and clearly convey the asset's characteristics (e.g., the user may only assign a tag of "furniture" to the virtual asset). Accordingly, another user that is searching for the virtual asset using the database may never identify the appropriate asset due to the mis-tagging by the asset's creator.

Embodiments of the present disclosure address the above and other deficiencies by providing techniques for selection and inclusion of virtual assets in a virtual scene. A user of a platform can provide input to create and/or modify a virtual asset (e.g., a character, a virtual object, a design element, etc.) using tools and resources provided via an application (or application instance) of the platform. In an illustrative example, the user can request to create/modify a virtual asset corresponding to a couch having a mid-century modern design style. The virtual asset can be included in a virtual scene that includes other objects having the mid-century modern design style. In some embodiments, the user can identify the virtual asset for inclusion in a virtual asset data store of the platform (e.g., by providing a model file for the virtual asset and/or the virtual scene to the platform via a network). The platform can determine one or more characteristics associated with the virtual asset and/or the virtual scene. In an illustrative example, the platform can provide the model file (or other data associated with the virtual asset and/or the virtual scene) as input to an asset characterization model that is trained to predict characterization data for a virtual asset. In another example, the platform can analyze features of the virtual asset based on rules provided by a developer or engineer of the platform to determine the characteristics associated with the virtual asset and/or the virtual scene.

Upon determining the one or more characteristics associated with the virtual asset and/or the virtual scene, the platform can obtain a set of tags associated with the virtual asset. In some embodiments, the platform can provide characteristic data (e.g., indicating the determined one or more characteristics) as input to an artificial intelligence (AI) model (also referred to herein as an asset tagging model) that is trained to predict one or more tags for a virtual asset based on given characteristic data. The platform can obtain the set of tags based on one or more outputs of the AI model, in some embodiments. According to the above provided illustrative example, the set of tags for the virtual asset can include "furniture," "couch," "mid-century," "mid-century modern," and so forth. Upon obtaining the set of tags, the platform can update the virtual asset data structure to include a mapping between the set of tags and the virtual asset. In some embodiments, one or more of the set of tags can include articulation data associated with the virtual asset. The articulation data can indicate a stationary state and/or a dynamic state of a real-world object corresponding to the virtual asset, in some embodiments. Further details regarding articulation data for a virtual asset are provided herein.

The platform may receive a request for one or more virtual assets of a virtual data store for inclusion in a virtual scene. In some embodiments, the request can indicate one or more characteristics associated with the requested virtual asset. For example, the request can indicate that the requested virtual asset is a couch for inclusion in a virtual scene created by another user. The platform can obtain additional characteristic data associated with other virtual assets in the virtual scene. For example, the platform can determine, according to previously described illustrative example, that a virtual bookshelf or a virtual coffee table in the virtual scene has a mid-century modern design style. Accordingly, the additional characteristic data can indicate a mid-century modern design style.

The platform can obtain a set of tags for the requested virtual asset based on the characteristic data of the request and/or the obtained characteristic data associated with other virtual assets in the virtual scene. In some embodiments, the platform can provide the characteristic data of the request and the obtained characteristic data as input to the AI model that is trained to predict asset tags based on given characteristic data. The platform can obtain the set of tags based on one or more outputs of the AI model. According to the previously described illustrative example, the asset tags obtained for the requested virtual asset can include "furniture," "couch," "mid-century," mid-century modern," etc. The platform can parse entries of the virtual asset data store to determine whether the data store identifies a virtual asset that satisfies one or more criteria with respect to the obtained tags for the requested virtual asset. The one or more criteria can be satisfied if a degree of similarity between the set of tags associated with a virtual asset of the data store and the obtained tags for the requested virtual asset exceeds a similarity threshold, in some embodiments.

If the platform determines that the criteria are satisfied with respect to a virtual asset of the virtual asset data store, the platform can provide the virtual asset for inclusion in the virtual scene in accordance with the request. For example, the platform can determine that tags for the couch having the mid-century modern design style satisfy the one or more criteria with respect to the tags obtained for the requested virtual asset and accordingly can provide the model file for the couch to the requesting client device for inclusion in the virtual scene. If the platform determines that the data store does not identify a virtual asset that satisfies the one or more criteria, the platform can provide the characteristic data of the request and/or the characteristic data obtained for the virtual scene to an asset generation. The asset generation engine may generate the virtual asset (e.g., based on a generative AI model) and the platform can provide the generated virtual asset to for inclusion in the scene, in accordance with the request. In some embodiments, the asset generation engine can generate the virtual asset based on the articulation data associated with the virtual asset, as described herein.

Aspects and embodiments of the present disclosure provide techniques to enable virtual asset creators to make their virtual assets available to a larger number of users and to enable virtual asset searchers to access virtual assets that match the design style of the virtual scene they are creating. As indicated above, the asset tagging model can be trained to predict tags for a virtual asset based on given characteristic data for the virtual asset and/or other virtual assets included in a virtual scene. Accordingly, a virtual asset creator that wishes to make their virtual assets available to users of a platform does not spend a significant amount of time concocting asset tags for the virtual asset. Further, the asset tags that are obtained for a virtual asset based on output(s) of the asset tagging model can accurately and clearly convey the characteristics of the virtual asset and/or a virtual scene that includes the virtual asset. Therefore users searching for the virtual asset (e.g., using the search functionality offered by the platform) can more easily identify the virtual asset for inclusion in their virtual scenes, as described above. In view of the above, embodiments of the present disclosure reduce the amount of time, and therefore the amount of computing resources (e.g., processing cycles, memory space, etc.), consumed for a virtual asset creator to provide a virtual asset for inclusion in a virtual asset data structure, and such computing resources are available to other processes at a client device of the creator and/or the overall system. The availability of computing resources at the client device and/or the overall system increases an overall efficiency of the system and decreases an overall latency of the system.

Further, embodiments of the present disclosure enable users to more quickly and effectively identify virtual assets that are created by other users for inclusion in their virtual scenes. As described above, a user can provide a minimal description of the virtual asset they are searching for (e.g., using the search functionality offered by the platform) and the platform can identify tags that accurately and appropriately describe the characteristics of the virtual asset based on the user-provided description and characteristics of other virtual assets in the virtual scene. Accordingly, the user spends less time concocting search terms for the virtual asset. Further, as the asset tags predicted by the asset tagging model can accurately and appropriately describe the characteristics of the virtual asset, the platform can more quickly and effectively identify an asset that corresponds to the asset tags being searched. If the platform is unable to identify an asset that corresponds to the asset tags being searched, the platform can generate the asset (e.g., using a generative AI model) and provide the asset to the user, preventing the user from spending time designing or developing the virtual asset themselves. In view of the above, embodiments of the present disclosure reduce the overall time spent for designing/developing the virtual scene and therefore the number of computing resources consumed by the client device of the user and/or the overall system is reduced. The reduced resource consumption can further increase the overall efficiency and decrease the overall latency of the system, as described above.

The systems and methods described herein may be used for a variety of purposes, by way of example and without limitation, these purposes may include systems or applications for online multiplayer gaming, machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray tracing, path tracing, etc.), collaborative content creation for 3D assets, digital twin systems, cloud computing and/or any other suitable applications.

Disclosed embodiments may be comprised in a variety of different systems such as systems for participating on online gaming, automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for generating or maintaining digital twin representations of physical objects, systems implemented at least partially using cloud computing resources, and/or other types of systems.

FIG. 1 depicts an illustrative computer system architecture, according to aspects of the present disclosure. The system architecture 100 (also referred to as "system" herein) includes one or more client devices 102, a data store 110, a platform 120, one or more server machines 130, and/or a predictive system 180, each connected to a network 104. In implementations, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. Data store 110 can be hosted by one or more storage devices, such as main memory, magnetic or optical storage based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by platform 120 or one or more different machines coupled to the platform 120 via network 104. In some embodiments, data store 110 can be or otherwise include a virtual asset data store that stores mappings between virtual assets (e.g., characters, 3D objects, design elements, etc.) and asset tags determined for the virtual assets, in accordance with embodiments described herein.

Client device(s) 102 (collectively and individually referred to herein as client device 102) refers to any device (or software that executes using a device) that requests access to data and/or a service provided by a computing service (e.g., platform 120). In some embodiments, client device 102 may include computing devices such as personal computers (PCs), laptops, mobile phones, smart phones, tablet computers, netbook computers, network-connected televisions, etc. In other or similar embodiments, client devices 102 can include or be connected to a virtual reality (VR) device (e.g., a VR headset) that is configured to provide a VR experience to a user of platform 120 and/or platform 140. The VR device can be a monolithic VR device (e.g., a VR headset that includes a dedicated processor and/or power source) or another type of VR device, in some embodiments. In some implementations, client devices 102A-N may also be referred to as "user devices." Client device 102 may include a content viewer. In some implementations, a content viewer may be an application that provides a user interface (UI) for users to view or upload content, such as images, video items, web pages, documents, etc. For example, the content viewer may be a web browser that can access, retrieve, present, and/or navigate content (e.g., web pages such as Hyper Text Markup Language (HTML) pages, digital media items, etc.) served by a web server. The content viewer may render, display, and/or present the content to a user. The content viewer may also include an embedded media player (e.g., a Flash® player or an HTML5 player) that is embedded in a web page (e.g., a web page that may provide information about a product sold by an online merchant). In another example, the content viewer may be a standalone application (e.g., a mobile application or app) that allows users to view digital media items (e.g., digital video items, digital images, electronic books, etc.).

In some embodiments, platform 120 can provide users (e.g., of client devices 102) with access to one or more applications 122. In some embodiments, users of platform 120 can access the features and functionalities of application 122 via an application instance running using a client device 102. An application instance refers to a collection or grouping of resources used to execute features and functionalities of application 122 via client device 102. In an illustrative example, an application instance can include a portion or segment of instructions (e.g., code) associated with application 122 that is executed by computing resources of client device 102 to provide a user with access to the features or functionalities of application 122. Multiple client devices 102 can execute the instructions to provide respective users with access to the application 122 (e.g., simultaneously). Each instance of application 122 provided via a client device 102 can be isolated from other application instances provided via other client devices, in some embodiments.

In some embodiments, application 122 can enable the users to access, create, modify, etc. a virtual scene or virtual environment. A virtual scene or virtual environment, as described herein, refers to a simulated or digital representation of a configuration of virtual assets (e.g., characters, objects, design elements, etc.). In some embodiments, platform 120 can be or can otherwise correspond to a 3D graphs collaboration platform, such as the Omniverse™ Platform by NVIDIA Corporation. Application 122 can, in come embodiments, provide users with access to tools or resources that enable the users to create or modify a virtual scene. In some embodiments, the tools or resources can include virtual asset design or development tools, graphics rendering resources, and so forth. A user can access the tools or resources via an instance of application 122 running via a respective client device 102 to create and/or modify virtual assets in the virtual scene. In an illustrative example, a virtual scene or virtual environment can include a video game scene that includes one or more virtual assets including characters, objects, design elements, etc. The user can engage with tools or resources of application 122 to add/remove virtual assets from the virtual scene, modify an appearance of virtual assets of the virtual scene, and so forth. It should be noted that some embodiments and examples of the present disclosure refer to the virtual scene including a video game environment. However, embodiments of the present disclosure can be applied to any kind of virtual scene and/or any kind of virtual asset, as described herein.

In some embodiments, platform 120 can maintain or otherwise have access to a virtual asset data store that includes one or more virtual assets created and/or modified by users of application 122, as described above. The virtual asset data store can reside at data store 110 and/or at any region of memory of or connected to system 100, in some embodiments. In some embodiments, a virtual asset included in the virtual asset data store can be associated with one or more asset tags that indicate characteristics (e.g., visual characteristics, design characteristics, etc.) of the virtual asset. Further details regarding asset tags associated with virtual assets are provided herein. In some embodiments, the virtual asset data store can store data associated with a virtual asset (e.g., a model file for rendering the virtual asset), one or more asset tags, and/or a mapping between the one or more asset tags and the data associated with the virtual asset.

As illustrated in FIG. 1, platform 120 can include an asset engine 132 that facilitates user access to virtual assets of the virtual asset data store. A user that creates/modifies a virtual asset for a virtual scene can provide the virtual asset for inclusion in the virtual asset data store. Asset engine 132 can obtain one or more tags for the virtual asset (e.g., from asset tagging engine 182 of predictive system 180) and can update the virtual asset data store to include the virtual asset, the obtained one or more tags, and/or a mapping between the virtual asset and the one or more tags (simply referred to herein as the "mapping). In some embodiments, a user can create/modify a virtual asset for a virtual scene using tools and resources of application 122, as described above. The user can provide a notification to client device 102 (e.g., via a user interface (UI) element for a UI for application 122) that the virtual asset is to be included in the virtual asset data store. Upon receiving the notification, the client device 102 can forward the notification to platform 120. Asset engine 132 can obtain data associated with the virtual asset (e.g., a model file), which can include or otherwise indicate one or more characteristics pertaining to the virtual asset. Such data is referred to as characteristic data herein. In some embodiments, asset engine 132 can additionally or alternatively obtain data associated with other virtual assets included in the virtual scene and can determine characteristic data pertaining to the other virtual assets, as described herein.

Asset engine 132 can provide the characteristic data obtained for the virtual asset to be added to the data store and/or the other visual assets of the virtual scene to asset tagging engine 182 (e.g., via network 104). Asset tagging engine 182 can determine one or more asset tags that indicate the characteristics of the virtual asset, as described herein. In some embodiments, asset tagging engine 182 can determine the one or more asset tags based on one or more outputs of an AI model (e.g., a machine learning model) that is trained to predict asset tags based on given characteristic data. Such model is referred to as an asset tagging model herein and is described in further details herein.

Upon obtaining the asset tags from asset tagging engine 182, asset engine 132 can generate a mapping (e.g., a pointer) between the virtual asset and the obtained tags and can store the mapping at the virtual asset data store. In some embodiments, asset engine 132 can store a model file (or a portion of a model file) associated with the virtual asset in the virtual asset data store with the mapping. In an illustrative example, a user can create/modify a virtual piece of furniture (e.g., a couch) of a virtual scene having a mid-century modern interior design style. The user can provide the virtual piece of furniture to platform 120 for inclusion in the virtual asset data store, as described above. Asset engine 132 can obtain characteristic data for the virtual piece of furniture and/or other virtual assets in the virtual scene, in accordance with embodiments described below with respect to FIG. 2, and can provide the characteristic data to asset tagging engine 182. Asset tagging engine 182 can determine tag(s) for the virtual piece of furniture, which can include "furniture," "couch," "mid-century," "mid-century modern," and so forth. Asset engine 132 can generate a mapping between a model file for the virtual piece of furniture (or a portion of a model file for the virtual scene corresponding to the virtual piece of furniture) and can update the virtual asset data store to include the mapping, as described herein.

Asset engine 132 can enable users of application 122 to access virtual assets included in a virtual asset data store for inclusion in a virtual scene. In some embodiments, a user that is designing/developing a virtual scene can initiate a request to search for a virtual asset (e.g., by engaging with a UI element of a UI for the application 122). The user can provide information that indicates one or more characteristics of the virtual asset that the user is searching for via the UI. Such user-provided information can correspond to characteristic data for the requested virtual asset. A client device 102 of the requesting user can provide the characteristic data to platform 120 (e.g., via network 104). In some embodiments, asset engine 132 can obtain characteristic data for other virtual assets of the virtual scene, in accordance with embodiments described below. Asset engine 132 can provide the characteristic data for the requested virtual asset and/or the other virtual assets to asset tagging engine 182 and asset tagging engine 182 can determine tags for the virtual asset based on the characteristic data, as described herein.

Asset engine 132 can obtain the asset tags for the requested virtual asset from asset tagging engine 182 and can determine whether the virtual asset data store includes virtual assets having tags that correspond to the obtained asset tags. In some embodiments, asset engine 132 can parse entries of the virtual asset data store to identify an entry that includes asset tags that correspond (e.g., match or substantially match) the asset tags for the requested virtual asset. If an entry includes asset tags that correspond to the asset tags for the requested virtual asset, asset engine 132 can extract data associated with the virtual asset (e.g., a model file, a portion of a model file, etc.) from the entry and can provide the extracted data to the client device 102 associated with the requesting user. In some embodiments, the client device 102 can render the virtual asset for presentation via the UI of the client device 102 (e.g., by executing the model file or the portion of the model file). By rendering the virtual asset, the virtual asset can be included in the virtual scene. The user can engage with one or more UI elements of the client device 102 to modify the rendered virtual asset (e.g., move the virtual asset, resize or reshape the virtual asset, etc.) in the virtual scene, according to the functionality of application 122.

In an illustrative example, a user can provide a request for a virtual piece of furniture (e.g., a couch) having a mid-century modern interior design style for inclusion in a virtual scene, as described herein. The client device 102 of the user can provide characteristic data of the request (e.g., "virtual piece of furniture," "mid-century modern design," etc.) to platform 120 and asset engine 132 can obtain one or more tags associated with the requested virtual asset. The tags can include "furniture," "couch," "mid-century," "mid-century modern," etc. Asset engine 132 can parse entries of the virtual asset data store to identify a mapping that includes tags that correspond to the asset tags for the requested virtual asset. In accordance with the previously described illustrative example, asset engine 132 can identify an entry that includes a mapping to tags that correspond to the asset tags for the requested virtual asset and can provide data associated with the virtual piece of furniture (e.g., a model file, etc.) to the client device 102 of the requesting user, as described herein.

In some embodiments, asset engine 132 can determine that no entries of the virtual asset data store include virtual assets having tags that correspond to the asset tags for the requested virtual asset. In such embodiments, asset engine 132 can provide characteristic data pertaining to the requested virtual asset (or the other virtual assets in the scene) to asset generation engine 184 of predictive system 180. Asset generation engine 184 can generate one or more model files associated with the virtual asset based on the characteristic data, in some embodiments. In some embodiments, asset generation engine 184 can provide the characteristic data as input to a generative AI model that is trained to generate model files for virtual assets based on given characteristic data. As described herein, asset tags obtained from asset tagging engine 182 can include articulation data associated with the requested virtual asset. Asset generation engine 184 can generate model files based on the articulation data of the asset tags, as described below. Further details regarding asset generation engine 184 and generating model files for virtual assets are provided herein.

It should be noted that although FIG. 1 illustrates asset engine 132 as part of platform 120, in additional or alternative embodiments, asset engine 132 can reside on one or more server machines that are remote from platform 120. For example, asset engine 132 can reside at server machine 130. Further, although FIG. 1 illustrates asset tagging engine 182 and asset generation engine 184 as part of predictive system 180, in additional or alternative embodiments, asset tagging engine 182 and/or asset generation engine 184 can reside on platform 120, server machine(s) 130, client device 102, and/or any other component of system 100. It should be noted that in some other implementations, the functions of platform 120, server machine 130, and/or predictive system(s) 180 can be provided by more or a fewer number of machines. For example, in some implementations, components and/or modules of platform 120, server machine 130, and/or predictive system(s) 180 may be integrated into a single machine, while in other implementations components and/or modules of any of platform 120, server machine 130, and/or predictive system(s) 180 may be integrated into multiple machines. In addition, in some implementations, components and/or modules of server machine 130, and/or predictive system(s) 180 into platform 120.

In general, functions described in implementations as being performed platform 120, server machine 130, and/or predictive system(s) 180 can also be performed on the client device 102 in other implementations. In addition, the functionality attributed to a particular component can be performed by different or multiple components operating together. Platform 120 can also be accessed as a service provided to other systems or devices through appropriate application programming interfaces, and thus is not limited to use in websites.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

Figure 2:
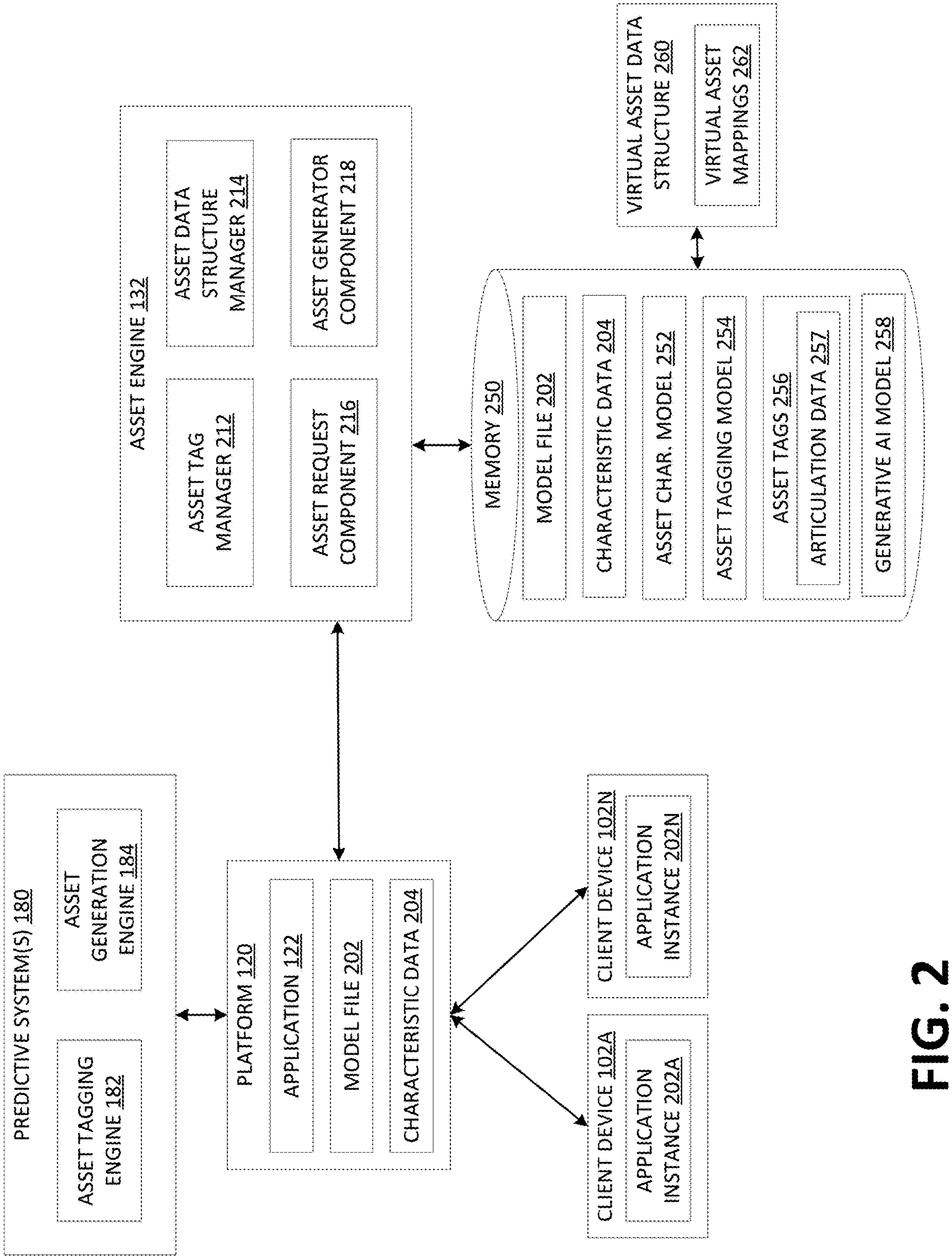
FIG. 2 is a block diagram that includes an example platform and an example asset engine, according to at least one embodiment.

FIG. 2 is a block diagram that includes an example platform 120 and an example asset engine 132, according to aspects of the present disclosure. As described above, asset engine 132 can reside at or can otherwise be connected to platform 120 (e.g., using network 104). In some embodiments, platform 120 and/or asset engine 132 can be connected to memory 250. Memory 250 can correspond to one or more portions of data store 110, in some embodiments. In additional or alternative embodiments, memory 250 can correspond to any memory of, connected to, or accessible by a component of system 100.

As described above, asset engine 132 can facilitate user access to virtual assets of a virtual asset data store 260. A virtual asset can include a character, an object, a design element, etc. of a virtual scene or environment. In some embodiments, a virtual asset can be designed or developed by a user of application 122 and made available to other users of application 122 (or another application of platform 120 or otherwise accessible to components of system 100). As illustrated in FIG. 2, asset engine 132 can include an asset tag manager 212, an asset data structure manager 214, an asset request component 216, and/or an asset generator component 218. Embodiments and examples pertaining asset engine 132 are described, at least, with respect to FIGS. 2-4 herein.

Figure 3:
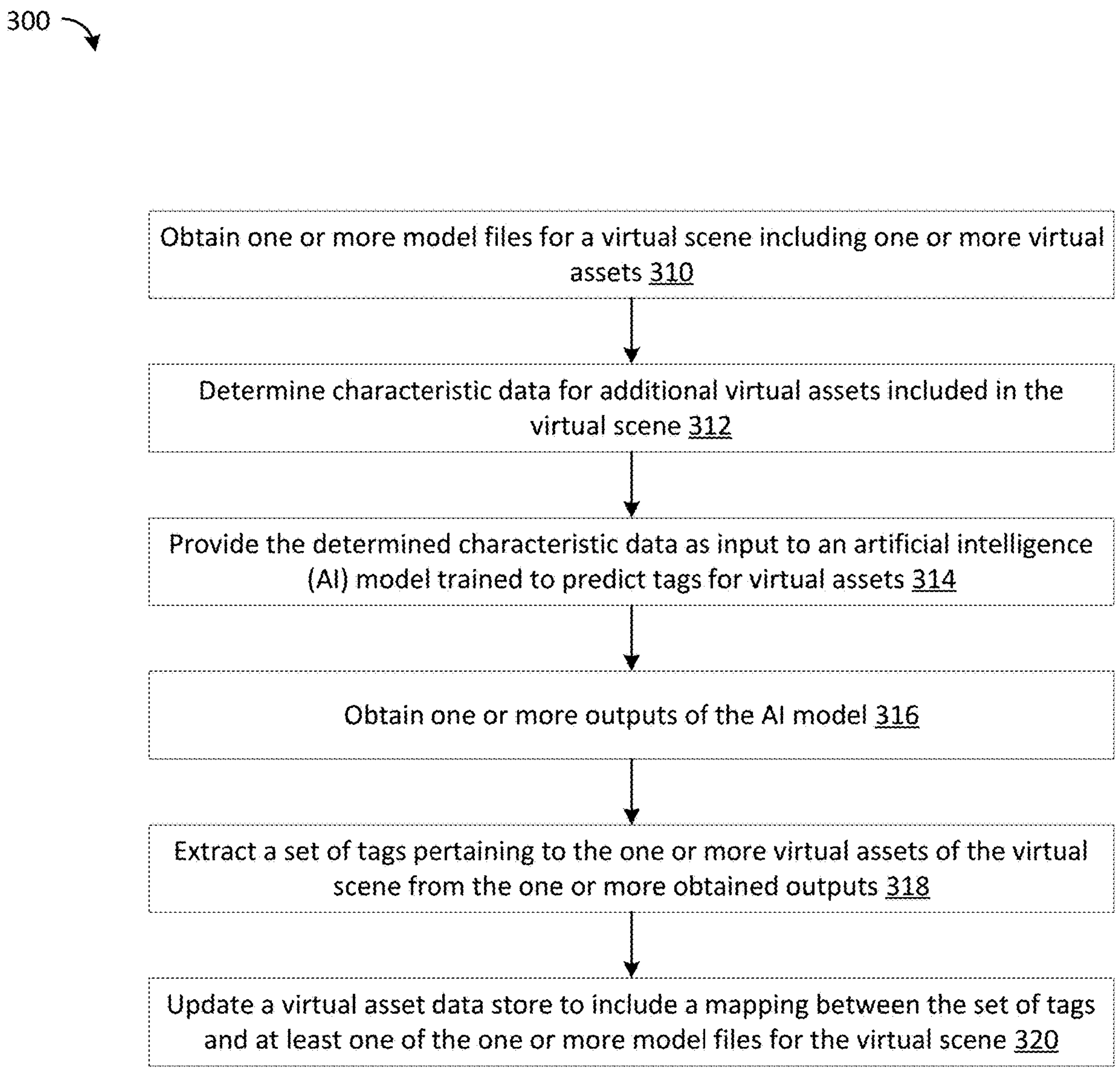
FIG. 3 is a flow diagram depicting an example method for updating a virtual asset data store to include a virtual asset and related asset tags, according to at least one embodiment.
Figure 4:
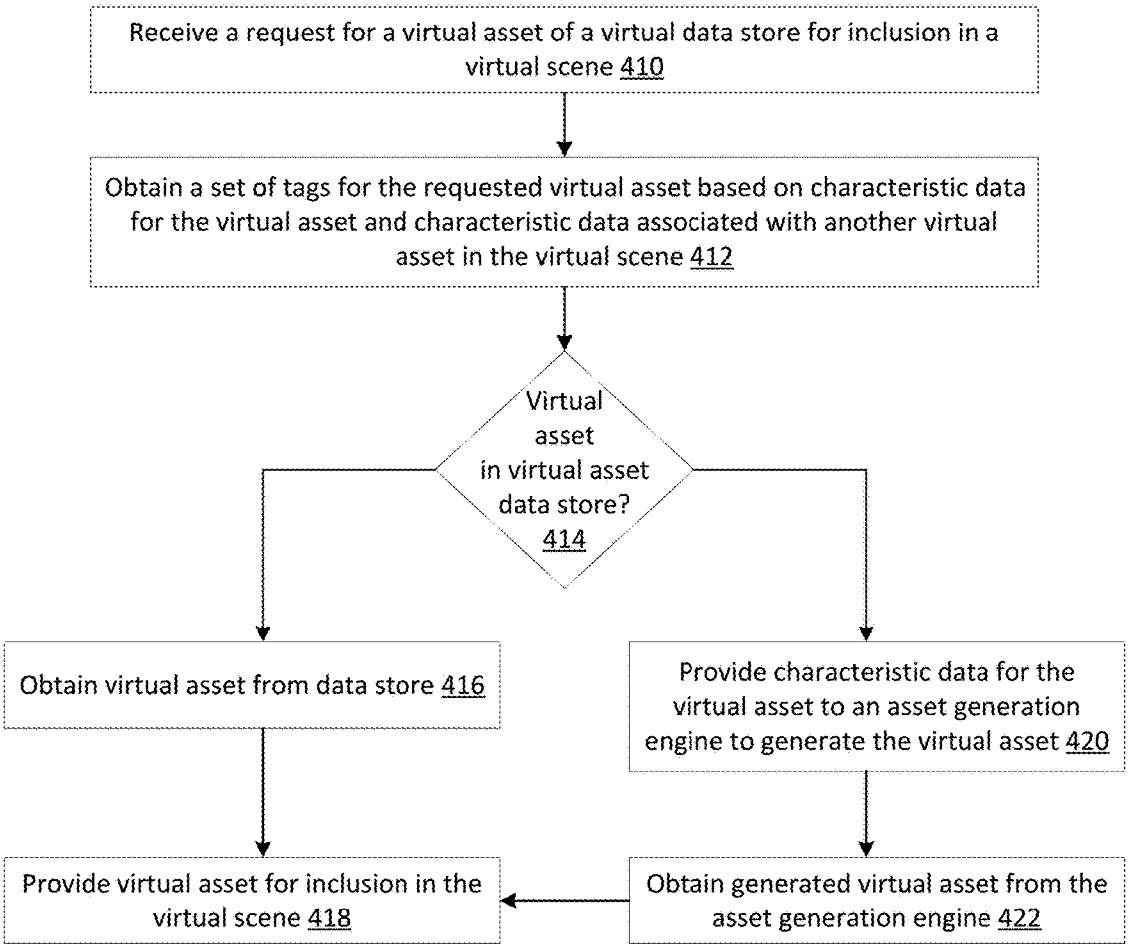
FIG. 4 is a flow diagram depicting an example method for selecting and including a virtual asset in a virtual scene, according to at least one embodiment.

FIG. 3 is a flow diagram depicting an example method 300 for updating a virtual asset data store to include a virtual asset and related asset tags, according to aspects of the present disclosure. FIG. 4 is a flow diagram depicting an example method 400 for selecting and including a virtual asset in a virtual scene, according to aspects of the present disclosure. In some embodiments, method 300 and/or method 400 can be performed by platform 120 and/or one or more components of or connected to platform 120. For example, one or more operations of method 300 and/or method 400 can be performed by asset engine 132, in some embodiments. Method 300 and/or method 400 may be performed by one or more processing units (e.g., CPUs and/or GPUs), which may include (or communicate with) one or more memory devices. In at least one embodiment, method 300 and/or method 400 may be performed by multiple processing threads (e.g., CPU threads and/or GPU threads), each thread executing one or more individual functions, routines, subroutines, or operations of the method. In at least one embodiment, processing threads implementing method 300 and/or method 400 may be synchronized (e.g., using semaphores, critical sections, and/or other thread synchronization mechanisms). Alternatively, processing threads implementing method 300 and/or method 400 may be executed asynchronously with respect to each other. Various operations of method 300 and/or method 400 may be performed in a different order compared with the order shown in FIG. 3 and/or FIG. 4, respectively. Some operations of the methods may be performed concurrently with other operations. In at least one embodiment, one or more operations shown in FIG. 3 and/or FIG. 4 may not always be performed.

Referring now to FIG. 3, at block 310, processing logic obtains one or more model files for a virtual scene including one or more virtual assets. As indicated above, application 122 can provide users (e.g., of client device 102) with access to tools or resources to design or develop virtual assets (e.g., characters, objects, design elements, etc.) of a virtual scene or a virtual environment. In some embodiments, a user can access the tools or resources of application 122 via an application instance 201 running via a client device 102 associated with the user. As illustrated in FIG. 2, multiple users can access the tools or resources of application 122 via respective application instances 202 running via respective client devices 102. For example, a user of client device 102A can access the tools or resources of application 122 via application instance 201A and a user of client device 102N can access the tools or resources of application 122 via application instance 201N. As described above, application instance 201A can provide users with access to tools or resources of application 122 in isolation from application instance 201N.

In some embodiments, a user can create/modify a virtual asset for inclusion in a virtual scene using the features and functionalities of application instance 201A. In an illustrative example, a user can design a virtual piece of furniture (e.g., a virtual couch) using the features and functionalities of application instance 201A. The user can create/modify the virtual asset according to a particular style or format that corresponds to a style or format of the virtual scene. For example, the virtual scene developed/designed by the user can have a mid-century modern interior design style. Accordingly, the user can design the virtual piece of furniture to have the mid-century modern interior design style, so to correspond to the design style of the virtual scene. The virtual scene can include other virtual assets (e.g., virtual décor assets, etc.) that also have the mid-century modern interior design style, in some embodiments.

In some embodiments, the virtual asset created/modified by the user can be associated with one or more model files. A model file 202 refers to a collection of data and/or instructions that, when executed by a rendering engine, generates a rendering of a 3D object according to one or more animations. In some embodiments, the model file 202 can be an editable model file that can be updated based on modifications made to the virtual asset by the user accessing the tools or resources of the application 122. In some embodiments, the model file 202 can be converted to a non-editable model file (e.g., after the creation/modification of the virtual asset is complete). The non-editable model file may be executed by computing resources (e.g., of a client device 102) to present users with the rendering of the virtual asset (e.g., during a video game session, during a playback of a motion picture that includes the virtual asset, etc.). In some embodiments, each virtual asset of a virtual scene can be associated with a respective model file 202. In other or similar embodiments, the virtual scene can be associated with a model file 202, which includes distinct sections that include data and/or instructions pertaining to each virtual asset of the virtual scene. It should be noted that although some embodiments of the present disclosure refer to a virtual asset being associated with a respective model file, embodiments of the present disclosure can be applied to embodiments that include a single model file for a virtual scene that includes data/instructions for each virtual asset.

In some embodiments, a user can initiate a request to include a virtual asset in virtual asset data structure 260, so to make the virtual asset available to other users of application 122. The user can engage with a UI element of a UI of client device 102A to initiate the request. Upon the user engaging with the UI element, client device 102A can forward the request to platform 120 and, in some embodiments, can forward the model file 202 (or the portion of the model file 202) associated with the virtual asset to platform 120. In some embodiments, the user of client device 102A can provide characteristic data 204 associated with the virtual asset via the UI of client device 102A. The characteristic data 204 can indicate one or more characteristics of the virtual asset (e.g., visual characteristics, design characteristics, etc.). In accordance with the above described illustrative example, the creator of the virtual piece of furniture can provide characteristic data 204 indicating the type of the virtual piece of furniture (e.g., a couch, etc.), a color of the virtual piece of furniture, or elements of the virtual piece of furniture, a design style of the virtual piece of furniture (e.g., mid-century modern, etc.), a placement or orientation of the virtual piece of furniture in the virtual scene, a texture of the virtual piece of furniture, and so forth. In additional or alternative embodiments, characteristic data 204 can include image data or other such data that depicts one or more features or characteristics of the virtual asset. Client device 102A can provide the characteristic data 204 to platform 120 (e.g., with the request), in some embodiments. In other or similar embodiments, the creator may not provide characteristic data 204 and instead, platform 120 can determine characteristic data 204 for the virtual asset, in accordance with embodiments described herein.

Referring back to FIG. 3, at block 312, processing logic determines characteristic data for additional virtual assets included in the virtual scene. In some embodiments, asset tag manager 212 (or another component of asset engine 132) can determine the characteristic data 204 for the additional virtual assets of the virtual scene. Asset tag manager 212 can obtain model files for the other assets (or the model file for the virtual scene) from client device 102 and/or can access the model files from memory 250. In some embodiments, asset tag manager 212 can provide the obtained model files as input to an asset characterization model 252 that is trained to predict characteristics of a virtual asset based on data associated with the virtual asset. The asset characterization model 252 can be trained based on historical data collected for virtual assets created/modified by users of application 122 (or another application). In an illustrative example, the asset characterization model 252 can be trained using a training data set that includes training inputs and target outputs. The training inputs can include data and/or code from a model file for a virtual asset and/or a virtual scene and the target outputs can include data (e.g., ground truth data) that indicates one or more characteristics of the virtual asset. The ground truth data can be provided by a creator/editor of the virtual asset, a user that is presented the virtual asset (e.g., via a client device 102), and/or according to other techniques. In other or similar embodiments, the training inputs can include image data depicting or otherwise corresponding to a rendering of the virtual asset (e.g., in addition to or in place of the model file). In some embodiments, predictive system 180 can train the asset characterization model 252, as described with respect to FIG. 5. In other or similar embodiments, platform 120 can access (e.g., via network 104) asset characterization model 252 residing at another component of system 100 and/or another system.

Asset tag manager 212 can provide the model file 202 associated with the additional virtual assets as an input to asset characterization model 252, in some embodiments. In other or similar embodiments, asset tag manager 212 can obtain image data pertaining to the additional virtual assets (e.g., by executing the model file 202 to generate the rendering of the additional virtual assets) and can provide the obtained image data as input to the asset characterization model 252. Asset tag manager 212 (or another component of asset engine 132) can obtain one or more outputs of the asset characterization model 252, which can include one or more sets of characteristic data 204 and, for each set of characteristic data 204, an indication of a level of confidence that a respective set of characteristic data 204 corresponds to the characteristics for the virtual asset. Asset tag manager 212 can identify a set of characteristic data having a level of confidence that satisfies a confidence criterion (e.g., exceeds a level of confidence threshold) as characteristic data 204 for the one or more additional assets.

In other or similar embodiments, asset tag manager 212 can determine characteristic data for the additional virtual assets based on one or more characterization rules provided by a developer or operator of application 122 and/or platform 120. For example, a developer or operator of application 122 and/or platform 120 can provide rules for characterizing a virtual asset created using tools or resources of application 122. An example rule can include coordinates corresponding to a shape of a virtual asset and a mapping between the coordinates to a category of virtual assets. For instance, the coordinates can correspond to a shape of a couch, which can be mapped to a category of "couch" or "piece of furniture." In some embodiments, asset tag manager 212 can determine the characteristic data for the additional virtual assets by applying the rules to data of the model file 202 for the additional assets, in some embodiments. For example, asset tag manager 212 can determine coordinates corresponding to the shape of the virtual asset and can determine a category of the virtual asset based on the determined shape. The determined category can correspond or otherwise be included in characteristic data 204 for the additional virtual asset.

It should be noted that embodiments described above regarding determining characteristic data 204 are provided for purpose of explanation and illustration only and are not intended to be limited. In some embodiments, asset tag manager 212 (or another component of asset engine 132) can determine characteristic data 204 for a virtual asset (e.g., a virtual asset to be added to virtual asset data structure 260 and/or an additional asset of the virtual scene) based on asset characterization model 252 and rules provided by a developer or operator of application 122 and/or platform 120. Asset tag manager 212 can determine characteristic data 204 according to other techniques, in other or similar embodiments.

Referring back to FIG. 3, at block 314, processing logic provides the determined characteristic data as input to an artificial intelligence (AI) model trained to predict tags for virtual assets. As described with respect to FIG. 1, predictive system 180 can include an asset tagging engine 182 that is configured to predict asset tags for a virtual asset of a virtual scene. In some embodiments, predictive system 180 can train an AI model to predict tags for virtual assets based on given characteristic data. Such AI model is referred to herein as an asset tagging model 254. Further details regarding the training of asset tagging model 254 are provided with respect to FIG. 5 below. In some embodiments, asset tag manager 212 can provide the characteristic data 204 obtained for the virtual asset to be included in the virtual asset data structure 260 and/or for the other virtual assets of the virtual scene to asset tagging engine 182 (e.g., via network 104, via a bus, etc.).

At block 316, processing logic obtains one or more outputs of the AI model. As described above, asset tagging engine 182 can feed the characteristic data 204 as input to the asset tagging model 254 and can obtain one or more outputs of the asset tagging model 254. The one or more outputs of the asset tagging model 254 can include one or more sets of asset tags and, for each set of asset tags, a level of confidence that the respective set of asset tags corresponds to the virtual asset in view of the characteristic data 204 provided as input to the model 254. In some embodiments, asset tagging engine 182 can provide the one or more outputs of the model 254 to asset tag manager 212.

At block 318, processing logic extracts a set of tags pertaining to the one or more virtual assets of the virtual scene from the one or more obtained outputs. Upon obtaining the one or more outputs of model 254, asset tag manager 212 and/or asset tagging engine 182 can identify a set of asset tags having a level of confidence that satisfies one or more confidence criteria (e.g., exceeds a level of confidence threshold, is larger than other levels of confidences for other sets of asset tags, etc.) and can extract the identified set from the outputs. In some embodiments, asset tagging engine 182 can extract the identified set from the outputs and can provide the extracted set of asset tags to asset tag manager 212 (e.g., via network 104, via the bus, etc.). Such asset tags can be stored at memory 250 as asset tags 256, in some embodiments.

In some embodiments, one or more asset tags of the extracted set of asset tags can include articulation data 257 associated with the virtual asset. Articulation data 257 can indicate a stationary state and/or a dynamic state of a real-world object corresponding to the virtual asset. A stationary state refers to a state of one or more components of the real-world object when the one or more components of the real-world object are stationary. In some embodiments, the stationary state can indicate a state of one or more components relative to other components of the real-world object. For example, a stationary state can indicate a location or position of one or more components of a toaster oven asset, such as a door of the toaster oven, relative to other components of the toaster oven object, such as a body of the toaster oven, when the components of the toaster oven object are stationary. A dynamic state refers to a state of one or more components of the real-world object when the one or more components are in motion. For example, a dynamic state can indicate a location or position of the toaster oven door and/or a trajectory or articulation (a rotational or translational motion) of the toaster oven door as the toaster oven door is opened (e.g., away from the toaster oven body). Articulation data 257 can indicate multiple stationary and/or dynamic states pertaining to the virtual asset, in some embodiments. In accordance with the previous examples, articulation data 257 for a toaster oven asset can indicates a stationary state of the toaster oven when the toaster oven door is open and a stationary state of the toaster oven when the toaster oven door is closed. In some embodiments, articulation data 257 can indicate each possible stationary state and/or dynamic state for the real-world object that corresponds to the virtual asset.

In additional or alternative embodiments, asset tag manager 212 (or another entity of simulation engine 132 and/or system 100) can obtain articulation data 257 from another source and can provide the articulation data 257 as additional input to asset tagging model 254. For example, asset tag manager 212 can provide characteristic data 204 and/or other data (e.g., image data depicting a real-world version of the virtual asset, etc.) associated with a virtual asset as input to one or more AI models (e.g., large language models (LLMs) that are trained to predict articulation data for the asset based on given characteristic data 204 and/or other data. The one or more LLMs can reside at one or more components of system 100 (e.g., platform 120, predictive system 180, server machine 130, etc.) and/or can be accessible to asset engine 132 via a network (e.g., network 104). Upon providing the characteristic data 204 and/or the other data as input to the one or more LLMs, asset tag manager 132 can obtain one or more outputs of the one or more LLMs, which can indicate articulation data 257 for the virtual asset. In some embodiments, asset manager 132 can feed the articulation data 257 as input to the asset tagging model 257. Asset tagging model 257 can predict asset tags in view of the articulation data 257, in accordance with previously described embodiments.

At block 320, processing logic updates a virtual asset data store to include a mapping between the set of tags and at least one of the one or more model files for the virtual scene. In some embodiments, asset data structure manager 214 can update virtual asset data structure 260 to include a mapping 262 between a model file 202 associated with the virtual asset (or a portion of model file 202 that corresponds to the virtual asset) and the tags obtained based on outputs of asset tagging model 254. Upon updating virtual asset data structure 260 to include the mapping 262, the virtual asset can be available to other users of application 122 that want to include the virtual asset in their virtual scenes, in accordance with embodiments described herein.

Referring now to FIG. 4, at block 410, processing logic receives a request for a virtual asset of a virtual data store for inclusion in a virtual scene. As described above, a user can develop or design a virtual scene using tools or resources available via application instance 201. In an illustrative example, a user of client device 102N can develop or design a virtual scene using tools or resources available via application instance 201N. The user can engage with one or more UI elements of client device 102N to initiate a request for a virtual asset of virtual asset data structure 260 for inclusion in the virtual scene. In some embodiments, upon engaging with the UI element, the user may be presented with one or more additional UI elements that enable the user to provide characteristic data 204 pertaining to the virtual asset to be included in the virtual scene. The user can engage with the one or more additional UI elements (or one or more elements of a peripheral device of or connected to client device 102) to provide characteristic data 204 pertaining to the requested virtual asset. In an illustrative example, characteristic data 204 for the requested virtual asset can include information such as "virtual piece of furniture," "mid-century modern design," etc., as described herein. Upon detecting the user interaction with the UI elements (and/or the additional UI elements), client device 102N can forward the request and/or the characteristic data 204 to platform 120 (e.g., via network 104). In some embodiments, characteristic data 204 provided by a user requesting a virtual asset can include minimal information pertaining to the virtual asset. For example, the characteristic data 204 can include "virtual piece of furniture," or other such information, which indicates a type of object that the user is requesting, but nothing else. As will be seen in later description, asset engine 132 can identify an appropriate virtual asset for inclusion in the virtual scene based on characteristic data 204 for the other information in the scene (e.g., even when minimal information pertaining to the virtual asset is provided by the user).

At block 412, processing logic obtains a set of tags for the requested virtual asset based on characteristic data for the virtual asset and characteristic data associated with another asset in the virtual scene. In some embodiments, asset request component 216 can obtain characteristic data 204 for the other assets in the virtual scene based on outputs of asset characterization model 252 and/or rules provided by a developer or engineer of application 122 and/or platform 120, as described above. Asset request component 216 can provide the characteristic data 204 for the requested virtual asset and the obtained characteristic data 204 for the other virtual assets in the scene as input to asset tagging model 254. As indicated above, asset tagging model 254 can be trained to predict asset tags for virtual assets based on characteristic data provided as input to the model 254. Asset request component 216 can extract asset tags 256 from one or more outputs of asset tagging model 254, as described above. As indicated above, asset tags 256 can include or can otherwise be predicted based on articulation data 257 associated with the virtual asset, as described above.

At block 414, processing logic determines whether the virtual asset data store identifies a virtual asset that satisfies one or more criteria with respect to the obtained set of tags for the requested one or more virtual assets, based on the tags associated with the virtual assets of the virtual data store. In some embodiments, asset request component 216 can parse entries of virtual asset data structure 260 to determine whether virtual asset data structure 260 includes a mapping 262 to asset tags 256 that correspond to the asset tags 256 obtained based on outputs of asset tagging model 254. Asset tags 256 of a mapping 262 can correspond to the asset tags 256 obtained for a requested virtual asset if a degree of similarity between the asset tags 256 of the mapping and the obtained asset tags 256 exceeds a similarity threshold. The degree of similarity between sets of asset tags 256 can be defined by a number of common asset tags included in each set, semantic or syntactic similarity between asset tags included in each set, and so forth. For example, a set of asset tags of a mapping 262 can include "virtual piece of furniture," "virtual couch," "leather," "mid-century modern design" while asset tags 256 obtained based on an output of asset tagging model 254 can include "virtual piece of furniture," "virtual couch," and "mid-century modern design." The degree of similarity between the asset tags 256 can exceed the similarity threshold if the number of common asset tags 256 (e.g., "virtual piece of furniture," "virtual couch," "mid-century modern design") exceeds a threshold number of asset tags. In another example, a set of asset tags of a mapping 262 can include "virtual couch" while asset tags 256 obtained based on an output of asset tagging model 254 can include "virtual love seat." Asset request component 216 can determine (e.g., based on rules provided by a developer or operator of application 122 and/or platform 120) that "virtual couch" is semantically similar to "virtual love seat," and accordingly the tags correspond to each other.

Upon processing logic determining that the virtual asset data store identifies a virtual asset that satisfies one or more criteria with respect to the obtained set of tags for the requested one or more virtual assets, method 400 can continue to block 416. At block 416, processing logic obtains the virtual asset from the data store. As indicated above, the mapping 262 for a virtual asset of virtual asset data structure 260 can include a model file 202 associated with the virtual asset (or a portion of a model file that corresponds to the virtual asset). In such embodiments, asset request component 216 can extract the model file 202 (or the portion of the model file 202) from the entry of data structure 260 that includes the mapping. In other or similar embodiments, mapping 262 can include a pointer (e.g., a memory address) for a region of memory 250 (or another memory) that stores the model file 202 (or portion of the model file 202). In some embodiments, asset request component 216 can identify the region of memory 250 that corresponds to the pointer of mapping 262 and can copy the model file 202 (or the portion of the model file 202) from the identified region of memory 250.

At block 418, processing logic provides the virtual asset for inclusion in the virtual scene. Upon obtaining the model file 202 (or the portion of the model file 202), asset request component 216 can provide the model file 202 to client device 102N, in accordance with the request. Client device 102N can execute the model file 202 to generate a rendering of the virtual asset for presentation to the user via the UI. In some embodiments, the model file 202 can be an editable model file, and the user can modify components of the virtual asset (e.g., a color of the virtual asset, etc.) using tools or resources provided via application instance 201N.

In some embodiments, a user of client device 102N can provide a request for a particular animation of the virtual asset. The requested animation, in some embodiments, can be different from the animation associated with the model file 202 provided to client device 102N, as described above. In an illustrative example, model file 202 provided to client device 102N can be associated with a virtual cabinet asset that animates a door of the virtual cabinet opening according to one direction. The user of client device 102N can provide a request (e.g., via the UI of client device 102N) to animate the virtual cabinet asset so that the door opens according to another direction. Articulation data 257 of asset tags 256 for the virtual asset can indicate a stationary state and/or a dynamic state associated with components of the virtual asset, according to the requested animation, as described above. In some embodiments, asset request component 216 (or another component of simulation engine 132) can provide the model file 202 and/or the articulation data 257 of asset tags 256 for the virtual asset to asset generator component 218. Asset generator component 218 can update the model file 202 for the virtual asset to animate the virtual asset according to the requested animation, as described herein.

In additional or alternative embodiments, upon identifying a virtual asset of the virtual asset data store that satisfies the one or more criteria with respect to the obtained asset tags (e.g., as described above with respect to block 414), asset request component 216 can extract the model file 202 from the entry of data structure 260, as described above. In some embodiments, the model file 202 can correspond to one or more animations pertaining to the virtual asset. Articulation data 257 of asset tags 256 for the virtual asset can indicate one or more stationary states or dynamic states that do not correspond to an animation of model file 202. In some embodiments, asset request component 216 can provide model file 202 and/or articulation data 257 to asset generator component 218, which can generate model files 202 (or data/code for model file 202) associated with the stationary and/or dynamic states of articulation data 257 not corresponding to model file 202 (e.g., obtained from the virtual asset data store). In some embodiments, asset request component 216 can provide a user with a rendering of each animation associated with the virtual asset (e.g., as indicated by articulation data 257) via the UI of client device 102N. The user can select (e.g., by engaging with the UI) a particular animation for the virtual asset for inclusion in the virtual scene.

Referring back to block 414, upon processing logic determining that the virtual asset data store does not identify a virtual asset that satisfies one or more criteria with respect to the obtained set of tags for the requested one or more virtual assets, method 400 can continue to block 420. At block 420, processing logic provides characteristic data for the virtual asset to an asset generation engine to generate the virtual asset. As described above, asset generation engine 184 can include or otherwise access a generative AI model 258 that is trained to generate a model file for a virtual asset based on given characteristic data for the virtual asset. The generative AI model 258 can be a machine learning model that is trained to generate new, original data based on given inputs. A generative AI model 258 can be trained using a large corpus of data, as described herein. Further details regarding generative AI model 258 are described with respect to FIGS. 5 and 6 herein.

In some embodiments, upon determining that virtual data structure 260 does not identify a virtual asset that satisfies the one or more criteria, asset generator component 218 can provide characteristic data 204 pertaining to the requested virtual asset and/or the other virtual assets of the virtual scene to asset generation engine 184. Asset generation engine 184 can feed the characteristic data 204 as input to generative AI model 258 and can obtain one or more outputs of the generative AI model 258. In some embodiments, asset generation engine 184 can feed articulation data 257 as input to generative AI model 258 (e.g., with characteristic data 204).

At block 422, processing logic obtains the generated virtual asset from the asset generation engine. The one or more outputs can include a model file 202 (or portions of a model file) that, when executed, generate a rendering of a virtual asset having the characteristics indicated by characteristic data 204. Asset generation engine 184 can provide the model file to asset generator component 218 (e.g., via network 104, via a bus). In some embodiments, asset request component 216 can update the virtual asset data structure 260 to include a mapping 262 between the asset tags obtained based on asset tagging model 254 and the generated model file 202, as described herein. Asset request component 216 can provide the generated model file 202 to client device 102N, in accordance with the request. In accordance with previously described embodiments, client device 102N can execute the model file to generate the rendering of the virtual asset for inclusion in the virtual scene.

In some embodiments, generative AI model 258 can generate model file 202 that, when executed, generate the rendering of the virtual asset according to one or more animations that correspond to articulation data 257. For example, generated model file 202 can include one or more sections that each correspond to animation for a particular stationary state and/or particular dynamic state indicated by articulation data 257. In other or similar embodiments, generative AI model 258 can generate multiple model files 202 that each correspond to an animation for a particular stationary state and/or particular dynamic state of articulation data 257.

As described above, in some embodiments, asset request component 216 can feed a model file 202 (e.g., identified from a virtual asset data store) and characteristic data 204 and/or articulation data 257 as an input to generative AI model 258. One or more outputs of generative AI model 258 can include an updated model file that, when executed, render a virtual asset to have updated characteristics and/or an updated animation, as described herein.

It should be noted that although embodiments the present disclosure provide that a virtual asset is identified from virtual asset data structure 260 in response to a request by a user, virtual assets can be identified from virtual asset data structure 260 without a request by a user. For example, a user can develop or design a virtual scene using tools or resources of application instance 201, as described above. As the user is developing or designing the virtual scene, virtual assets in the scene can have a common design style, as described above. Asset engine 132 can obtain characteristic data 204 associated with the virtual assets in the scene (e.g., by providing the model file 202 for the virtual scene as input to asset characterization model 252) and can obtain one or more asset tags 256 based on the obtained characteristic data 204. Asset engine 132 can parse virtual asset data structure 260 to identify entries that include mappings 262 corresponding to the obtained asset tags 256 and, upon identifying an entry, can provide the model file 202 of the entry to client device 102. The client device 102 can execute the model file 202 and can update the UI of client device 102 to present the asset associated with model file 202 as an optional virtual asset to be included in the virtual scene. The user can provide a notification to include (or not include) the virtual asset in the virtual scene by engaging with one or more UI elements of the UI, according to previously described embodiments.

Figure 5:
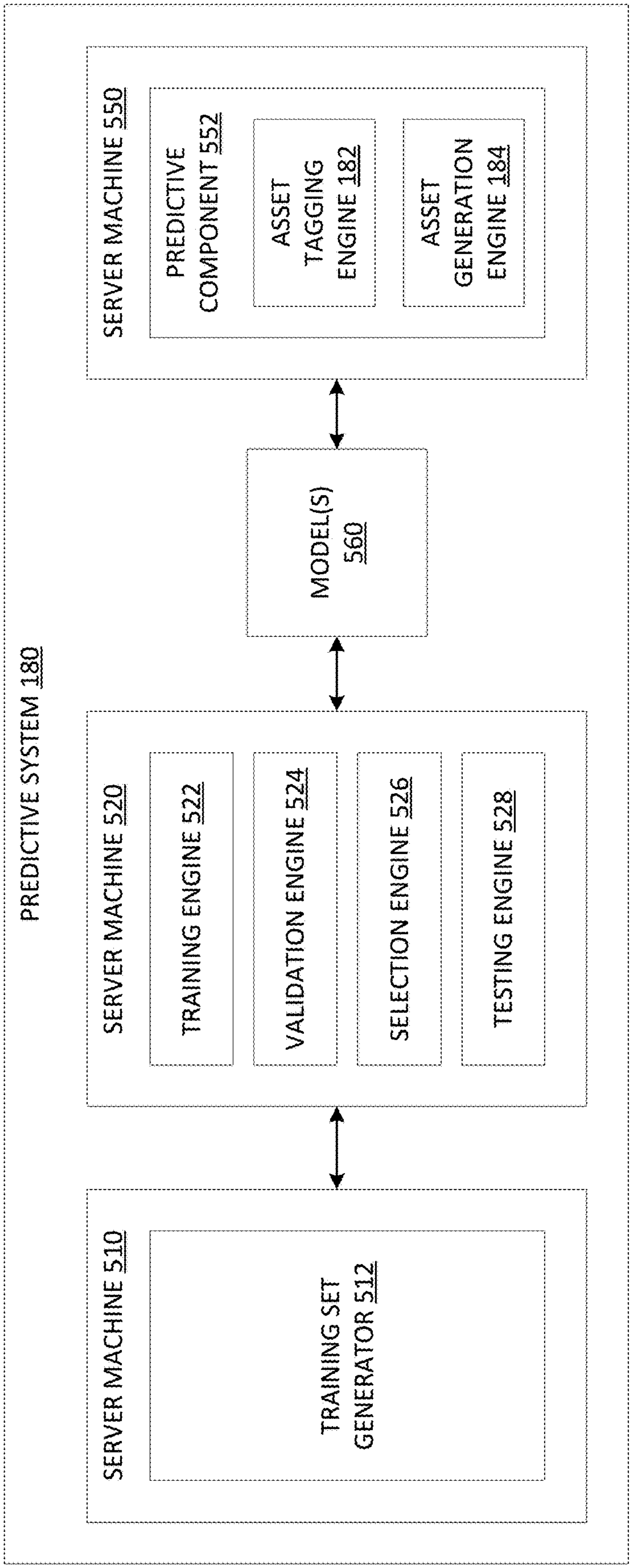
FIG. 5 is a block diagram that includes an example predictive system, according to at least one embodiment.

FIG. 5 is a block diagram that includes an example predictive system 180, according to aspects of the present disclosure. In some embodiments, predictive system 180 can be configured to train one or more machine learning models 560 associated with asset engine 132. For example, predictive system 180 can be configured to train asset characterization model 252, asset tagging model 254, and/or generative AI model 258.

As illustrated in FIG. 5, predictive system 180 can include a training set generator 512 (e.g., residing at server machine 510), a training engine 512, a validation engine 524, a selection engine 526, and/or a testing engine 528 (e.g., each residing at server machine 520), and/or a predictive component 552 (e.g., residing at server machine 550). Training set generator 512 may be capable of generating training data (e.g., a set of training inputs and a set of target outputs) to train model 560. Machine learning models 560 can include one or more LLMs, as described above, or any other type of machine learning model that is trained to perform tasks pertaining to the above described embodiments. For example, machine learning models 560 can include AI models employ or implement techniques including, but not limited to, neural network techniques (e.g., artificial neural network, convolutional neural network, etc.), support vector machine (SVM) techniques, decision-making techniques, logistic regression techniques, linear regression techniques, random forest techniques, Naïve Bayes classifier techniques, K-nearest neighbors techniques, K-means clustering, regression analysis techniques, vector-based techniques, principal component analysis techniques, hierarchical clustering techniques, logistics-based techniques, normal distribution techniques, XGBoost techniques, gradient boosting techniques, decision tree learning techniques, AdaBoost techniques, boosting techniques, Bayesian inference techniques, ridge regression techniques, stochastic gradient descent techniques, and so forth.

As mentioned above, training set generator 512 can generate training data for training model 560. Training set generator 512 obtain training data for training model 560 and can organize or otherwise group the training data for training model 560 (e.g., according to the purpose of the model). In some embodiments, training set generator 512 can initialize a training set T (e.g., for training a respective model 560) to null (e.g., { }). In an illustrative example, training set generator 512 can generate training data for training asset characterization model 252 by obtaining image data and/or a model file associated with one or more virtual assets of application 122 (or another application) and obtaining data indicating one or more characteristics pertaining to the virtual asset. The data indicating one or more characteristics pertaining to the virtual asset can be provided by a developer or operator associated with application 122 (or another application), a creator of the virtual asset, or a user of application 122 (or the other application). Training set generator 512 can generate an input/output mapping. The input can be based on the image data and/or the model file associated with the virtual asset and the output can include characteristic data indicating the one or more characteristics pertaining to the virtual asset. Training set generator 512 can add the input/output mapping to the training set T and can determine whether training set T is sufficient for training model 560. Training set T can be sufficient for training model 560 if training set T includes a threshold amount of input/output mappings, in some embodiments. In response to determining that training set T is not sufficient for training, training set generator 512 can identify additional data for virtual assets provided by users of platform 120 ad can generate additional input/output mappings based on the additional data. In response to determining that training set T is sufficient for training, training set generator 512 can provide training set T to train model 560. In some embodiments, training set generator 512 provides the training set T to training engine 522.

In another illustrative example, training set generator 512 can generate training data for training asset tagging model 254 by obtaining image data (e.g., depicting a real-world or simulated version of a virtual asset) and/or a model file associated with one or more virtual assets of application 122 (or another application) and obtaining asset tags for the virtual asset. The asset tags for the virtual asset can correspond to characteristic data for the virtual asset, in some embodiments. In other or similar embodiments, the asset tags can represent an abstraction or summarization of characteristic data for the virtual asset. For example, characteristic data for a virtual asset can indicate that the virtual asset represents "a couch that is in a living room and is made out of leather." Asset tags for the virtual asset can include "couch," "leather," and "location: living room," in some embodiments. The asset tags for the virtual asset can be provided by a developer or operator associated with application 122 (or another application), a creator of the virtual asset, or a user of application 122 (or the other application). In some embodiments, training set generator 512 can generate asset tags based on characteristic data by extracting key words from characteristic data provided for a virtual asset (e.g., according to semantic and syntactical rules provided by a developer/operator of application 122, etc.). Training set generator 512 can generate an input/output mapping. The input can be based on the image data and/or the model file associated with the virtual asset and the output can include the one or asset tags pertaining to the virtual asset.

Training set generator 512 can add the input/output mapping to the training set T and can determine whether training set T is sufficient for training model 560. Training set T can be sufficient for training model 560 if training set T includes a threshold amount of input/output mappings, in some embodiments. In response to determining that training set T is not sufficient for training, training set generator 512 can identify additional data for virtual assets provided by users of platform 120 ad can generate additional input/output mappings based on the additional data. In response to determining that training set T is sufficient for training, training set generator 512 can provide training set T to train model 560. In some embodiments, training set generator 512 provides the training set T to training engine 522.

As described above, one or more tags predicted by asset tagging model 254 can include articulation data 257 that indicates a stationary and/or dynamic state of a real-world object associated with a virtual asset. In some embodiments, training set generator 512 can generate training data for training such asset tagging model 254 by obtaining articulation data associated with a real-world object corresponding to the virtual asset. The articulation data can include information indicating one or more stationary states and/or dynamic states associated with one or more components of the real-world object. A stationary state refers a location or position of one or more components of the real-world object (e.g., relative to other components of the real-world object). A dynamic state refers to a state of one or more components of the real-world object when the one or more components are in motion. The motion can include a trajectory, a rotational motion, a translational motion, and so forth. In some embodiments, articulation data 257 can be provided by a developer or operator associated with application 122 (or another application), a creator of the virtual asset, or a user of application 122 (or the other application). In some embodiments, the articulation data can be included in the output of the input/output mapping generated by training set generator 512, as described above.

In yet another illustrative example, training set generator 512 can generate training data to train generative AI model 258. In such example, training set generator 512 can initialize a training set T to null (e.g., { }). Training set generator 512 can obtain data associated with one or more user-provided queries to platform 120 and/or one or more responses to the queries. The responses to the queries can include model files or images generated in response to the user-provided queries, in some embodiments. Training set generator 512 can generate an input/output mapping. The input can be based on a user-provided query of training data 206 and the output can indicate the response to the user-provided query. In some embodiments, the input can be based on a user-provided query for a virtual asset having one or more particular characteristics and the output can indicate the response to the user-provided query, which can include a model file associated with the virtual asset. In additional or alternative embodiments, the input can include one or more asset tags and/or articulation data for the virtual asset and the model file of the output can include data and/or instructions associated with animating the virtual asset in view of a stationary state and/or a dynamic state indicated by the articulation data. Training set generator 512 can add the input/output mapping to the training set T and can determine whether training set T is sufficient for training model 560. Training set T can be sufficient for training model 560 if training set T includes a threshold amount of input/output mappings, in some embodiments. In response to determining that training set T is not sufficient for training, training set generator 512 can identify additional data that indicates additional phrases provided by users of platform 120 ad can generate additional input/output mappings based on the additional data. In response to determining that training set T is sufficient for training, training set generator 512 can provide training set T to train model 560. In some embodiments, training set generator 512 provides the training set T to training engine 522. In additional or alternative embodiments, generative AI model 258 can be trained according to embodiments described with respect to FIG. 6.

In other or similar embodiments, training set generator 512 can generate training data to train one or more LLMs to predict articulation data 257 associated with a virtual asset. In such example, training set generator 512 can initialize a training set T to null (e.g., { }). Training set generator 512 can obtain data associated with one or more virtual assets and/or one or more real-world objects. The data associated with the virtual asset(s) can include characteristic data 204, as described above. Data associated with one or more real-world objects can include image data or any other such data indicating or depicting one or more characteristics of the real-world object. Training set generator 512 can additionally or alternatively obtain articulation data that indicates a stationary state and/or a dynamic state of components of the virtual assets and/or the real-world objects. In some embodiments, the articulation data can be provided by a developer or engineer associated with application 122 and/or platform 120. In other or similar embodiments, a user of application can provide the articulation data 122 and/or platform 122. Articulation data can be obtained by training set generator 512 according to other techniques, in some embodiments. Training set generator 512 can generate an input/output mapping. The input can be based on the characteristic data 204 and/or the image data associated with the virtual asset and/or the real-world object. The output can be based on the articulation data. Training set generator 512 can add the input/output mapping to the training set T and can determine whether training set T is sufficient for training model 560. Training set T can be sufficient for training model 560 if training set T includes a threshold amount of input/output mappings, in some embodiments. In response to determining that training set T is not sufficient for training, training set generator 512 can identify additional data that indicates additional phrases provided by users of platform 120 ad can generate additional input/output mappings based on the additional data. In response to determining that training set T is sufficient for training, training set generator 512 can provide training set T to train model 560. In some embodiments, training set generator 512 provides the training set T to training engine 522.

Training engine 522 can train a machine learning model 560 using the training data (e.g., training set T) from training set generator 512. The machine learning model 560 can refer to the model artifact that is created by the training engine 522 using the training data that includes training inputs and/or corresponding target outputs (correct answers for respective training inputs). The training engine 522 can find patterns in the training data that map the training input to the target output (the answer to be predicted), and provide the machine learning model 560 that captures these patterns. The machine learning model 560 can be composed of, e.g., a single level of linear or non-linear operations (e.g., a support vector machine (SVM or may be a deep network, i.e., a machine learning model that is composed of multiple levels of non-linear operations). An example of a deep network is a neural network with one or more hidden layers, and such a machine learning model may be trained by, for example, adjusting weights of a neural network in accordance with a backpropagation learning algorithm or the like. In one aspect, the training set is obtained by training set generator 512 hosted by server machine 510.

Validation engine 524 may be capable of validating a trained machine learning model 560 using a corresponding set of features of a validation set from training set generator 512. The validation engine 524 may determine an accuracy of each of the trained machine learning models 560 based on the corresponding sets of features of the validation set. The validation engine 524 may discard a trained machine learning model 560 that has an accuracy that does not meet a threshold accuracy. In some embodiments, the selection engine 526 may be capable of selecting a trained machine learning model 560 that has an accuracy that meets a threshold accuracy. In some embodiments, the selection engine 526 may be capable of selecting the trained machine learning model 560 that has the highest accuracy of the trained machine learning models 560.

The testing engine 528 may be capable of testing a trained machine learning model 560 using a corresponding set of features of a testing set from training set generator 512. For example, a first trained machine learning model 560 that was trained using a first set of features of the training set may be tested using the first set of features of the testing set. The testing engine 528 may determine a trained machine learning model 560 that has the highest accuracy of all of the trained machine learning models based on the testing sets.

As described above, predictive system 180 can be configured to train a large language model. In accordance with embodiments described herein, a LLM refers to a type of AI that uses or otherwise accesses deep learning techniques and large data sets to process and/or analyze human language (also referred to as natural language). It should be noted that predictive system 180 can train the large language model in accordance with embodiments described herein and/or in accordance with other techniques for training a large language model. For example, large language model may be trained on a large amount of data, including prediction of one or more missing words in a sentence, identification of whether two consecutive sentences are logically related to each other, generation of next texts based on prompts, etc.

Predictive component 552 of server machine 550 may be configured to feed data as input to model 560 and obtain one or more outputs. As illustrated in FIG. 5, predictive component 552 can include asset tagging engine 182 and/or asset generation engine 184. Asset tagging engine 182 can feed characteristic data 204 as input to asset tagging engine 254, as described above, and obtain one or more outputs, which can indicate one or more asset tags for a virtual asset. Asset generation engine 184 can feed characteristic data 204 as input to generative AI model 258, as described herein, and can obtain one or more outputs, which can include a model file (or a portion of a model file) generated for a requested virtual asset.

Figure 6:
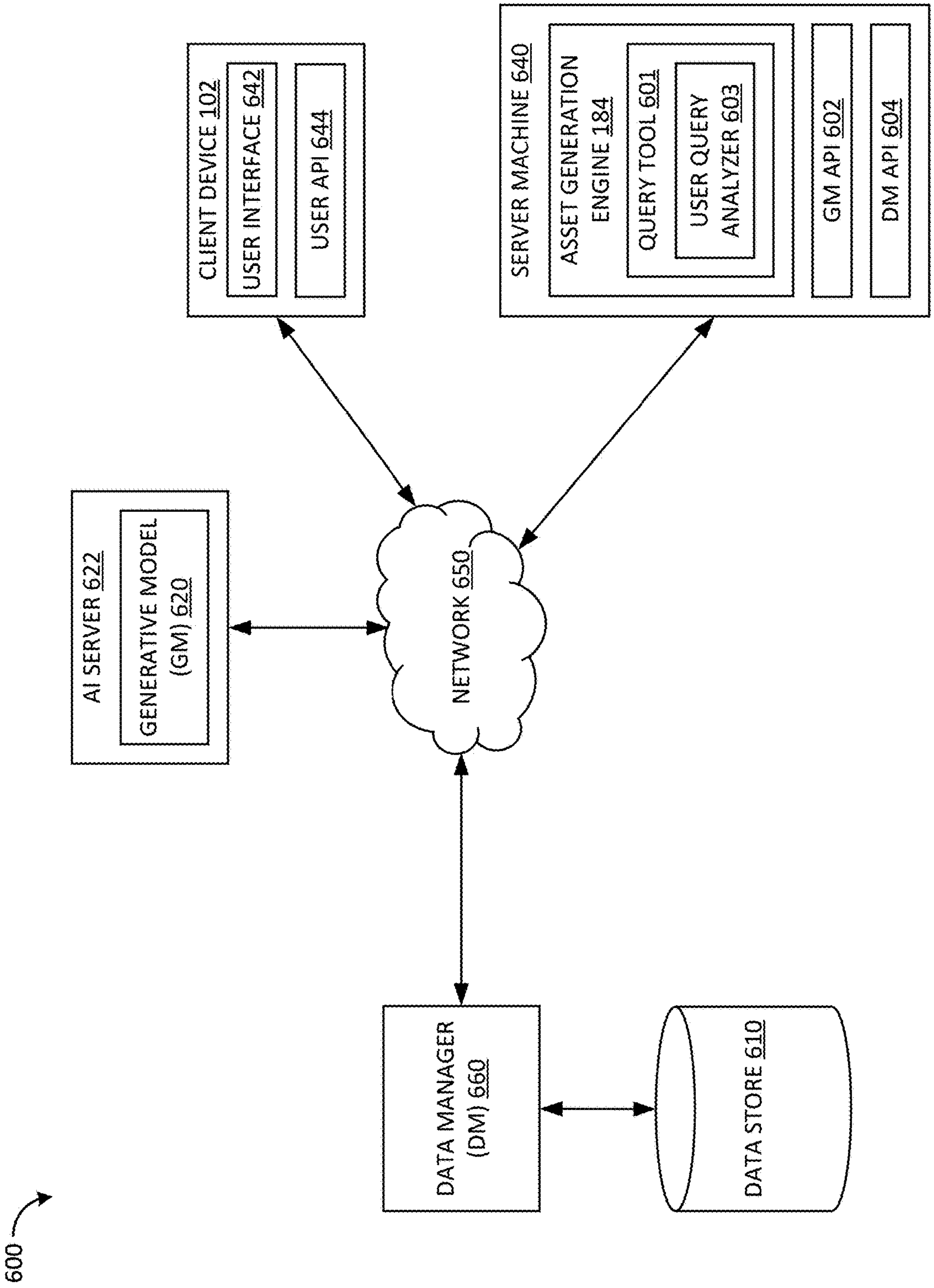
FIG. 6 depicts an illustrative generative AI system, according to at least one embodiment.

FIG. 6 illustrates a high-level component diagram of an example system architecture 600 for a generative AI model 620, in accordance with one or more aspects of the disclosure. The system architecture 600 (also referred to as "system" herein) includes a data store 610, a generative model 620 provided by AI server 622, a server machine 640 with a query tool (QT) 601, one or more client devices 102, and/or other components connected to a network 650. In some embodiments, system 600 can be a part of or can be included in predictive system 180, as described above. In additional or alternative embodiments, client device(s) 102 can correspond to or can include client devices 102, as described with respect to FIG. 1. Network 650 can correspond to network 104 of FIG. 1 and/or can correspond to another network, as described herein.

The system architecture 600 (also referred to as "system" herein) includes an AI server 622 including a generative model (GM) 620 (also referred to herein as a generative AI model). GM 620 can be or can otherwise correspond to generative AI model 258, described with respect to FIG. 2. A generative AI model can include an AI model that is trained to generate new, original data based on given inputs. GM 620 can be trained according based on a corpus of data, as described herein.

A generative AI model can deviate from a machine learning model based on the generative AI model's ability to generate new, original data, rather than making predictions based on existing data patterns. As described above, a generative AI model can include a large language model (LLM), a generative adversarial network (GAN) and/or a variational autoencoder (VAE). In some instances, a LLM, a GAN, a VAE, and/or other types of generative AI models can employ a different approach to training and/or learning the underlying probability distribution of training data, compared to some machine learning models. For instance, a GAN can include a generator network and a discriminator network. The generator network attempts to produce synthetic data samples that are indistinguishable from real data, while the discriminator network seeks to correctly classify between real and fake samples. Through this iterative adversarial process, the generator network can gradually improve its ability to generate increasingly realistic and diverse data.

Generative AI models also have the ability to capture and learn complex, high-dimensional structures of data. One aim of generative AI models is to model underlying data distribution, allowing them to generate new data points that possess the same characteristics as training data. Some machine learning models (e.g., that are not generative AI models) focus on optimizing specific prediction of tasks.

As mentioned above, GM 620 can be trained to determine the context of a given input text through its ability to analyze and understand surrounding words, phrases, and patterns within the given input text. The training set generator can identify or otherwise obtain sentences (or parts of sentences) of phrases provided by users of platform 120, in some embodiments. The (e.g., audio phrases, textual phrases, etc.) phrases can be provided based on a user interaction with application instance 201 via client device 102. The phrases can be included in content produced or retrieved from other sources of the Internet and/or any other database accessible by the training set generator and/or GM 620. The training set generator can generate an input/output mapping based on the obtained sentences (or parts of sentences). The input can include a portion of an obtained sentence of a phrase. Another portion of the obtained sentence or phrase is not included in the input. The output can include the complete sentence (or part of the sentence), which includes both the portion included in the input and the additional portion that is not included in the input. In accordance with embodiments of the present disclosure, the training set generated by the training set generator to train GM 620 can include a significantly large amount of input/output mappings (e.g., millions, billions, etc.). In some embodiments, multiple input/output mappings of the training set can correspond to the same sentence (or part of the sentence), where the input of each of the input/output mappings include a different portion of the sentence (or part of the sentence).

In some embodiments, the sentences used to generate the input/output mapping of the training set can be obtained from phrases included in electronic documents (e.g., collaborative electronic documents, web page documents, etc.). In such embodiments, the training set generator can determine a context of one or more portions of content of an electronic document. For example, the training set generator can provide a portion of content as input to another machine learning model that is trained to predict a context of the content. the training set generator can update an input/output mapping corresponding to the sentence included in the electronic document to include the determined context. In other or similar embodiments, the training set generator can update the input/output mapping for the sentence to include an indicator of the electronic document (e.g., a pointer or link to the document, a memory address or a web address for the electronic document).

It should be noted that AI server 622 can train the GM 620 in accordance with embodiments described herein and/or in accordance with other techniques for training a large language model. For example, GM 620 may be trained on a large amount of data, including prediction of one or more missing words in a sentence, identification of whether two consecutive sentences are logically related to each other, generation of next texts based on prompts, etc.

In some embodiments, data store 610 (database, data warehouse, etc.) may store any suitable raw and/or processed data, e.g., content data 612. System 600 may further include a data manager (DM) 660 that may be any application configured to manage data transport to and from data store 610, e.g., retrieval of data and/or storage of new data, indexing data, arranging data by user, time, type of activity to which the data is related, associating the data with keywords, and/or the like. DM 660 may collect data associated with various user activities, e.g., data pertaining to a user interaction with UI elements of application instance 201, other applications, internal tools, and/or the like. DM 660 may collect, transform, aggregate, and archive such data in data store 610. In some embodiments, DM 660 may support a suitable software that, with user's consent, resides on client device(s) 102 and tracks user activities. For example, the DM-supported software may capture user-generated content and convert the captured content into a format that can be used by various content destinations. In some embodiments, the DM-supported software may be a code snippet integrated into user's browsers/apps and/or websites visited by the user. Generating, tracking, and transmitting data may be facilitated by one or more libraries of DM 660. In some embodiments, data may be transmitted using messages in the JSON format. A message may include a user digital identifier, a timestamp, name and version of a library that generated the message, page path, user agent, operating system, settings. A message may further include various user traits, which should be broadly understood as any contextual data associated with user's activities and/or preferences. DM 660 may track different ways the same user DM 660 may facilitate data suppression/deletion in accordance with various data protection and consumer protection regulations. DM 660 may validate data, convert data into a target format, identify and eliminate duplicate data, and/or the like. DM 660 may aggregate data, e.g., identify and combine data associated with a given user in the user's profile (user's persona), and storing the user's profile on a single memory partition. DM 660 may scan multiple user's profiles to identify and group users that are related to the same organization, activity, interests, and/or the like. DM 660 may scan numerous user's actions and identify user's profiles associated with multiple uses of a particular resource (e.g., a virtual meeting). DM may ensure reliable delivery of data from user profiles (user personas) to recipients of that data, e.g., by tracking and re-delivering (re-routing) data whose transmission failed.

Data store 610 may be implemented in a persistent storage capable of storing files as well as data structures to perform identification of data, in accordance with embodiments of the disclosure. Data store 610 may be hosted by one or more storage devices, such as main memory, magnetic or optical storage disks, tapes, or hard drives, network-attached storage (NAS), storage area network (SAN), and so forth. Although depicted as separate from the server machine 620, data store 610 may be part of server machine 620, and/or other devices. In some embodiments, data store 610 may be implemented on a network-attached file server, while in other embodiments data store 610 may be implemented on some other types of persistent storage, such as an object-oriented database, a relational database, and so forth, that may be hosted by a server machine 620 or one or more different machines coupled to server machine 620 via network 605.

Server machine 640 may include QT 601 configured to perform automated identification and facilitate retrieval of relevant and timely contextual information for quick and accurate processing of user queries by generative model 620, as disclosed herein. In some embodiments, QT 601 may be implemented by asset generation engine 184. It can be noted that a user's request for an operation pertaining to a virtual asset can be formed into a query that uses QT 601 in some embodiments. Via network 650, QT 601 may be in communication with one or more client devices 102, AI server 622, and data store 610, e.g., via DM 660. Communications between QT 601 and AI server 622 may be facilitated by GM API 602. DM API 604 may facilitate communications between QT 601 and data store 610/DM 660. Additionally, GM API 602 may translate various queries generated by QT 601 into unstructured natural-language format and, conversely, translate responses received from generative model 620 into any suitable form (including any structured proprietary format as may be used by QT 601). Similarly, DM API 604 may support instructions that may be used to communicate data requests to DM 660 and formats of data received from data store 610 via DM 660.

A user may interact with QT 601 via a UI 642 of client device 102. UI 642 may support any suitable types of user inputs, e.g., content from one or more UI elements, speech inputs (captured by a microphone), text inputs (entered using a keyboard, touchscreen, or any pointing device), camera (e.g., for recognition of sign language), and/or the like, or any combination thereof. UI 642 may further support any suitable types of outputs, e.g., speech outputs (via one or more speaker), text, graphics, and/or sign language outputs (e.g., displayed via any suitable screen), file for a word editing application, and/or the like, or any combination thereof. In some embodiments, UI 642 may be a web-based UI (e.g., a web browser-supported interface), a mobile application-supported UI, or any combination thereof. UI 642 may include selectable items. In some embodiments, UI 642 may allow a user to select from multiple (e.g., specialized in particular knowledge areas) generative models 620. UI 642 may allow the user to provide consent for QT 601 and/or generative model 620 to access user data previously stored in data store 610 (and/or any other memory device), process and/or store new data received from the user, and the like. UI 642 may allow the user to withhold consent to provide access to user data to QT 601 and/or generative model 620. In some embodiments, user inputs entered via UI 642 may be communicated to QT 501 via a user API 644. In some embodiments, UI 642 and user API 644 may be located on client device 102 that the user is using to QT 601. For example, an API package with user API 644 and/or user interface 642 may be downloaded to client device 102. The downloaded API package may be used to install user API 644 and/or user interface 642 to enable the user to have two-way communication with QT 601.

QT 601 may include a user query analyzer 603 to support various operations of this disclosure. For example, user query analyzer 603 may receive a user input, e.g., user query, and generate one or more intermediate queries to generative model 620 to determine what type of user data GM 620 might need to successfully respond to user input. Upon receiving a response from GM 620, user query analyzer 603 may analyze the response, form a request for relevant contextual data for DM 660, which may then supply such data. User query analyzer 603 may then generate a final query to GM 620 that includes the original user query and the contextual data received from DM 660. In some embodiments, user query analyzer 603 may itself include a lightweight generative model that may process the intermediate query (ies) and determine what type of contextual data may have to be provided to GM 620 together with the original user query to ensure a meaningful response from GM 620.

QT 601 may include (or may have access to) instructions stored on one or more tangible, machine-readable storage media of server machine 630 and executable by one or more processing devices of server machine 630. In one embodiment, QT 601 may be implemented on a single machine (e.g., as depicted in FIG. 6). In some embodiments, QT 601 may be a combination of a client component and a server component. In some embodiments QT 601 may be executed entirely on the client device(s) 102. Alternatively, some portion of QT 601 may be executed on a client computing device while another portion of QT 601 may be executed on server machine 630.

Inference and Training Logic

Figure 7A:
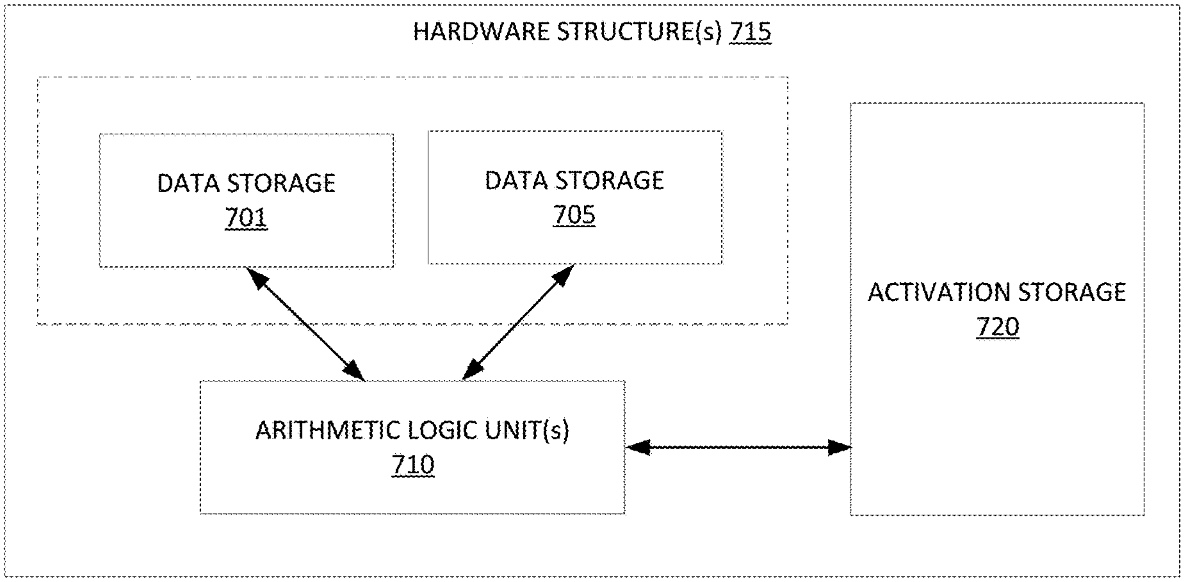
FIG. 7A illustrates inference and/or training logic, according to at least one embodiment.

FIG. 7A illustrates hardware structures 715 for inference and/or training logic used to perform inferencing and/or training operations associated with one or more embodiments. Details regarding hardware structures 715 and the inference and/or training logic are provided below in conjunction with FIGS. 7A and/or 7B.

In at least one embodiment, hardware structures 715 for inference and/or training logic may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic may include, or be coupled to code and/or data storage 701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, hardware structures 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic may include, or be coupled to code and/or data storage 705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (e.g., Flash memory), or other storage. In at least one embodiment, choice of whether code and/or data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, hardware structures 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or code and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALUs 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, hardware structures 715 illustrated in FIG. 7A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, hardware structures 715 illustrated in FIG. 7A may be used in conjunction with central processing unit ("CPU") hardware, graphics processing unit ("GPU") hardware or other hardware, such as field programmable gate arrays ("FPGAs").

Figure 7B:
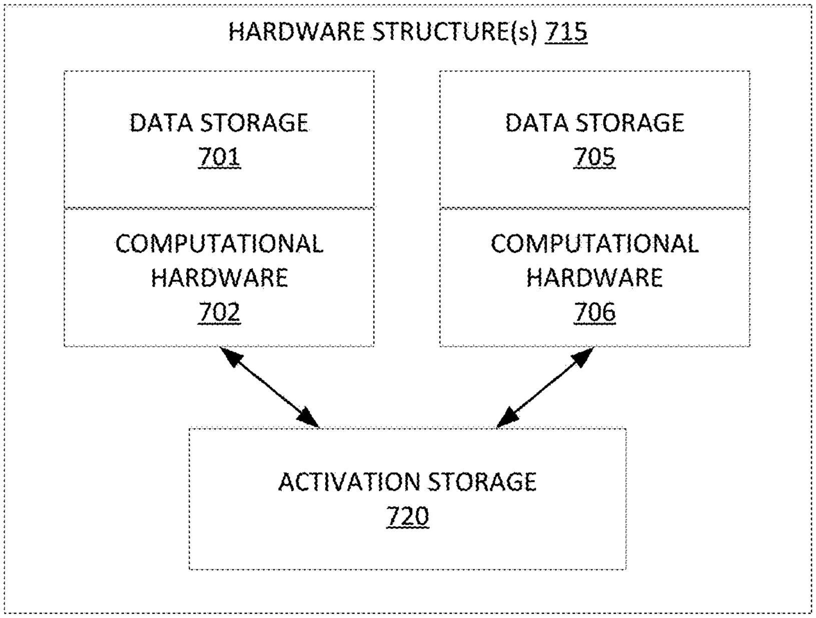
FIG. 7B illustrates inference and/or training logic, according to at least one embodiment.

FIG. 7B illustrates hardware structures 715, according to at least one or more embodiments. In at least one embodiment, hardware structures 715 may include, without limitation, hardware logic in which computational resources are dedicated or otherwise exclusively used in conjunction with weight values or other information corresponding to one or more layers of neurons within a neural network. In at least one embodiment, hardware structures 715 illustrated in FIG. 7B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, hardware structures 715 illustrated in FIG. 7B may be used in conjunction with central processing unit (CPU) hardware, graphics processing unit (GPU) hardware or other hardware, such as field programmable gate arrays (FPGAs). In at least one embodiment, hardware structures 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in hardware structures 715.

Data Center

Figure 8:
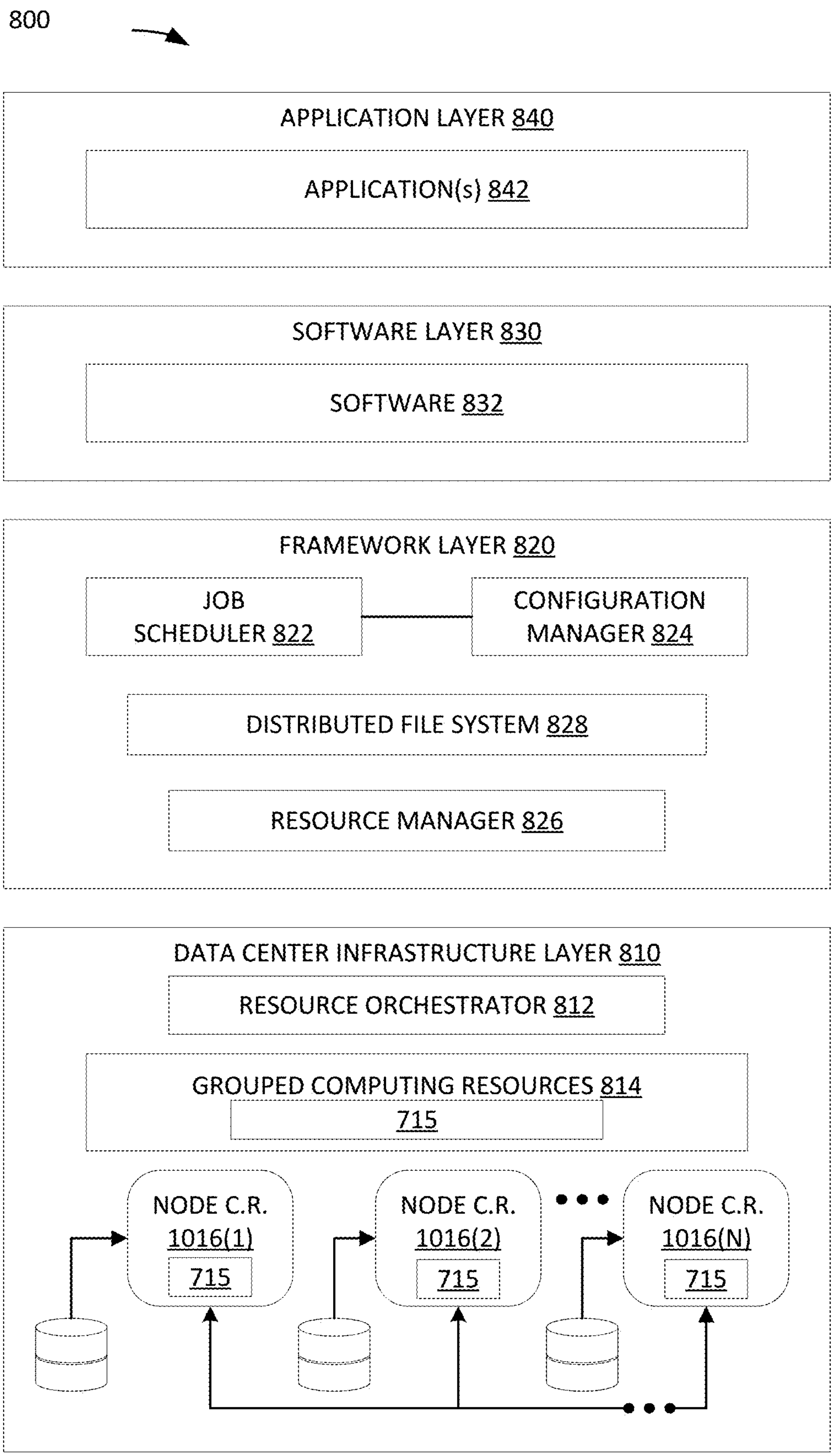
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may utilize distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underutilized and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Hardware structures 715 are used to perform inferencing and/or training operations associated with one or more embodiments. Details regarding hardware structures 715 are provided herein in conjunction with FIGS. 7A and/or 7B. In at least one embodiment, inference and/or training logic may be used in system FIG. 8 for inferencing or predicting operations based, at least in part, on weight parameters calculated using neural network training operations, neural network functions and/or architectures, or neural network use cases described herein.

Such components can be used to generate synthetic data imitating failure cases in a network training process, which can help to improve performance of the network while limiting the amount of synthetic data to avoid overfitting.

Computer Systems

Figure 9:
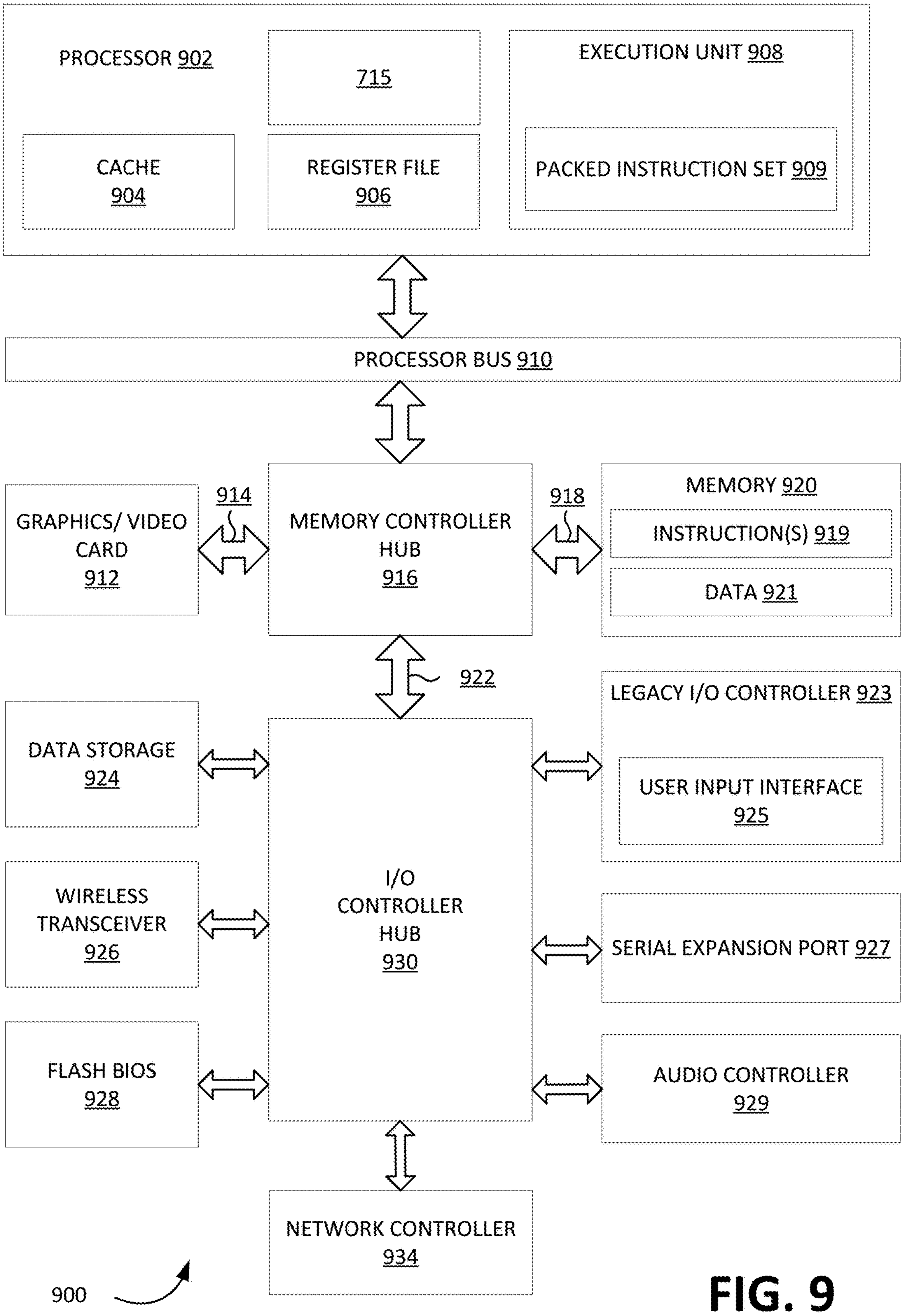
FIG. 9 illustrates a computer system, according to at least one embodiment.

FIG. 9 is a block diagram illustrating an exemplary computer system, which may be a system with interconnected devices and components, a system-on-a-chip (SOC) or some combination thereof 900 formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interfaces 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips," whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

Hardware structures 715 are used to perform inferencing and/or training operations associated with one or more embodiments. Details regarding inference and/or training logic are provided herein in conjunction with FIGS. 7A and/or 7B. In at least one embodiment, inference and/or training logic may be used in system FIG. 9 for inferencing or predicting operations based, at least in part, on weight parameters calculated using neural network training operations, neural network functions and/or architectures, or neural network use cases described herein.

Such components can be used to generate synthetic data imitating failure cases in a network training process, which can help to improve performance of the network while limiting the amount of synthetic data to avoid overfitting.

Figure 10:
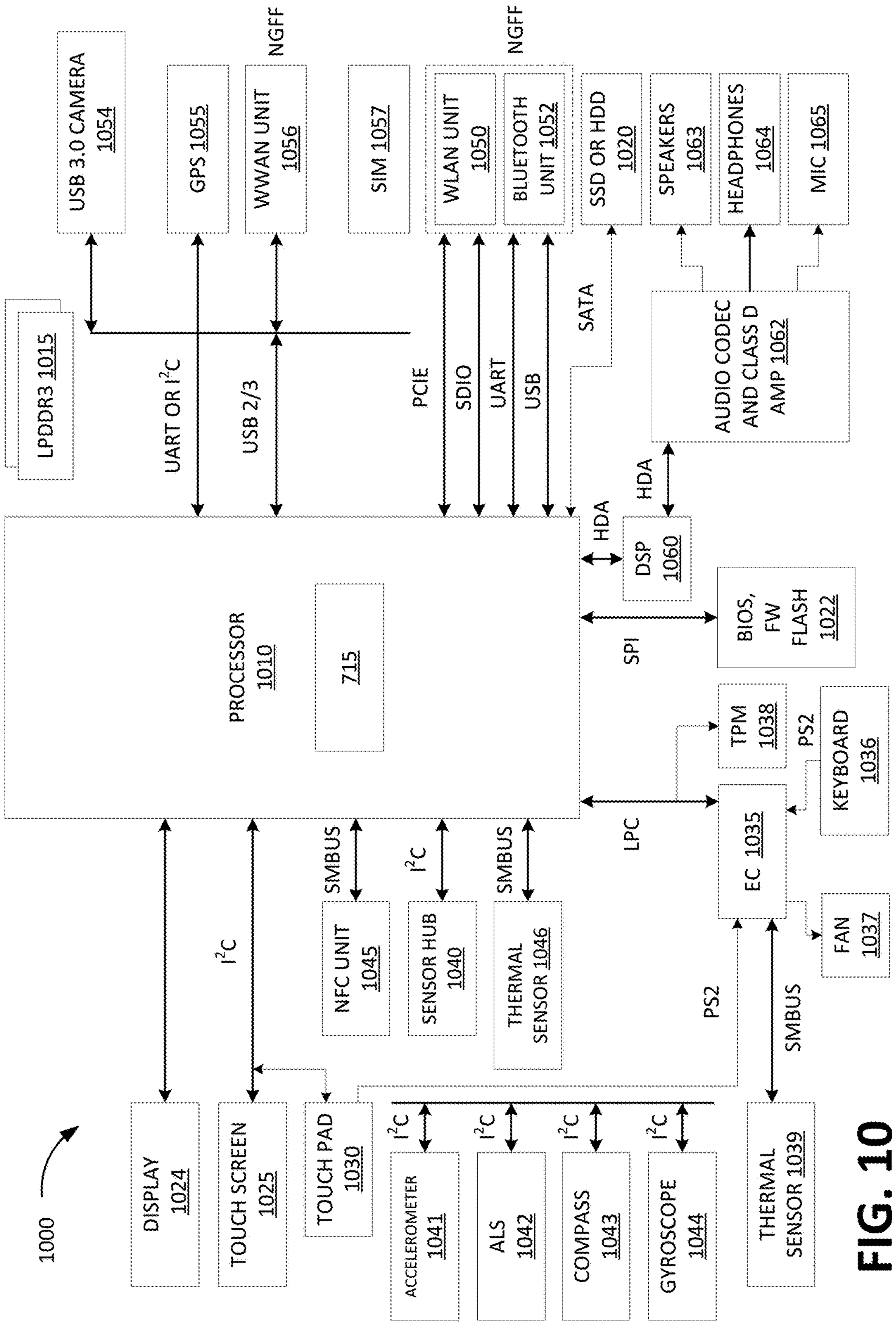
FIG. 10 illustrates a computer system, according to at least one embodiment.

FIG. 10 is a block diagram illustrating an electronic device 1000 for utilizing a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, system 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates a system, which includes interconnected hardware devices or "chips," whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1046, and a touch pad 1030 may be communicatively coupled to EC 1035. In at least one embodiment, speaker 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1064 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic are used to perform inferencing and/or training operations associated with one or more embodiments. Details regarding inference and/or training logic are provided herein conjunction with FIGS. 7A and/or 7B. In at least one embodiment, inference and/or training logic may be used in system FIG. 10 for inferencing or predicting operations based, at least in part, on weight parameters calculated using neural network training operations, neural network functions and/or architectures, or neural network use cases described herein.

Such components can be used to generate synthetic data imitating failure cases in a network training process, which can help to improve performance of the network while limiting the amount of synthetic data to avoid overfitting.

Figure 11:
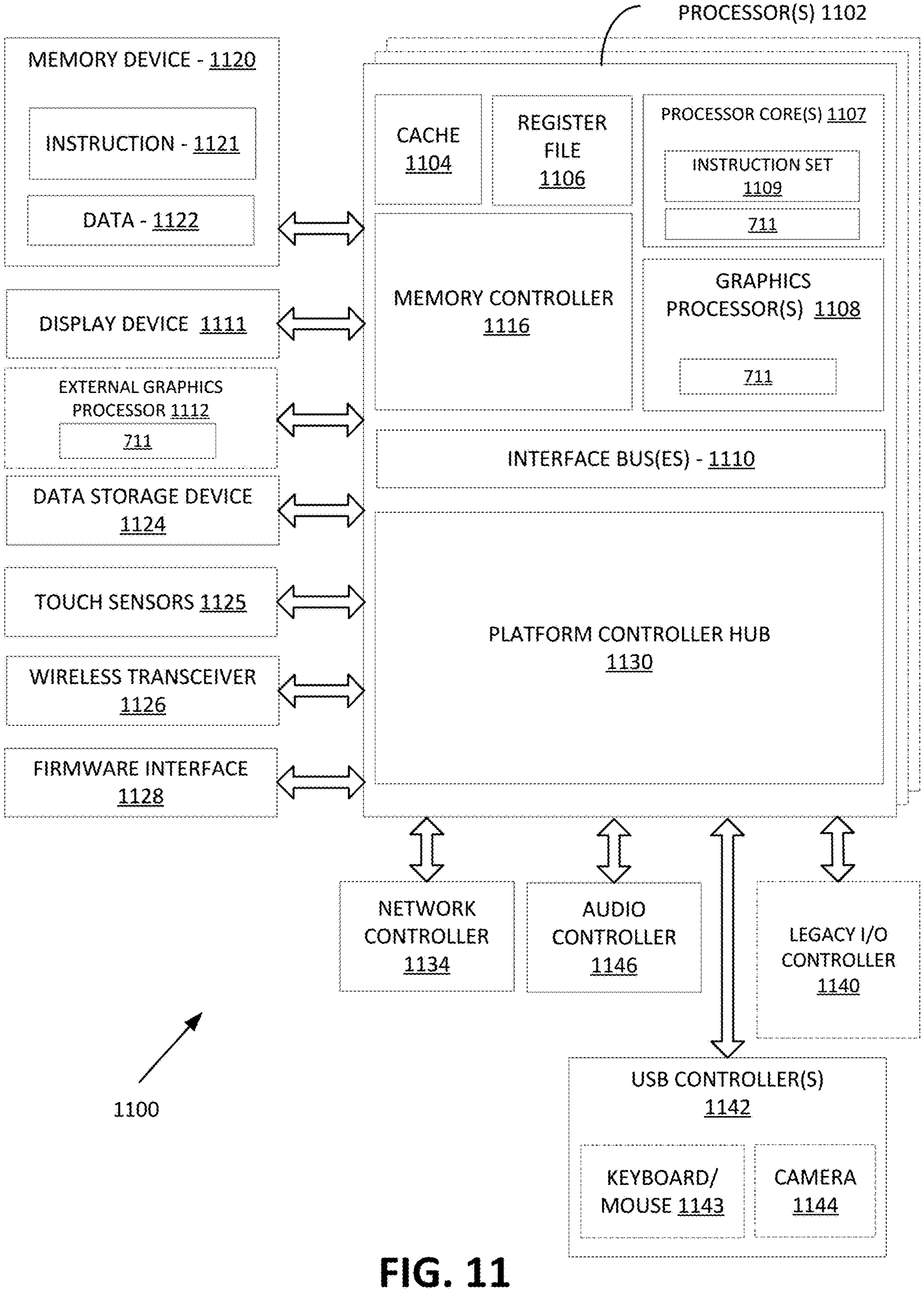
FIG. 11 illustrates at least portions of a graphics processor, according to one or more embodiments.

FIG. 11 is a block diagram of a processing system, according to at least one embodiment. In at least one embodiment, system 1100 includes one or more processors 1102 and one or more graphics processors 1108, and may be a single processor desktop system, a multiprocessor workstation system, or a server system having a large number of processors 1102 or processor cores 1107. In at least one embodiment, system 1100 is a processing platform incorporated within a system-on-a-chip (SoC) integrated circuit for use in mobile, handheld, or embedded devices.

In at least one embodiment, system 1100 can include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, processing system 1100 can also include, couple with, or be integrated within a wearable device, such as a smart watch wearable device, smart eyewear device, augmented reality device, or virtual reality device. In at least one embodiment, processing system 1100 is a television or set top box device having one or more processors 1102 and a graphical interface generated by one or more graphics processors 1108.

In at least one embodiment, one or more processors 1102 each include one or more processor cores 1107 to process instructions which, when executed, perform operations for system and user software. In at least one embodiment, each of one or more processor cores 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor cores 1107 may each process a different instruction set 1109, which may include instructions to facilitate emulation of other instruction sets. In at least one embodiment, processor core 1107 may also include other processing devices, such a Digital Signal Processor (DSP).

In at least one embodiment, processor 1102 includes cache memory 1104. In at least one embodiment, processor 1102 can have a single internal cache or multiple levels of internal cache. In at least one embodiment, cache memory is shared among various components of processor 1102. In at least one embodiment, processor 1102 also uses an external cache (e.g., a Level-3 (L3) cache or Last Level Cache (LLC)) (not shown), which may be shared among processor cores 1107 using known cache coherency techniques. In at least one embodiment, register file 1106 is additionally included in processor 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor 1102 and other components in system 1100. In at least one embodiment, interface bus 1110, in one embodiment, can be a processor bus, such as a version of a Direct Media Interface (DMI) bus. In at least one embodiment, interface 1110 is not limited to a DMI bus, and may include one or more Peripheral Component Interconnect buses (e.g., PCI, PCI Express), memory busses, or other types of interface busses. In at least one embodiment processor(s) 1102 include an integrated memory controller 1116 and a platform controller hub 1130. In at least one embodiment, memory controller 1116 facilitates communication between a memory device and other components of system 1100, while platform controller hub (PCH) 1130 provides connections to I/O devices via a local I/O bus.

In at least one embodiment, memory device 1120 can be a dynamic random access memory (DRAM) device, a static random access memory (SRAM) device, flash memory device, phase-change memory device, or some other memory device having suitable performance to serve as process memory. In at least one embodiment memory device 1120 can operate as system memory for system 1100, to store data 1122 and instructions 1121 for use when one or more processors 1102 executes an application or process. In at least one embodiment, memory controller 1116 also couples with an optional external graphics processor 1112, which may communicate with one or more graphics processors 1108 in processors 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (e.g., DisplayPort, etc.). In at least one embodiment, display device 1111 can include a head mounted display (HMD) such as a stereoscopic display device for use in virtual reality (VR) applications or augmented reality (AR) applications.

In at least one embodiment, platform controller hub 1130 enables peripherals to connect to memory device 1120 and processor 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as a Peripheral Component Interconnect bus (e.g., PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution (LTE) transceiver. In at least one embodiment, firmware interface 1128 enables communication with system firmware, and can be, for example, a unified extensible firmware interface (UEFI). In at least one embodiment, network controller 1134 can enable a network connection to a wired network. In at least one embodiment, a high-performance network controller (not shown) couples with interface bus 1110. In at least one embodiment, audio controller 1146 is a multi-channel high definition audio controller. In at least one embodiment, system 1100 includes an optional legacy I/O controller 1140 for coupling legacy (e.g., Personal System 2 (PS/2)) devices to system. In at least one embodiment, platform controller hub 1130 can also connect to one or more Universal Serial Bus (USB) controllers 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, system 1100 can include an external memory controller 1116 and platform controller hub 1130, which may be configured as a memory controller hub and peripheral controller hub within a system chipset that is in communication with processor(s) 1102.

Inference and/or training logic are used to perform inferencing and/or training operations associated with one or more embodiments. Details regarding inference and/or training logic are provided herein in conjunction with FIGS. 7A and/or 7B. In at least one embodiment portions or all of inference and/or training logic may be incorporated into graphics processor 1500. For example, in at least one embodiment, training and/or inferencing techniques described herein may use one or more of ALUs embodied in a graphics processor. Moreover, in at least one embodiment, inferencing and/or training operations described herein may be done using logic other than logic described with respect to FIG. 7A or 7B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used to generate synthetic data imitating failure cases in a network training process, which can help to improve performance of the network while limiting the amount of synthetic data to avoid overfitting.

Figure 12:
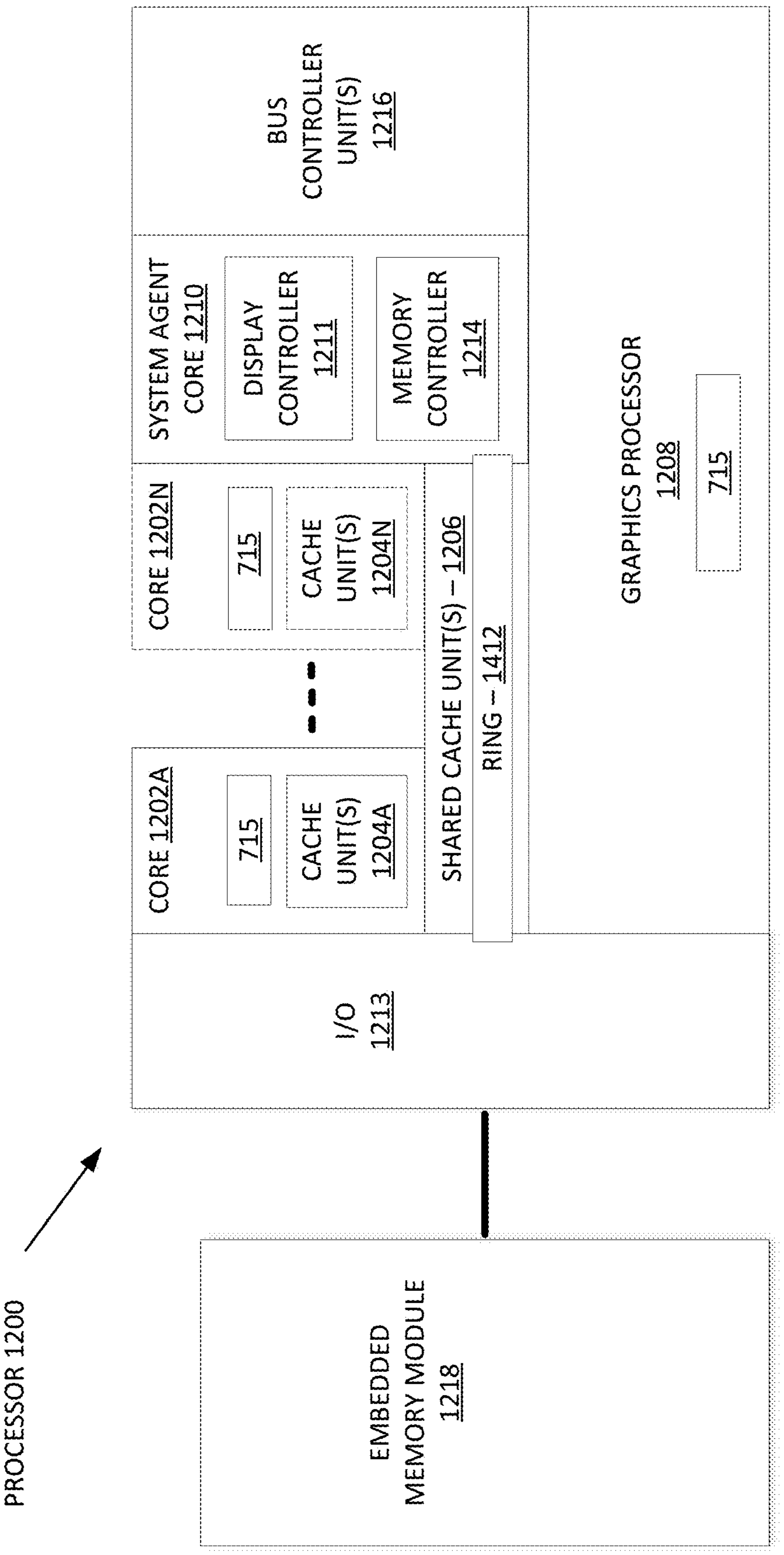
FIG. 12 illustrates at least portions of a graphics processor, according to one or more embodiments.

FIG. 12 is a block diagram of a processor 1200 having one or more processor cores 1202A-1202N, an integrated memory controller 1214, and an integrated graphics processor 1208, according to at least one embodiment. In at least one embodiment, processor 1200 can include additional cores up to and including additional core 1202N represented by dashed lined boxes. In at least one embodiment, each of processor cores 1202A-1202N includes one or more internal cache units 1204A-1204N. In at least one embodiment, each processor core also has access to one or more shared cached units 1206.

In at least one embodiment, internal cache units 1204A-1204N and shared cache units 1206 represent a cache memory hierarchy within processor 1200. In at least one embodiment, cache memory units 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1206 and 1204A-1204N.

In at least one embodiment, processor 1200 may also include a set of one or more bus controller units 1216 and a system agent core 1210. In at least one embodiment, one or more bus controller units 1216 manage a set of peripheral buses, such as one or more PCI or PCI express busses. In at least one embodiment, system agent core 1210 provides management functionality for various processor components. In at least one embodiment, system agent core 1210 includes one or more integrated memory controllers 1214 to manage access to various external memory devices (not shown).

In at least one embodiment, one or more of processor cores 1202A-1202N include support for simultaneous multi-threading. In at least one embodiment, system agent core 1210 includes components for coordinating and operating cores 1202A-1202N during multi-threaded processing. In at least one embodiment, system agent core 1210 may additionally include a power control unit (PCU), which includes logic and components to regulate one or more power states of processor cores 1202A-1202N and graphics processor 1208.

In at least one embodiment, processor 1200 additionally includes graphics processor 1208 to execute graphics processing operations. In at least one embodiment, graphics processor 1208 couples with shared cache units 1206, and system agent core 1210, including one or more integrated memory controllers 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with ring interconnect 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor cores 1202A-1202N and graphics processor 1208 use embedded memory modules 1218 as a shared Last Level Cache.

In at least one embodiment, processor cores 1202A-1202N are homogenous cores executing a common instruction set architecture. In at least one embodiment, processor cores 1202A-1202N are heterogeneous in terms of instruction set architecture (ISA), where one or more of processor cores 1202A-1202N execute a common instruction set, while one or more other cores of processor cores 1202A-1202N executes a subset of a common instruction set or a different instruction set. In at least one embodiment, processor cores 1202A-1202N are heterogeneous in terms of microarchitecture, where one or more cores having a relatively higher power consumption couple with one or more power cores having a lower power consumption. In at least one embodiment, processor 1200 can be implemented on one or more chips or as a SoC integrated circuit.

Inference and/or training logic are used to perform inferencing and/or training operations associated with one or more embodiments. Details regarding inference and/or training logic are provided herein in conjunction with FIGS. 7A and/or 7B. In at least one embodiment portions or all of inference and/or training logic may be incorporated into processor 1200. For example, in at least one embodiment, training and/or inferencing techniques described herein may use one or more of ALUs embodied in graphics processor 1512, graphics core(s) 1202A-1202N, or other components in FIG. 12. Moreover, in at least one embodiment, inferencing and/or training operations described herein may be done using logic other than logic described with respect to FIG. 7A or 7B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Such components can be used to generate synthetic data imitating failure cases in a network training process, which can help to improve performance of the network while limiting the amount of synthetic data to avoid overfitting.

Virtualized Computing Platform

Figure 13:
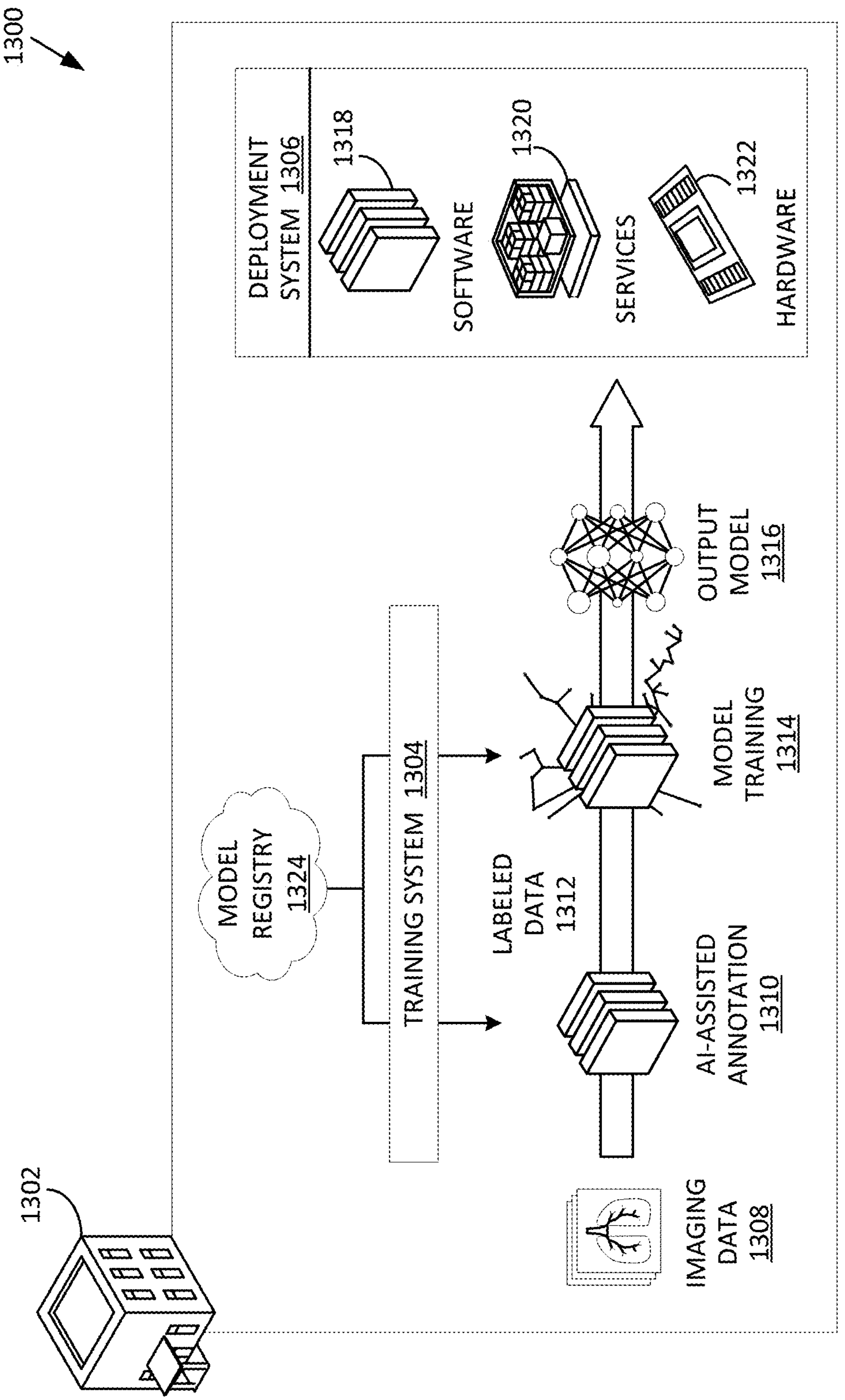
FIG. 13 is an example data flow diagram for an advanced computing pipeline, in accordance with at least one embodiment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facilities 1302. Process 1300 may be executed within a training system 1304 and/or a deployment system 1306. In at least one embodiment, training system 1304 may be used to perform training, deployment, and implementation of machine learning models (e.g., neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility 1302. In at least one embodiment, one or more applications in a pipeline may use or call upon services (e.g., inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility 1302 using data 1308 (such as imaging data) generated at facility 1302 (and stored on one or more picture archiving and communication system (PACS) servers at facility 1302), may be trained using imaging or sequencing data 1308 from another facility (ies), or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage (e.g., cloud 1426 of FIG. 14) compatible application programming interface (API) from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1404 (FIG. 14) may include a scenario where facility 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (e.g., convolutional neural networks (CNNs)) that may be trained to generate annotations corresponding to certain types of imaging data 1308 (e.g., from certain devices). In at least one embodiment, AI-assisted annotations 1310 may then be used directly, or may be adjusted or fine-tuned using an annotation tool to generate ground truth data. In at least one embodiment, AI-assisted annotations 1310, labeled clinic data 1312, or a combination thereof may be used as ground truth data for training a machine learning model. In at least one embodiment, a trained machine learning model may be referred to as output model 1316, and may be used by deployment system 1306, as described herein.

In at least one embodiment, training pipeline 1404 (FIG. 14) may include a scenario where facility 1302 needs a machine learning model for use in performing one or more processing tasks for one or more applications in deployment system 1306, but facility 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility 1302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model 1316—and may be used in deployment system 1306 to perform one or more processing tasks for one or more applications of a deployment system.

In at least one embodiment, training pipeline 1404 (FIG. 14), a scenario may include facility 1302 requiring a machine learning model for use in performing one or more processing tasks for one or more applications in deployment system 1306, but facility 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314—e.g., AI-assisted annotations 1310, labeled clinic data 1312, or a combination thereof—may be used as ground truth data for retraining or updating a machine learning model. In at least one embodiment, a trained machine learning model may be referred to as output model 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility 1302 after processing through a pipeline (e.g., to convert outputs back to a usable data type). In at least one embodiment, a combination of containers within software 1318 (e.g., that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (e.g., imaging data 1308) in a specific format in response to an inference request (e.g., a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1320 as a system (e.g., system 1400 of FIG. 14). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1400 (e.g., for accuracy), an application may be available in a container registry for selection and/or implementation by a user to perform one or more processing tasks with respect to data at a facility (e.g., a second facility) of a user.

Figure 14:
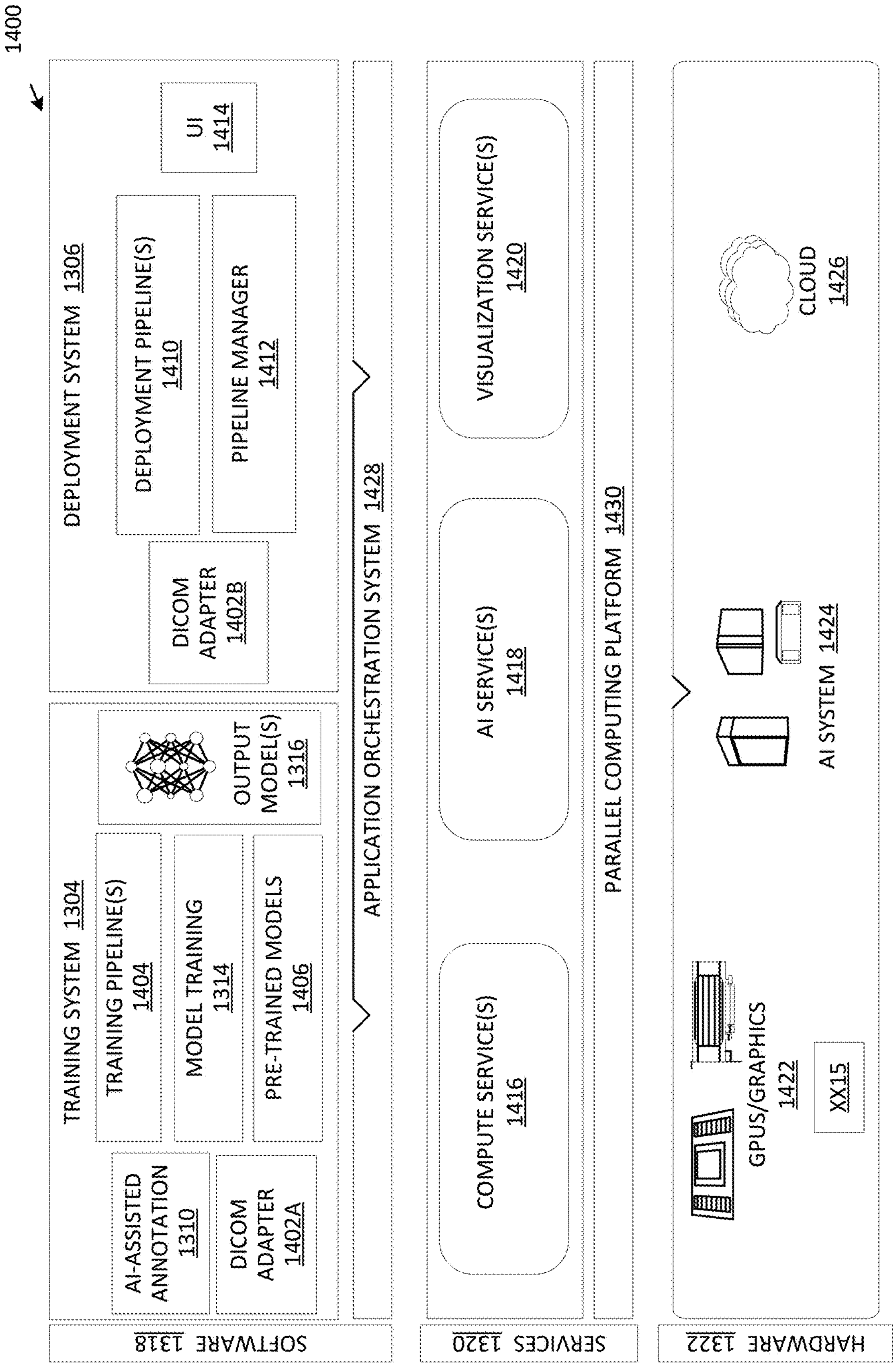
FIG. 14 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 1400 of FIG. 14). In at least one embodiment, completed and validated applications or containers may be stored in a container registry and associated machine learning models may be stored in model registry 1324. In at least one embodiment, a requesting entity-who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (e.g., a cloud) to perform processing of data processing pipeline. In at least one embodiment, processing by deployment system 1306 may include referencing selected elements (e.g., applications, containers, models, etc.) from a container registry and/or model registry 1324. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, artificial intelligence (AI) services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (e.g., using a parallel computing platform 1430 (FIG. 14)). In at least one embodiment, rather than each application that shares a same functionality offered by a service 1320 being required to have a respective instance of service 1320, service 1320 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects-such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1320 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (e.g., an AI supercomputer, such as NVIDIA's DGX), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (e.g., at facility 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (e.g., hardware and software combination of NVIDIA's DGX System). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (e.g., training system 1304 and/or deployment system 1306) may be implemented in a cloud computing environment (e.g., using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus (ses), wireless data protocols (Wi-Fi), wired data protocols (e.g., Ethernet), etc.

In at least one embodiment, training system 1304 may execute training pipelines 1404, similar to those described herein with respect to FIG. 13. In at least one embodiment, where one or more machine learning models are to be used in deployment pipelines 1410 by deployment system 1306, training pipelines 1404 may be used to train or retrain one or more (e.g. pre-trained) models, and/or implement one or more of pre-trained models 1406 (e.g., without a need for retraining or updating). In at least one embodiment, as a result of training pipelines 1404, output model(s) 1316 may be generated. In at least one embodiment, training pipelines 1404 may include any number of processing steps, such as but not limited to imaging data (or other input data) conversion or adaption In at least one embodiment, for different machine learning models used by deployment system 1306, different training pipelines 1404 may be used. In at least one embodiment, training pipeline 1404 similar to a first example described with respect to FIG. 13 may be used for a first machine learning model, training pipeline 1404 similar to a second example described with respect to FIG. 13 may be used for a second machine learning model, and training pipeline 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained model(s) 1406 may include any types of machine learning models depending on implementation or embodiment. In at least one embodiment, and without limitation, machine learning models used by system 1400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 15A:
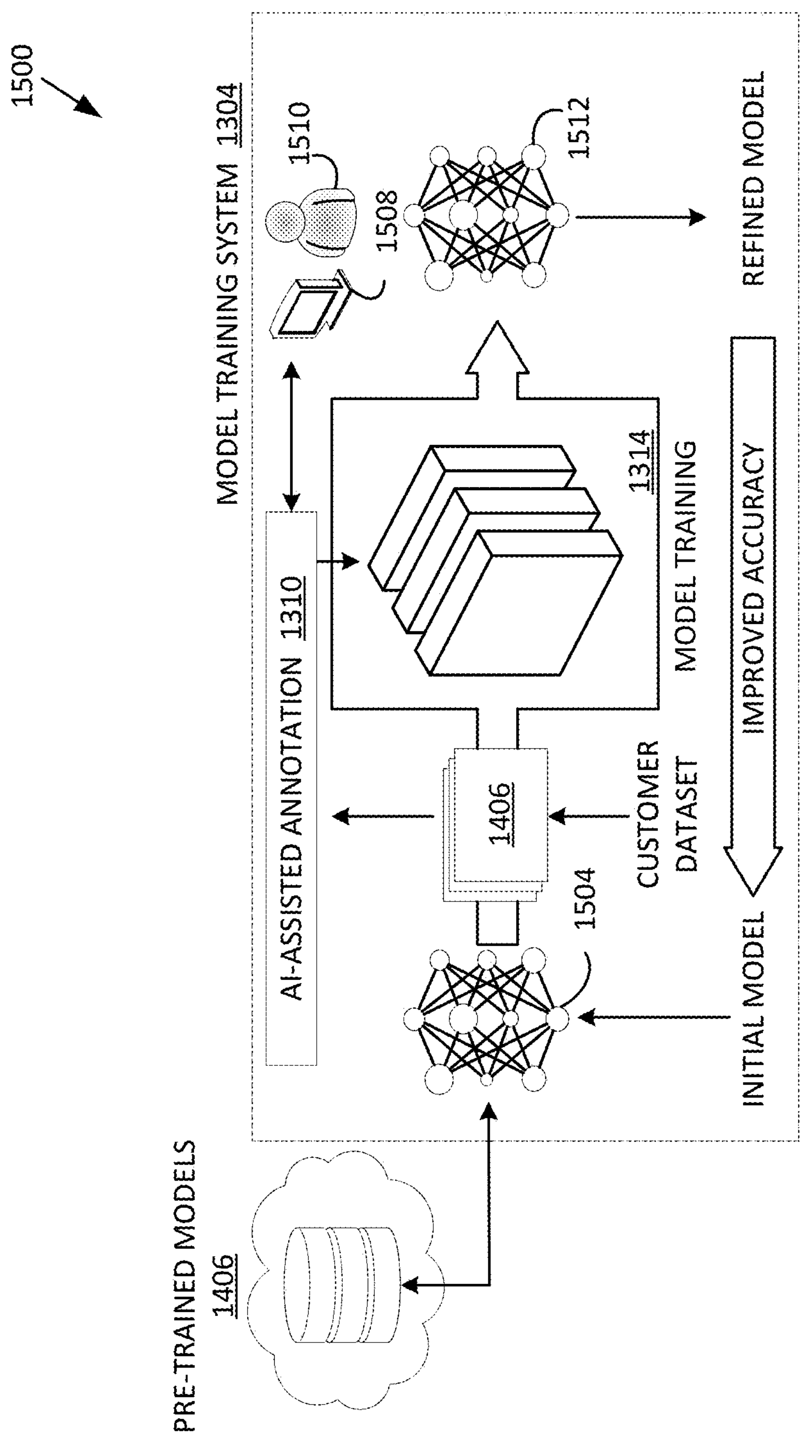
FIGS. 15A and 15B illustrate a data flow diagram for a process to train a machine learning model, as well as client-server architecture to enhance annotation tools with pre-trained annotation models, in accordance with at least one embodiment.
Figure 15B:
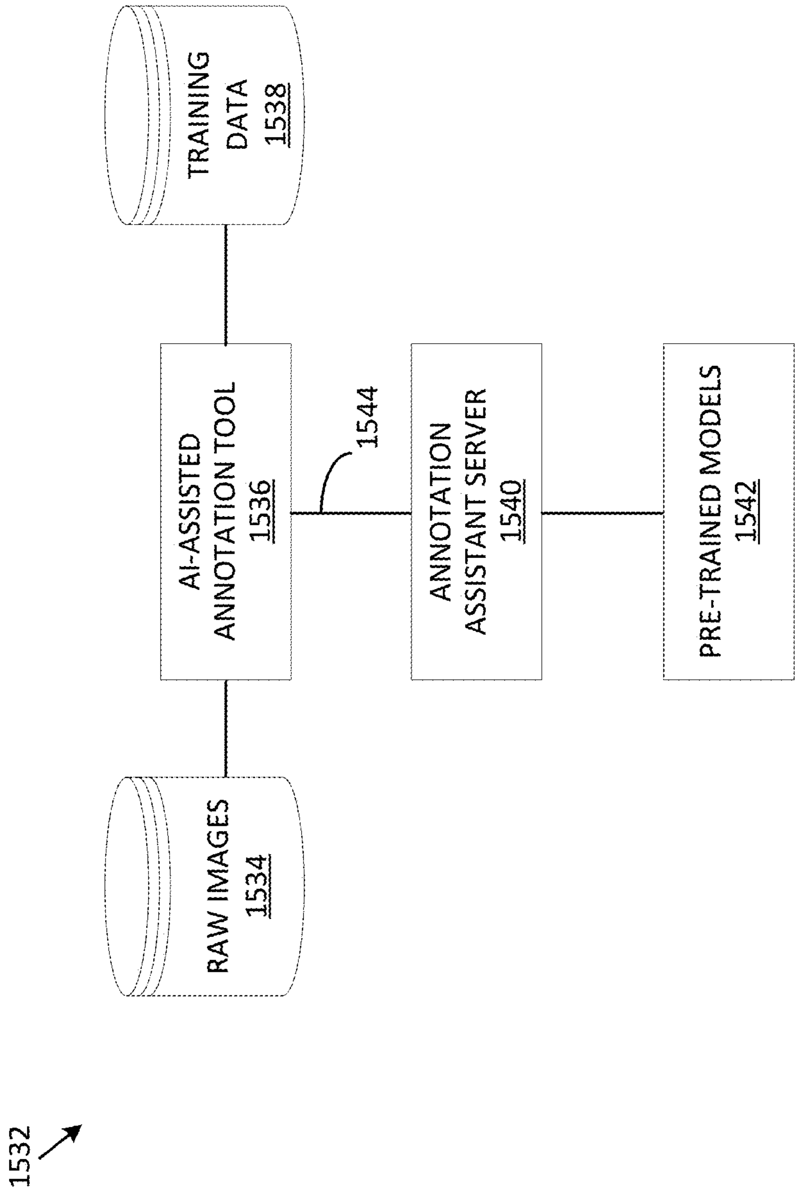

In at least one embodiment, training pipelines 1404 may include AI-assisted annotation, as described in more detail herein with respect to at least FIG. 15B. In at least one embodiment, labeled data 1312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation may be performed as part of deployment pipelines 1410; either in addition to, or in lieu of AI-assisted annotation included in training pipelines 1404. In at least one embodiment, system 1400 may include a multi-layer platform that may include a software layer (e.g., software 1318) of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner.

In at least one embodiment, deployment system 1306 may execute deployment pipelines 1410. In at least one embodiment, deployment pipelines 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1410 depending on information desired from data generated by a device. In at least one embodiment, where detections of anomalies are desired from an MRI machine, there may be a first deployment pipeline 1410, and where image enhancement is desired from output of an MRI machine, there may be a second deployment pipeline 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 1322—deployment pipelines 1410 may be even more user friendly, provide for easier integration, and produce more accurate, efficient, and timely results.

In at least one embodiment, deployment system 1306 may include a user interface 1414 (e.g., a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, user interface 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to service 1320, and/or from application or service to hardware 1322. In at least one embodiment, although illustrated as included in software 1318, this is not intended to be limiting, and in some examples (e.g., as illustrated in FIG. 12*cc*) pipeline manager 1412 may be included in services 1320. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QOS), urgency of need for data outputs (e.g., to determine whether to execute real-time processing or delayed processing), etc.

In at least one embodiment, services 1320 leveraged by and shared by applications or containers in deployment system 1306 may include compute services 1416, AI services 1418, visualization services 1420, and/or other service types. In at least one embodiment, applications may call (e.g., execute) one or more of services 1320 to perform processing operations for an application. In at least one embodiment, compute services 1416 may be leveraged by applications to perform super-computing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may enable general purpose computing on GPUs (GPGPU) (e.g., GPUs 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1418 may be leveraged to perform inferencing services for executing machine learning model(s) associated with applications (e.g., tasked with performing one or more processing tasks of an application). In at least one embodiment, AI services 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline(s) 1410 may use one or more of output models 1316 from training system 1304 and/or other models of applications to perform inference on imaging data. In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (e.g., services 1320 and/or hardware 1322) based on priority paths for different inferencing tasks of AI services 1418.

In at least one embodiment, shared storage may be mounted to AI services 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (e.g., for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a software development kit (SDK), and robust transport may be provided through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization services 1420 may be leveraged to generate visualizations for viewing outputs of applications and/or deployment pipeline(s) 1410. In at least one embodiment, GPUs 1422 may be leveraged by visualization services 1420 to generate visualizations. In at least one embodiment, rendering effects, such as ray-tracing, may be implemented by visualization services 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1420 may include an internal visualizer, cinematics, and/or other rendering or image processing capabilities or functionality (e.g., ray tracing, rasterization, internal optics, etc.).

In at least one embodiment, hardware 1322 may include GPUs 1422, AI system 1424, cloud 1426, and/or any other hardware used for executing training system 1304 and/or deployment system 1306. In at least one embodiment, GPUs 1422 (e.g., NVIDIA's TESLA and/or QUADRO GPUs) may include any number of GPUs that may be used for executing processing tasks of compute services 1416, AI services 1418, visualization services 1420, other services, and/or any of features or functionality of software 1318. For example, with respect to AI services 1418, GPUs 1422 may be used to perform pre-processing on imaging data (or other data types used by machine learning models), post-processing on outputs of machine learning models, and/or to perform inferencing (e.g., to execute machine learning models). In at least one embodiment, cloud 1426, AI system 1424, and/or other components of system 1400 may use GPUs 1422. In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (e.g., a super-computer or an HPC) configured for inferencing, deep learning, machine learning, and/or other artificial intelligence tasks. In at least one embodiment, AI system 1424 (e.g., NVIDIA's DGX) may include GPU-optimized software (e.g., a software stack) that may be executed using a plurality of GPUs 1422, in addition to CPUs, RAM, storage, and/or other components, features, or functionality. In at least one embodiment, one or more AI systems 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. In at least one embodiment, cloud 1426 may include an AI system(s) 1424 for performing one or more of AI-based tasks of system 1400 (e.g., as a hardware abstraction and scaling platform). In at least one embodiment, cloud 1426 may integrate with application orchestration system 1428 leveraging multiple GPUs to enable seamless scaling and load balancing between and among applications and services 1320. In at least one embodiment, cloud 1426 may tasked with executing at least some of services 1320 of system 1400, including compute services 1416, AI services 1418, and/or visualization services 1420, as described herein. In at least one embodiment, cloud 1426 may perform small and large batch inference (e.g., executing NVIDIA's TENSOR RT), provide an accelerated parallel computing API and platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

FIG. 15A illustrates a data flow diagram for a process 1500 to train, retrain, or update a machine learning model, in accordance with at least one embodiment. In at least one embodiment, process 1500 may be executed using, as a non-limiting example, system 1400 of FIG. 14. In at least one embodiment, process 1500 may leverage services 1320 and/or hardware 1322 of system 1400, as described herein. In at least one embodiment, refined models 1512 generated by process 1500 may be executed by deployment system 1306 for one or more containerized applications in deployment pipelines 1410.

In at least one embodiment, model training 1314 may include retraining or updating an initial model 1504 (e.g., a pre-trained model) using new training data (e.g., new input data, such as customer dataset 1506, and/or new ground truth data associated with input data). In at least one embodiment, to retrain, or update, initial model 1504, output or loss layer(s) of initial model 1504 may be reset, or deleted, and/or replaced with an updated or new output or loss layer(s). In at least one embodiment, initial model 1504 may have previously fine-tuned parameters (e.g., weights and/or biases) that remain from prior training, so training or retraining 1314 may not take as long or require as much processing as training a model from scratch. In at least one embodiment, during model training 1314, by having reset or replaced output or loss layer(s) of initial model 1504, parameters may be updated and re-tuned for a new data set based on loss calculations associated with accuracy of output or loss layer(s) at generating predictions on new, customer dataset 1506 (e.g., image data 1308 of FIG. 13).

In at least one embodiment, pre-trained models 1406 may be stored in a data store, or registry (e.g., model registry 1324 of FIG. 13). In at least one embodiment, pre-trained models 1406 may have been trained, at least in part, at one or more facilities other than a facility executing process 1500. In at least one embodiment, to protect privacy and rights of patients, subjects, or clients of different facilities, pre-trained models 1406 may have been trained, on-premises, using customer or patient data generated on-premises. In at least one embodiment, pre-trained models 1406 may be trained using cloud 1426 and/or other hardware 1322, but confidential, privacy protected patient data may not be transferred to, used by, or accessible to any components of cloud 1426 (or other off premise hardware). In at least one embodiment, where a pre-trained model 1406 is trained at using patient data from more than one facility, pre-trained model 1406 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1406 on-premise and/or off premise, such as in a datacenter or other cloud computing infrastructure.

In at least one embodiment, when selecting applications for use in deployment pipelines 1410, a user may also select machine learning models to be used for specific applications. In at least one embodiment, a user may not have a model for use, so a user may select a pre-trained model 1406 to use with an application. In at least one embodiment, pre-trained model 1406 may not be optimized for generating accurate results on customer dataset 1506 of a facility of a user (e.g., based on patient diversity, demographics, types of medical imaging devices used, etc.). In at least one embodiment, prior to deploying pre-trained model 1406 into deployment pipeline 1410 for use with an application(s), pre-trained model 1406 may be updated, retrained, and/or fine-tuned for use at a respective facility.

In at least one embodiment, a user may select pre-trained model 1406 that is to be updated, retrained, and/or fine-tuned, and pre-trained model 1406 may be referred to as initial model 1504 for training system 1304 within process 1500. In at least one embodiment, customer dataset 1506 (e.g., imaging data, genomics data, sequencing data, or other data types generated by devices at a facility) may be used to perform model training 1314 (which may include, without limitation, transfer learning) on initial model 1504 to generate refined model 1512. In at least one embodiment, ground truth data corresponding to customer dataset 1506 may be generated by training system 1304. In at least one embodiment, ground truth data may be generated, at least in part, by clinicians, scientists, doctors, practitioners, at a facility (e.g., as labeled clinic data 1312 of FIG. 13).

In at least one embodiment, AI-assisted annotation 1310 may be used in some examples to generate ground truth data. In at least one embodiment, AI-assisted annotation 1310 (e.g., implemented using an AI-assisted annotation SDK) may leverage machine learning models (e.g., neural networks) to generate suggested or predicted ground truth data for a customer dataset. In at least one embodiment, user 1510 may use annotation tools within a user interface (a graphical user interface (GUI)) on computing device 1508.

In at least one embodiment, user 1510 may interact with a GUI via computing device 1508 to edit or fine-tune (auto) annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training 1314 to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines 1410 at a facility for performing one or more processing tasks with respect to medical imaging data.

In at least one embodiment, refined model 1512 may be uploaded to pre-trained models 1406 in model registry 1324 to be selected by another facility. In at least one embodiment, his process may be completed at any number of facilities such that refined model 1512 may be further refined on new datasets any number of times to generate a more universal model.

FIG. 15B is an example illustration of a client-server architecture 1532 to enhance annotation tools with pre-trained annotation models, in accordance with at least one embodiment. In at least one embodiment, AI-assisted annotation tools 1536 may be instantiated based on a client-server architecture 1532. In at least one embodiment, annotation tools 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation 1310, a deep learning model, for example, may receive this data as input and return inference results of a segmented organ or abnormality. In at least one embodiment, pre-instantiated annotation tools, such as AI-Assisted Annotation Tool 1536B in FIG. 15B, may be enhanced by making API calls (e.g., API Call 1544) to a server, such as an Annotation Assistant Server 1540 that may include a set of pre-trained models 1542 stored in an annotation model registry, for example. In at least one embodiment, an annotation model registry may store pre-trained models 1542 (e.g., machine learning models, such as deep learning models) that are pre-trained to perform AI-assisted annotation on a particular organ or abnormality. These models may be further updated by using training pipelines 1404. In at least one embodiment, pre-installed annotation tools may be improved over time as new labeled clinic data 1312 is added.

Such components can be used to generate synthetic data imitating failure cases in a network training process, which can help to improve performance of the network while limiting the amount of synthetic data to avoid overfitting.

Autonomous Vehicle

Figure 16A:
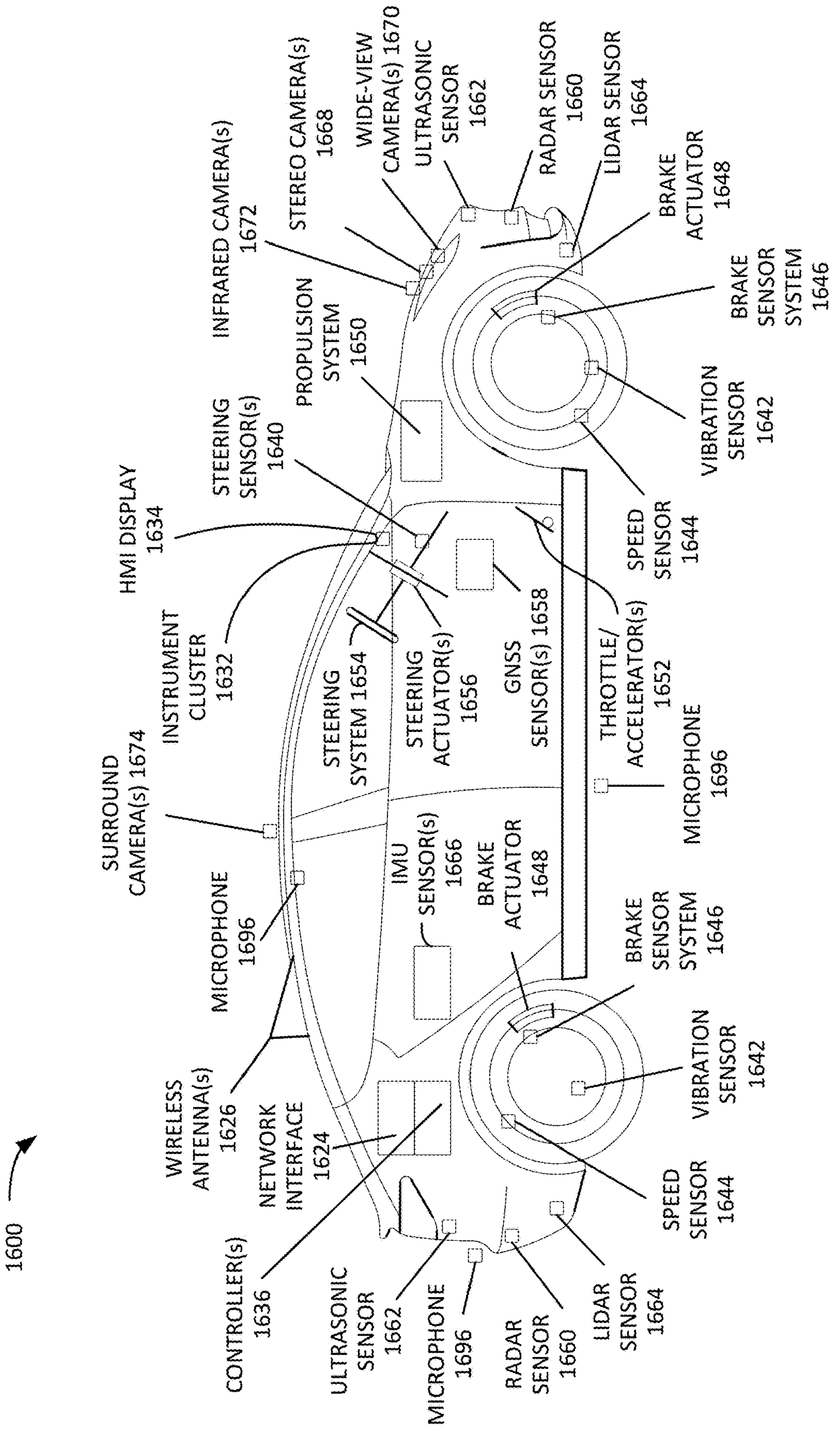
FIG. 16A illustrates an example of an autonomous vehicle, according to at least one embodiment.

FIG. 16A illustrates an example of an autonomous vehicle 1600, according to at least one embodiment. In at least one embodiment, autonomous vehicle 1600 (alternatively referred to herein as "vehicle 1600") may be, without limitation, a passenger vehicle, such as a car, a truck, a bus, and/or another type of vehicle that accommodates one or more passengers. In at least one embodiment, vehicle **1*a*00 may be a semi-tractor-trailer truck used for hauling cargo. In at least one embodiment, vehicle 1*a*00** may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In one or more embodiments, vehicle 1600 may be capable of functionality in accordance with one or more of level 1-level 5 of autonomous driving levels. For example, in at least one embodiment, vehicle 1600 may be capable of conditional automation (Level 3), high automation (Level 4), and/or full automation (Level 5), depending on embodiment.

In at least one embodiment, vehicle 1600 may include, without limitation, components such as a chassis, a vehicle body, wheels (e.g., 2, 4, 6, 8, 18, etc.), tires, axles, and other components of a vehicle. In at least one embodiment, vehicle 1600 may include, without limitation, a propulsion system 1650, such as an internal combustion engine, hybrid electric power plant, an all-electric engine, and/or another propulsion system type. In at least one embodiment, propulsion system 1650 may be connected to a drive train of vehicle 1600, which may include, without limitation, a transmission, to enable propulsion of vehicle 1600. In at least one embodiment, propulsion system 1650 may be controlled in response to receiving signals from a throttle/accelerator(s) 1652.

In at least one embodiment, a steering system 1654, which may include, without limitation, a steering wheel, is used to steer a vehicle 1600 (e.g., along a desired path or route) when a propulsion system 1650 is operating (e.g., when vehicle is in motion). In at least one embodiment, a steering system 1654 may receive signals from steering actuator(s) 1656. A steering wheel may be optional for full automation (Level 5) functionality. In at least one embodiment, a brake sensor system 1646 may be used to operate vehicle brakes in response to receiving signals from brake actuator(s) 1648 and/or brake sensors.

In at least one embodiment, controller(s) 1636, which may include, without limitation, one or more system on chips ("SoCs") (not shown in FIG. 16A) and/or graphics processing unit(s) ("GPU(s)"), provide signals (e.g., representative of commands) to one or more components and/or systems of vehicle 1600. For instance, in at least one embodiment, controller(s) 1636 may send signals to operate vehicle brakes via brake actuator(s) 1648, to operate steering system 1654 via steering actuator(s) 1656, and/or to operate propulsion system 1650 via throttle/accelerator(s) 1652. Controller(s) 1636 may include one or more onboard (e.g., integrated) computing devices (e.g., supercomputers) that process sensor signals, and output operation commands (e.g., signals representing commands) to enable autonomous driving and/or to assist a human driver in driving vehicle 1600. In at least one embodiment, controller(s) 1636 may include a first controller 1636 for autonomous driving functions, a second controller 1636 for functional safety functions, a third controller 1636 for artificial intelligence functionality (e.g., computer vision), a fourth controller 1636 for infotainment functionality, a fifth controller 1636 for redundancy in emergency conditions, and/or other controllers. In at least one embodiment, a single controller 1636 may handle two or more of above functionalities, two or more controllers 1636 may handle a single functionality, and/or any combination thereof.

In at least one embodiment, controller(s) 1636 provide signals for controlling one or more components and/or systems of vehicle 1600 in response to sensor data received from one or more sensors (e.g., sensor inputs). In at least one embodiment, sensor data may be received from, for example and without limitation, global navigation satellite systems ("GNSS") sensor(s) 1658 (e.g., Global Positioning System sensor(s)), RADAR sensor(s) 1660, ultrasonic sensor(s) 1662, LIDAR sensor(s) 1664, inertial measurement unit ("IMU") sensor(s) 1666 (e.g., accelerometer(s), gyroscope(s), magnetic compass(es), magnetometer(s), etc.), microphone(s) 1696, stereo camera(s) 1668, wide-view camera(s) 1670 (e.g., fisheye cameras), infrared camera(s) 1672, surround camera(s) 1674 (e.g., 360 degree cameras), long-range cameras (not shown in FIG. 16A), mid-range camera(s) (not shown in FIG. 16A), speed sensor(s) 1644 (e.g., for measuring speed of vehicle 1600), vibration sensor(s) 1642, steering sensor(s) 1640, brake sensor(s) (e.g., as part of brake sensor system 1646), and/or other sensor types.

In at least one embodiment, one or more of controller(s) 1636 may receive inputs (e.g., represented by input data) from an instrument cluster 1632 of vehicle 1600 and provide outputs (e.g., represented by output data, display data, etc.) via a human-machine interface ("HMI") display 1634, an audible annunciator, a loudspeaker, and/or via other components of vehicle 1600. In at least one embodiment, outputs may include information such as vehicle velocity, speed, time, map data (e.g., a High Definition map (not shown in FIG. 16A), location data (e.g., vehicle 1600's location, such as on a map), direction, location of other vehicles (e.g., an occupancy grid), information about objects and status of objects as perceived by controller(s) 1636, etc. For example, in at least one embodiment, HMI display 1634 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 1600 further includes a network interface 1624 which may use wireless antenna(s) 1626 and/or modem(s) to communicate over one or more networks. For example, in at least one embodiment, network interface 1624 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. In at least one embodiment, wireless antenna(s) 1626 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Inference and/or training logic are used to perform inferencing and/or training operations associated with one or more embodiments. In at least one embodiment, inference and/or training logic may be used in system FIG. 16A for inferencing or predicting operations based, at least in part, on weight parameters calculated using neural network training operations, neural network functions and/or architectures, or neural network use cases described herein.

Such components can be used to generate synthetic data imitating failure cases in a network training process, which can help to improve performance of the network while limiting the amount of synthetic data to avoid overfitting.

Figure 16B:
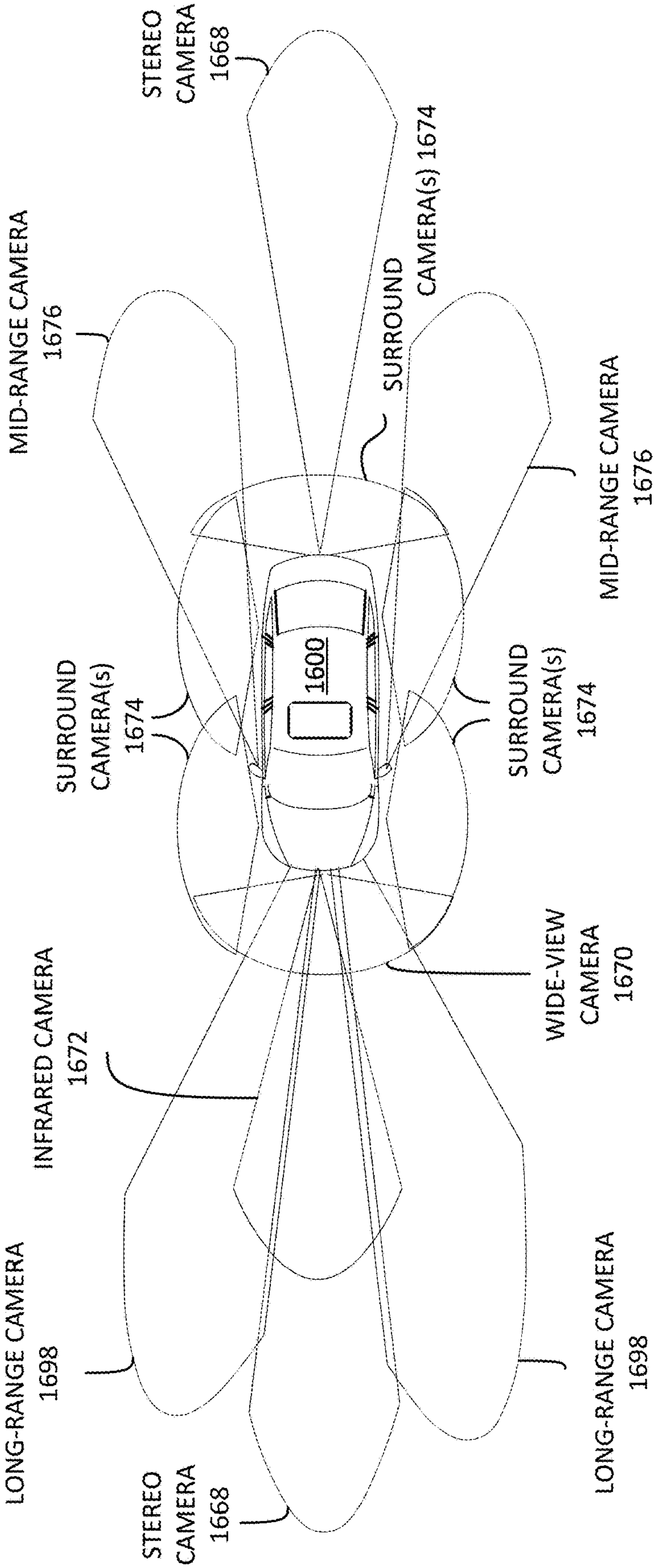
FIG. 16B illustrates an example of camera locations and fields of view for the autonomous vehicle of FIG. 16A, according to at least one embodiment.

FIG. 16B illustrates an example of camera locations and fields of view for autonomous vehicle 1600 of FIG. 16A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 1600.

In at least one embodiment, camera types for cameras may include, but are not limited to, digital cameras that may be adapted for use with components and/or systems of vehicle 1600. In at least one embodiment, one or more of camera(s) may operate at automotive safety integrity level ("ASIL") B and/or at another ASIL. In at least one embodiment, camera types may be capable of any image capture rate, such as 60 frames per second (fps), 120 fps, 240 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all of cameras) may record and provide image data (e.g., video) simultaneously.

In at least one embodiment, one or more of cameras may be mounted in a mounting assembly, such as a custom designed (three-dimensional ("3D") printed) assembly, in order to cut out stray light and reflections from within car (e.g., reflections from dashboard reflected in windshield mirrors) which may interfere with camera's image data capture abilities. With reference to wing-mirror mounting assemblies, in at least one embodiment, wing-mirror assemblies may be custom 3D printed so that camera mounting plate matches shape of wing-mirror. In at least one embodiment, camera(s) may be integrated into wing-mirror. For side-view cameras, camera(s) may also be integrated within four pillars at each corner of cab, in at least one embodiment.

In at least one embodiment, cameras with a field of view that include portions of environment in front of vehicle 1600 (e.g., front-facing cameras) may be used for surround view, to help identify forward facing paths and obstacles, as well as aid in, with help of one or more of controllers 1636 and/or control SoCs, providing information critical to generating an occupancy grid and/or determining preferred vehicle paths. In at least one embodiment, front-facing cameras may be used to perform many of same ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, wide-view camera 1670 may be used to perceive objects coming into view from periphery (e.g., pedestrians, crossing traffic or bicycles). Although only one wide-view camera 1670 is illustrated in FIG. 16B, in other embodiments, there may be any number (including zero) of wide-view camera(s) 1670 on vehicle 1600. In at least one embodiment, any number of long-range camera(s) 1698 (e.g., a long-view stereo camera pair) may be used for depth-based object detection, especially for objects for which a neural network has not yet been trained. In at least one embodiment, long-range camera(s) 1698 may also be used for object detection and classification, as well as basic object tracking.

In at least one embodiment, any number of stereo camera(s) 1668 may also be included in a front-facing configuration. In at least one embodiment, one or more of stereo camera(s) 1668 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of environment of vehicle 1600, including a distance estimate for all points in image. In at least one embodiment, one or more of stereo camera(s) 1668 may include, without limitation, compact stereo vision sensor(s) that may include, without limitation, two camera lenses (one each on left and right) and an image processing chip that may measure distance from vehicle 1600 to target object and use generated information (e.g., metadata) to activate autonomous emergency braking and lane departure warning functions. In at least one embodiment, other types of stereo camera(s) 1668 may be used in addition to, or alternatively from, those described herein.

In at least one embodiment, cameras with a field of view that include portions of environment to side of vehicle 1600 (e.g., side-view cameras) may be used for surround view, providing information used to create and update occupancy grid, as well as to generate side impact collision warnings. For example, in at least one embodiment, surround camera(s) 1674 (e.g., four surround cameras 1674 as illustrated in FIG. 16B) could be positioned on vehicle 1600. In at least one embodiment, surround camera(s) 1674 may include, without limitation, any number and combination of wide-view camera(s) 1670, fisheye camera(s), 360 degree camera(s), and/or like. For instance, in at least one embodiment, four fisheye cameras may be positioned on front, rear, and sides of vehicle 1600. In at least one embodiment, vehicle 1600 may use three surround camera(s) 1674 (e.g., left, right, and rear), and may leverage one or more other camera(s) (e.g., a forward-facing camera) as a fourth surround-view camera.

In at least one embodiment, cameras with a field of view that include portions of environment to rear of vehicle 1600 (e.g., rear-view cameras) may be used for park assistance, surround view, rear collision warnings, and creating and updating occupancy grid. In at least one embodiment, a wide variety of cameras may be used including, but not limited to, cameras that are also suitable as a front-facing camera(s)

(e.g., long-range cameras 1698 and/or mid-range camera(s) 1676, stereo camera(s) 1668), infrared camera(s) 1672, etc.), as described herein.

Inference and/or training logic are used to perform inferencing and/or training operations associated with one or more embodiments. Details regarding inference and/or training logic are provided herein. In at least one embodiment, inference and/or training logic may be used in system FIG. 16B for inferencing or predicting operations based, at least in part, on weight parameters calculated using neural network training operations, neural network functions and/or architectures, or neural network use cases described herein.

Such components can be used to generate synthetic data imitating failure cases in a network training process, which can help to improve performance of the network while limiting the amount of synthetic data to avoid overfitting.

Figure 16C:
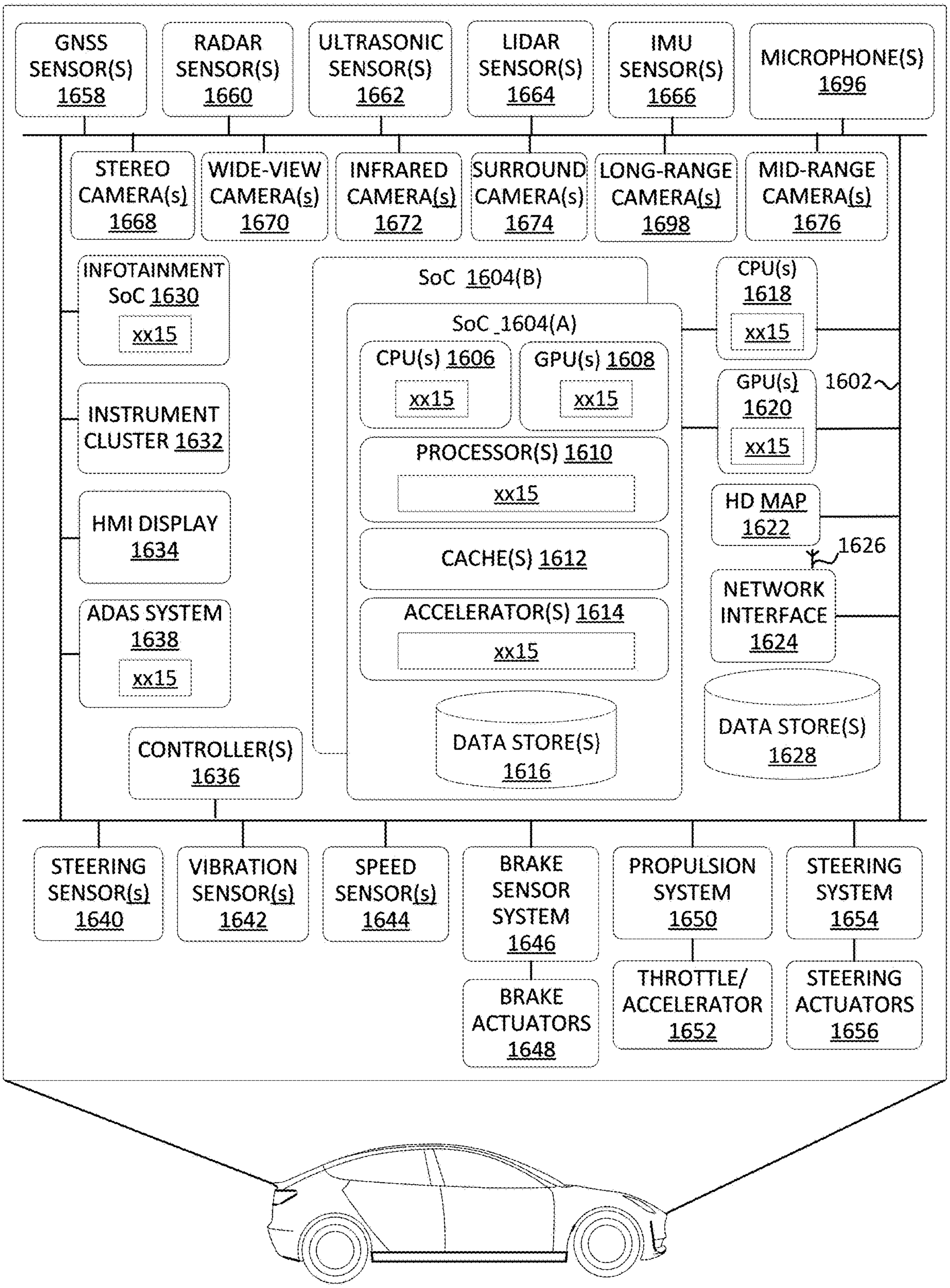
FIG. 16C illustrates an example system architecture for the autonomous vehicle of FIG. 16A, according to at least one embodiment.

FIG. 16C is a block diagram illustrating an example system architecture for autonomous vehicle 1600 of FIG. 16A, according to at least one embodiment. In at least one embodiment, each of components, features, and systems of vehicle 1600 in FIG. 16C are illustrated as being connected via a bus 1602. In at least one embodiment, bus 1602 may include, without limitation, a CAN data interface (alternatively referred to herein as a "CAN bus"). In at least one embodiment, a CAN bus may be a network inside vehicle 1600 used to aid in control of various features and functionality of vehicle 1600, such as actuation of brakes, acceleration, braking, steering, windshield wipers, etc. In at least one embodiment, bus 1602 may be configured to have dozens or even hundreds of nodes, each with its own unique identifier (e.g., a CAN ID). In at least one embodiment, bus 1602 may be read to find steering wheel angle, ground speed, engine revolutions per minute ("RPMs"), button positions, and/or other vehicle status indicators. In at least one embodiment, bus 1602 may be a CAN bus that is ASIL B compliant.

In at least one embodiment, in addition to, or alternatively from CAN, FlexRay and/or Ethernet may be used. In at least one embodiment, there may be any number of busses 1602, which may include, without limitation, zero or more CAN busses, zero or more FlexRay busses, zero or more Ethernet busses, and/or zero or more other types of busses using a different protocol. In at least one embodiment, two or more busses 1602 may be used to perform different functions, and/or may be used for redundancy. For example, a first bus 1602 may be used for collision avoidance functionality and a second bus 1602 may be used for actuation control. In at least one embodiment, each bus 1602 may communicate with any of components of vehicle 1600, and two or more busses 1602 may communicate with same components. In at least one embodiment, each of any number of system(s) on chip(s) ("SoC(s)") 1604, each of controller(s) 1636, and/or each computer within vehicle may have access to same input data (e.g., inputs from sensors of vehicle 1600), and may be connected to a common bus, such CAN bus.

In at least one embodiment, vehicle 1600 may include one or more controller(s) 1636, such as those described herein with respect to FIG. 16A. Controller(s) 1636 may be used for a variety of functions. In at least one embodiment, controller(s) 1636 may be coupled to any of various other components and systems of vehicle 1600, and may be used for control of vehicle 1600, artificial intelligence of vehicle 1600, infotainment for vehicle 1600, and/or like.

In at least one embodiment, vehicle 1600 may include any number of SoCs 1604. Each of SoCs 1604 may include, without limitation, central processing units ("CPU(s)") 1606, graphics processing units ("GPU(s)") 1608, processor(s) 1610, cache(s) 1612, accelerator(s) 1614, data store(s) 1616, and/or other components and features not illustrated. In at least one embodiment, SoC(s) 1604 may be used to control vehicle 1600 in a variety of platforms and systems. For example, in at least one embodiment, SoC(s) 1604 may be combined in a system (e.g., system of vehicle 1600) with a High Definition ("HD") map 1622 which may obtain map refreshes and/or updates via network interface 1624 from one or more servers (not shown in FIG. 16C).

In at least one embodiment, CPU(s) 1606 may include a CPU cluster or CPU complex (alternatively referred to herein as a "CCPLEX"). In at least one embodiment, CPU(s) 1606 may include multiple cores and/or level two ("L2") caches. For instance, in at least one embodiment, CPU(s) 1606 may include eight cores in a coherent multi-processor configuration. In at least one embodiment, CPU(s) 1606 may include four dual-core clusters where each cluster has a dedicated L2 cache (e.g., a 2 MB L2 cache). In at least one embodiment, CPU(s) 1606 (e.g., CCPLEX) may be configured to support simultaneous cluster operation enabling any combination of clusters of CPU(s) 1606 to be active at any given time.

In at least one embodiment, one or more of CPU(s) 1606 may implement power management capabilities that include, without limitation, one or more of following features: individual hardware blocks may be clock-gated automatically when idle to save dynamic power; each core clock may be gated when core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 1606 may further implement an enhanced algorithm for managing power states, where allowed power states and expected wakeup times are specified, and hardware/microcode determines best power state to enter for core, cluster, and CCPLEX. In at least one embodiment, processing cores may support simplified power state entry sequences in software with work offloaded to microcode.

In at least one embodiment, GPU(s) 1608 may include an integrated GPU (alternatively referred to herein as an "iGPU"). In at least one embodiment, GPU(s) 1608 may be programmable and may be efficient for parallel workloads. In at least one embodiment, GPU(s) 1608, in at least one embodiment, may use an enhanced tensor instruction set. In at least one embodiment, GPU(s) 1608 may include one or more streaming microprocessors, where each streaming microprocessor may include a level one ("L1") cache (e.g., an L1 cache with at least 96 KB storage capacity), and two or more of streaming microprocessors may share an L2 cache (e.g., an L2 cache with a 512 KB storage capacity). In at least one embodiment, GPU(s) 1608 may include at least eight streaming microprocessors. In at least one embodiment, GPU(s) 1608 may use compute application programming interface(s) (API(s)). In at least one embodiment, GPU(s) 1608 may use one or more parallel computing platforms and/or programming models (e.g., NVIDIA's CUDA).

In at least one embodiment, one or more of GPU(s) 1608 may be power-optimized for best performance in automotive and embedded use cases. For example, in on embodiment, GPU(s) 1608 could be fabricated on a Fin field-effect transistor ("FinFET"). In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA TENSOR COREs for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 1608 may include a high bandwidth memory ("HBM) and/or a 16 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 1608 may include unified memory technology. In at least one embodiment, address translation services ("ATS") support may be used to allow GPU(s) 1608 to access CPU(s) 1606 page tables directly. In at least one embodiment, embodiment, when GPU(s) 1608 memory management unit ("MMU") experiences a miss, an address translation request may be transmitted to CPU(s) 1606. In response, CPU(s) 1606 may look in its page tables for virtual-to-physical mapping for address and transmits translation back to GPU(s) 1608, in at least one embodiment. In at least one embodiment, unified memory technology may allow a single unified virtual address space for memory of both CPU(s) 1606 and GPU(s) 1608, thereby simplifying GPU(s) 1608 programming and porting of applications to GPU(s) 1608.

In at least one embodiment, GPU(s) 1608 may include any number of access counters that may keep track of frequency of access of GPU(s) 1608 to memory of other processors. In at least one embodiment, access counter(s) may help ensure that memory pages are moved to physical memory of processor that is accessing pages most frequently, thereby improving efficiency for memory ranges shared between processors.

In at least one embodiment, one or more of SoC(s) 1604 may include any number of cache(s) 1612, including those described herein. For example, in at least one embodiment, cache(s) 1612 could include a level three ("L3") cache that is available to both CPU(s) 1606 and GPU(s) 1608 (e.g., that is connected both CPU(s) 1606 and GPU(s) 1608). In at least one embodiment, cache(s) 1612 may include a write-back cache that may keep track of states of lines, such as by using a cache coherence protocol (e.g., MEI, MESI, MSI, etc.). In at least one embodiment, L3 cache may include 4 MB or more, depending on embodiment, although smaller cache sizes may be used.

In at least one embodiment, one or more of SoC(s) 1604 may include one or more accelerator(s) 1614 (e.g., hardware accelerators, software accelerators, or a combination thereof). In at least one embodiment, SoC(s) 1604 may include a hardware acceleration cluster that may include optimized hardware accelerators and/or large on-chip memory. In at least one embodiment, large on-chip memory (e.g., 4 MB of SRAM), may enable hardware acceleration cluster to accelerate neural networks and other calculations. In at least one embodiment, hardware acceleration cluster may be used to complement GPU(s) 1608 and to off-load some of tasks of GPU(s) 1608 (e.g., to free up more cycles of GPU(s) 1608 for performing other tasks). In at least one embodiment, accelerator(s) 1614 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 1614 (e.g., hardware acceleration cluster) may include a deep learning accelerator(s) ("DLA(s)"). DLA(s) may include, without limitation, one or more Tensor processing units ("TPU(s)") that may be configured to provide an additional ten trillion operations per second for deep learning applications and inferencing. In at least one embodiment, TPU(s) may be accelerators configured to, and optimized for, performing image processing functions (e.g., for CNNs, RCNNs, etc.). DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones 1696; a CNN for facial recognition and vehicle owner identification using data from camera sensors; and/or a CNN for security and/or safety related events.

In at least one embodiment, DLA(s) may perform any function of GPU(s) 1608, and by using an inference accelerator, for example, a designer may target either DLA(s) or GPU(s) 1608 for any function. For example, in at least one embodiment, designer may focus processing of CNNs and floating point operations on DLA(s) and leave other functions to GPU(s) 1608 and/or other accelerator(s) 1614.

In at least one embodiment, accelerator(s) 1614 (e.g., hardware acceleration cluster) may include a programmable vision accelerator(s) ("PVA"), which may alternatively be referred to herein as a computer vision accelerator. In at least one embodiment, PVA(s) may be designed and configured to accelerate computer vision algorithms for advanced driver assistance system ("ADAS") 1638, autonomous driving, augmented reality ("AR") applications, and/or virtual reality ("VR") applications. PVA(s) may provide a balance between performance and flexibility. For example, in at least one embodiment, each PVA(s) may include, for example and without limitation, any number of reduced instruction set computer ("RISC") cores, direct memory access ("DMA"), and/or any number of vector processors.

In at least one embodiment, RISC cores may interact with image sensors (e.g., image sensors of any of cameras described herein), image signal processor(s), and/or like. In at least one embodiment, each of RISC cores may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA(s) to access system memory independently of CPU(s) 1606. In at least one embodiment, DMA may support any number of features used to provide optimization to PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to execute programming efficiently and flexibly for computer vision algorithms and provide signal processing capabilities. In at least one embodiment, PVA may include a PVA core and two vector processing subsystem partitions. In at least one embodiment, PVA core may include a processor subsystem, DMA engine(s) (e.g., two DMA engines), and/or other peripherals. In at least one embodiment, vector processing subsystem may operate as primary processing engine of PVA, and may include a vector processing unit ("VPU"), an instruction cache, and/or vector memory (e.g., "VMEM"). In at least one embodiment, VPU may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute same computer vision algorithm, but on different regions of an image. In at least one embodiment, vector processors included in a particular PVA may simultaneously execute different computer vision algorithms, on same image, or even execute different algorithms on sequential images or portions of an image. In at least one embodiment, among other things, any number of PVAs may be included in hardware acceleration cluster and any number of vector processors may be included in each of PVAs. In at least one embodiment, PVA(s) may include additional error correcting code ("ECC") memory, to enhance overall system safety.

In at least one embodiment, accelerator(s) 1614 (e.g., hardware acceleration cluster) may include a computer vision network on-chip and static random-access memory ("SRAM"), for providing a high-bandwidth, low latency SRAM for accelerator(s) 1614. In at least one embodiment, on-chip memory may include at least 4 MB SRAM, consisting of, for example and without limitation, eight field-configurable memory blocks, that may be accessible by both PVA and DLA. In at least one embodiment, each pair of memory blocks may include an advanced peripheral bus ("APB") interface, configuration circuitry, a controller, and a multiplexer. In at least one embodiment, any type of memory may be used. In at least one embodiment, PVA and DLA may access memory via a backbone that provides PVA and DLA with high-speed access to memory. In at least one embodiment, backbone may include a computer vision network on-chip that interconnects PVA and DLA to memory (e.g., using APB).

In at least one embodiment, computer vision network on-chip may include an interface that determines, before transmission of any control signal/address/data, that both PVA and DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 1604 may include a real-time ray-tracing hardware accelerator. In at least one embodiment, real-time ray-tracing hardware accelerator may be used to determine positions and extents of objects quickly and efficiently (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 1614 (e.g., hardware accelerator cluster) have a wide array of uses for autonomous driving. In at least one embodiment, PVA may be a programmable vision accelerator that may be used for key processing stages in ADAS and autonomous vehicles. In at least one embodiment, PVA's capabilities are a good match for algorithmic domains needing predictable processing, at low power and low latency. In other words, PVA performs well on semi-dense or dense regular computation, even on small data sets, which need predictable run-times with low latency and low power. In at least one embodiment, autonomous vehicles, such as vehicle 1600, PVAs are designed to run classic computer vision algorithms, as they are efficient at object detection and operating on integer math.

For example, according to at least one embodiment of technology, PVA is used to perform computer stereo vision. In at least one embodiment, semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, PVA may perform computer stereo vision function on inputs from two monocular cameras.

In at least one embodiment, PVA may be used to perform dense optical flow. For example, in at least one embodiment, PVA could process raw RADAR data (e.g., using a 4D Fast Fourier Transform) to provide processed RADAR data. In at least one embodiment, PVA is used for time of flight depth processing, by processing raw time of flight data to provide processed time of flight data, for example.

In at least one embodiment, DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, confidence enables a system to make further decisions regarding which detections should be considered as true positive detections rather than false positive detections. For example, in at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, DLA may run a neural network for regressing confidence value. In at least one embodiment, neural network may take as its input at least some subset of parameters, such as bounding box dimensions, ground plane estimate obtained (e.g. from another subsystem), output from IMU sensor(s) 1666 that correlates with vehicle 1600 orientation, distance, 3D location estimates of object obtained from neural network and/or other sensors (e.g., LIDAR sensor(s) 1664 or RADAR sensor(s) 1660), among others.

In at least one embodiment, one or more of SoC(s) 1604 may include data store(s) 1616 (e.g., memory). In at least one embodiment, data store(s) 1616 may be on-chip memory of SoC(s) 1604, which may store neural networks to be executed on GPU(s) 1608 and/or DLA. In at least one embodiment, data store(s) 1616 may be large enough in capacity to store multiple instances of neural networks for redundancy and safety. In at least one embodiment, data store(s) 1616 may comprise L2 or L3 cache(s).

In at least one embodiment, one or more of SoC(s) 1604 may include any number of processor(s) 1610 (e.g., embedded processors). In at least one embodiment, processor(s) 1610 may include a boot and power management processor that may be a dedicated processor and subsystem to handle boot power and management functions and related security enforcement. In at least one embodiment, boot and power management processor may be a part of SoC(s) 1604 boot sequence and may provide runtime power management services. In at least one embodiment, boot power and management processor may provide clock and voltage programming, assistance in system low power state transitions, management of SoC(s) 1604 thermals and temperature sensors, and/or management of SoC(s) 1604 power states. In at least one embodiment, each temperature sensor may be implemented as a ring-oscillator whose output frequency is proportional to temperature, and SoC(s) 1604 may use ring-oscillators to detect temperatures of CPU(s) 1606, GPU(s) 1608, and/or accelerator(s) 1614. In at least one embodiment, if temperatures are determined to exceed a threshold, then boot and power management processor may enter a temperature fault routine and put SoC(s) 1604 into a lower power state and/or put vehicle 1600 into a chauffeur to safe stop mode (e.g., bring vehicle 1600 to a safe stop).

In at least one embodiment, processor(s) 1610 may further include a set of embedded processors that may serve as an audio processing engine. In at least one embodiment, audio processing engine may be an audio subsystem that enables full hardware support for multi-channel audio over multiple interfaces, and a broad and flexible range of audio I/O interfaces. In at least one embodiment, audio processing engine is a dedicated processor core with a digital signal processor with dedicated RAM.

In at least one embodiment, processor(s) 1610 may further include an always on processor engine that may provide necessary hardware features to support low power sensor management and wake use cases. In at least one embodiment, always on processor engine may include, without limitation, a processor core, a tightly coupled RAM, supporting peripherals (e.g., timers and interrupt controllers), various I/O controller peripherals, and routing logic.

In at least one embodiment, processor(s) 1610 may further include a safety cluster engine that includes, without limitation, a dedicated processor subsystem to handle safety management for automotive applications. In at least one embodiment, safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 1610 may further include a real-time camera engine that may include, without limitation, a dedicated processor subsystem for handling real-time camera management. In at least one embodiment, processor(s) 1610 may further include a high-dynamic range signal processor that may include, without limitation, an image signal processor that is a hardware engine that is part of camera processing pipeline.

In at least one embodiment, processor(s) 1610 may include a video image compositor that may be a processing block (e.g., implemented on a microprocessor) that implements video post-processing functions needed by a video playback application to produce final image for player window. In at least one embodiment, video image compositor may perform lens distortion correction on wide-view camera(s) 1670, surround camera(s) 1674, and/or on in-cabin monitoring camera sensor(s). In at least one embodiment, in-cabin monitoring camera sensor(s) are preferably monitored by a neural network running on another instance of SoC(s) 1604, configured to identify in cabin events and respond accordingly. In at least one embodiment, an in-cabin system may perform, without limitation, lip reading to activate cellular service and place a phone call, dictate emails, change vehicle's destination, activate or change vehicle's infotainment system and settings, or provide voice-activated web surfing. In at least one embodiment, certain functions are available to driver when vehicle is operating in an autonomous mode and are disabled otherwise.

In at least one embodiment, video image compositor may include enhanced temporal noise reduction for both spatial and temporal noise reduction. For example, in at least one embodiment, where motion occurs in a video, noise reduction weights spatial information appropriately, decreasing weight of information provided by adjacent frames. In at least one embodiment, where an image or portion of an image does not include motion, temporal noise reduction performed by video image compositor may use information from previous image to reduce noise in current image.

In at least one embodiment, video image compositor may also be configured to perform stereo rectification on input stereo lens frames. In at least one embodiment, video image compositor may further be used for user interface composition when operating system desktop is in use, and GPU(s) 1608 are not required to continuously render new surfaces. In at least one embodiment, when GPU(s) 1608 are powered on and active doing 3D rendering, video image compositor may be used to offload GPU(s) 1608 to improve performance and responsiveness.

In at least one embodiment, one or more of SoC(s) 1604 may further include a mobile industry processor interface ("MIPI") camera serial interface for receiving video and input from cameras, a high-speed interface, and/or a video input block that may be used for camera and related pixel input functions. In at least one embodiment, one or more of SoC(s) 1604 may further include an input/output controller(s) that may be controlled by software and may be used for receiving I/O signals that are uncommitted to a specific role.

In at least one embodiment, one or more of SoC(s) 1604 may further include a broad range of peripheral interfaces to enable communication with peripherals, audio encoders/decoders ("codecs"), power management, and/or other devices. SoC(s) 1604 may be used to process data from cameras (e.g., connected over Gigabit Multimedia Serial Link and Ethernet), sensors (e.g., LIDAR sensor(s) 1664, RADAR sensor(s) 1660, etc. that may be connected over Ethernet), data from bus 1602 (e.g., speed of vehicle 1600, steering wheel position, etc.), data from GNSS sensor(s) 1658 (e.g., connected over Ethernet or CAN bus), etc. In at least one embodiment, one or more of SoC(s) 1604 may further include dedicated high-performance mass storage controllers that may include their own DMA engines, and that may be used to free CPU(s) 1606 from routine data management tasks.

In at least one embodiment, SoC(s) 1604 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. In at least one embodiment, SoC(s) 1604 may be faster, more reliable, and even more energy-efficient and space-efficient than conventional systems. For example, in at least one embodiment, accelerator(s) 1614, when combined with CPU(s) 1606, GPU(s) 1608, and data store(s) 1616, may provide for a fast, efficient platform for level 3-5 autonomous vehicles.

In at least one embodiment, computer vision algorithms may be executed on CPUs, which may be configured using high-level programming language, such as C programming language, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on DLA or discrete GPU (e.g., GPU(s) 1620) may include text and word recognition, allowing supercomputer to read and understand traffic signs, including signs for which neural network has not been specifically trained. In at least one embodiment, DLA may further include a neural network that is able to identify, interpret, and provide semantic understanding of sign, and to pass that semantic understanding to path planning modules running on CPU Complex.

In at least one embodiment, multiple neural networks may be run simultaneously, as for Level 3, 4, or 5 driving. For example, in at least one embodiment, a warning sign consisting of "Caution: flashing lights indicate icy conditions," along with an electric light, may be independently or collectively interpreted by several neural networks. In at least one embodiment, a sign itself may be identified as a traffic sign by a first deployed neural network (e.g., a neural network that has been trained) and a text "flashing lights indicate icy conditions" may be interpreted by a second deployed neural network, which informs vehicle's path planning software (preferably executing on CPU Complex) that when flashing lights are detected, icy conditions exist. In at least one embodiment, a flashing light may be identified by operating a third deployed neural network over multiple frames, informing vehicle's path-planning software of presence (or absence) of flashing lights. In at least one embodiment, all three neural networks may run simultaneously, such as within DLA and/or on GPU(s) 1608.

In at least one embodiment, a CNN for facial recognition and vehicle owner identification may use data from camera sensors to identify presence of an authorized driver and/or owner of vehicle 1600. In at least one embodiment, an always on sensor processing engine may be used to unlock vehicle when owner approaches driver door and turn on lights, and, in security mode, to disable vehicle when owner leaves vehicle. In this way, SoC(s) 1604 provide for security against theft and/or carjacking.

In at least one embodiment, a CNN for emergency vehicle detection and identification may use data from microphones 1696 to detect and identify emergency vehicle sirens. In at least one embodiment, SoC(s) 1604 use CNN for classifying environmental and urban sounds, as well as classifying visual data. In at least one embodiment, CNN running on DLA is trained to identify relative closing speed of emergency vehicle (e.g., by using Doppler effect). In at least one embodiment, CNN may also be trained to identify emergency vehicles specific to local area in which vehicle is operating, as identified by GNSS sensor(s) 1658. In at least one embodiment, when operating in Europe, CNN will seek to detect European sirens, and when in United States CNN will seek to identify only North American sirens. In at least one embodiment, once an emergency vehicle is detected, a control program may be used to execute an emergency vehicle safety routine, slowing vehicle, pulling over to side of road, parking vehicle, and/or idling vehicle, with assistance of ultrasonic sensor(s) 1662, until emergency vehicle(s) passes.

In at least one embodiment, vehicle 1600 may include CPU(s) 1618 (e.g., discrete CPU(s), or dCPU(s)), that may be coupled to SoC(s) 1604 via a high-speed interconnect (e.g., PCIe). In at least one embodiment, CPU(s) 1618 may include an X86 processor, for example. CPU(s) 1618 may be used to perform any of a variety of functions, including arbitrating potentially inconsistent results between ADAS sensors and SoC(s) 1604, and/or monitoring status and health of controller(s) 1636 and/or an infotainment system on a chip ("infotainment SoC") 1630, for example.

In at least one embodiment, vehicle 1600 may include GPU(s) 1620 (e.g., discrete GPU(s), or dGPU(s)), that may be coupled to SoC(s) 1604 via a high-speed interconnect (e.g., NVIDIA's NVLINK). In at least one embodiment, GPU(s) 1620 may provide additional artificial intelligence functionality, such as by executing redundant and/or different neural networks, and may be used to train and/or update neural networks based at least in part on input (e.g., sensor data) from sensors of vehicle 1600.

In at least one embodiment, vehicle 1600 may further include network interface 1624 which may include, without limitation, wireless antenna(s) 1626 (e.g., one or more wireless antennas 1626 for different communication protocols, such as a cellular antenna, a Bluetooth antenna, etc.). In at least one embodiment, network interface 1624 may be used to enable wireless connectivity over Internet with cloud (e.g., with server(s) and/or other network devices), with other vehicles, and/or with computing devices (e.g., client devices of passengers). In at least one embodiment, to communicate with other vehicles, a direct link may be established between vehicle 160 and other vehicle and/or an indirect link may be established (e.g., across networks and over Internet). In at least one embodiment, direct links may be provided using a vehicle-to-vehicle communication link. vehicle-to-vehicle communication link may provide vehicle 1600 information about vehicles in proximity to vehicle 1600 (e.g., vehicles in front of, on side of, and/or behind vehicle 1600). In at least one embodiment, aforementioned functionality may be part of a cooperative adaptive cruise control functionality of vehicle 1600.

In at least one embodiment, network interface 1624 may include a SoC that provides modulation and demodulation functionality and enables controller(s) 1636 to communicate over wireless networks. In at least one embodiment, network interface 1624 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

In at least one embodiment, vehicle 1600 may further include data store(s) 1628 which may include, without limitation, off-chip (e.g., off SoC(s) 1604) storage. In at least one embodiment, data store(s) 1628 may include, without limitation, one or more storage elements including RAM, SRAM, dynamic random-access memory ("DRAM"), video random-access memory ("VRAM"), Flash, hard disks, and/or other components and/or devices that may store at least one bit of data.

In at least one embodiment, vehicle 1600 may further include GNSS sensor(s) 1658 (e.g., GPS and/or assisted GPS sensors), to assist in mapping, perception, occupancy grid generation, and/or path planning functions. In at least one embodiment, any number of GNSS sensor(s) 1658 may be used, including, for example and without limitation, a GPS using a USB connector with an Ethernet to Serial (e.g., RS-232) bridge.

In at least one embodiment, vehicle 1600 may further include RADAR sensor(s) 1660. RADAR sensor(s) 1660 may be used by vehicle 1600 for long-range vehicle detection, even in darkness and/or severe weather conditions. In at least one embodiment, RADAR functional safety levels may be ASIL B. RADAR sensor(s) 1660 may use CAN and/or bus 1602 (e.g., to transmit data generated by RADAR sensor(s) 1660) for control and to access object tracking data, with access to Ethernet to access raw data in some examples. In at least one embodiment, wide variety of RADAR sensor types may be used. For example, and without limitation, RADAR sensor(s) 1660 may be suitable for front, rear, and side RADAR use. In at least one embodiment, one or more of RADAR sensors(s) 1660 are Pulse Doppler RADAR sensor(s).

In at least one embodiment, RADAR sensor(s) 1660 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m range. In at least one embodiment, RADAR sensor(s) 1660 may help in distinguishing between static and moving objects, and may be used by ADAS system 1638 for emergency brake assist and forward collision warning. Sensors 1660(*s*) included in a long-range RADAR system may include, without limitation, monostatic multimodal RADAR with multiple (e.g., six or more) fixed RADAR antennae and a high-speed CAN and FlexRay interface. In at least one embodiment, with six antennae, central four antennae may create a focused beam pattern, designed to record vehicle 1600's surroundings at higher speeds with minimal interference from traffic in adjacent lanes. In at least one embodiment, other two antennae may expand field of view, making it possible to quickly detect vehicles entering or leaving vehicle 1600's lane.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 1660 designed to be installed at both ends of rear bumper. When installed at both ends of rear bumper, in at least one embodiment, a RADAR sensor system may create two beams that constantly monitor blind spot in rear and next to vehicle. In at least one embodiment, short-range RADAR systems may be used in ADAS system 1638 for blind spot detection and/or lane change assist.

In at least one embodiment, vehicle 1600 may further include ultrasonic sensor(s) 1662. Ultrasonic sensor(s) 1662, which may be positioned at front, back, and/or sides of vehicle 1600, may be used for park assist and/or to create and update an occupancy grid. In at least one embodiment, a wide variety of ultrasonic sensor(s) 1662 may be used, and different ultrasonic sensor(s) 1662 may be used for different ranges of detection (e.g., 2.5 m, 4 m). In at least one embodiment, ultrasonic sensor(s) 1662 may operate at functional safety levels of ASIL B.

In at least one embodiment, vehicle 1600 may include LIDAR sensor(s) 1664. LIDAR sensor(s) 1664 may be used for object and pedestrian detection, emergency braking, collision avoidance, and/or other functions. In at least one embodiment, LIDAR sensor(s) 1664 may be functional safety level ASIL B. In at least one embodiment, vehicle 1600 may include multiple LIDAR sensors 1664 (e.g., two, four, six, etc.) that may use Ethernet (e.g., to provide data to a Gigabit Ethernet switch).

In at least one embodiment, LIDAR sensor(s) 1664 may be capable of providing a list of objects and their distances for a 360-degree field of view. In at least one embodiment, commercially available LIDAR sensor(s) 1664 may have an advertised range of approximately 100 m, with an accuracy of 2 cm-3 cm, and with support for a 100 Mbps Ethernet connection, for example. In at least one embodiment, one or more non-protruding LIDAR sensors 1664 may be used. In such an embodiment, LIDAR sensor(s) 1664 may be implemented as a small device that may be embedded into front, rear, sides, and/or corners of vehicle 1600. In at least one embodiment, LIDAR sensor(s) 1664, in such an embodiment, may provide up to a 120-degree horizontal and 35-degree vertical field-of-view, with a 200 m range even for low-reflectivity objects. In at least one embodiment, front-mounted LIDAR sensor(s) 1664 may be configured for a horizontal field of view between 45 degrees and 135 degrees.

In at least one embodiment, LIDAR technologies, such as 3D flash LIDAR, may also be used. 3D Flash LIDAR uses a flash of a laser as a transmission source, to illuminate surroundings of vehicle 1600 up to approximately 200 m. In at least one embodiment, a flash LIDAR unit includes, without limitation, a receptor, which records laser pulse transit time and reflected light on each pixel, which in turn corresponds to range from vehicle 1600 to objects. In at least one embodiment, flash LIDAR may allow for highly accurate and distortion-free images of surroundings to be generated with every laser flash. In at least one embodiment, four flash LIDAR sensors may be deployed, one at each side of vehicle 1600. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device(s) may use a 5 nanosecond class I (eye-safe) laser pulse per frame and may capture reflected laser light in form of 3D range point clouds and co-registered intensity data.

In at least one embodiment, vehicle may further include IMU sensor(s) 1666. In at least one embodiment, IMU sensor(s) 1666 may be located at a center of rear axle of vehicle 1600, in at least one embodiment. In at least one embodiment, IMU sensor(s) 1666 may include, for example and without limitation, accelerometer(s), magnetometer(s), gyroscope(s), magnetic compass(es), and/or other sensor types. In at least one embodiment, such as in six-axis applications, IMU sensor(s) 1666 may include, without limitation, accelerometers and gyroscopes. In at least one embodiment, such as in nine-axis applications, IMU sensor(s) 1666 may include, without limitation, accelerometers, gyroscopes, and magnetometers.

In at least one embodiment, IMU sensor(s) 1666 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 1666 may enable vehicle 1600 to estimate heading without requiring input from a magnetic sensor by directly observing and correlating changes in velocity from GPS to IMU sensor(s) 1666. In at least one embodiment, IMU sensor(s) 1666 and GNSS sensor(s) 1658 may be combined in a single integrated unit.

In at least one embodiment, vehicle 1600 may include microphone(s) 1696 placed in and/or around vehicle 1600. In at least one embodiment, microphone(s) 1696 may be used for emergency vehicle detection and identification, among other things.

In at least one embodiment, vehicle 1600 may further include any number of camera types, including stereo camera(s) 1668, wide-view camera(s) 1670, infrared camera(s) 1672, surround camera(s) 1674, long-range camera(s) 1698, mid-range camera(s) 1676, and/or other camera types. In at least one embodiment, cameras may be used to capture image data around an entire periphery of vehicle 1600. In at least one embodiment, types of cameras used depends on vehicle 1600. In at least one embodiment, any combination of camera types may be used to provide necessary coverage around vehicle 1600. In at least one embodiment, number of cameras may differ depending on embodiment. For example, in at least one embodiment, vehicle 1600 could include six cameras, seven cameras, ten cameras, twelve cameras, or another number of cameras. Cameras may support, as an example and without limitation, Gigabit Multimedia Serial Link ("GMSL") and/or Gigabit Ethernet. In at least one embodiment, each of camera(s) is described with more detail previously herein with respect to FIG. 16A and FIG. 16B.

In at least one embodiment, vehicle 1600 may further include vibration sensor(s) 1642. In at least one embodiment, vibration sensor(s) 1642 may measure vibrations of components of vehicle 1600, such as axle(s). For example, in at least one embodiment, changes in vibrations may indicate a change in road surfaces. In at least one embodiment, when two or more vibration sensors 1642 are used, differences between vibrations may be used to determine friction or slippage of road surface (e.g., when difference in vibration is between a power-driven axle and a freely rotating axle).

In at least one embodiment, vehicle 1600 may include ADAS system 1638. ADAS system 1638 may include, without limitation, a SoC, in some examples. In at least one embodiment, ADAS system 1638 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW)" system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 1660, LIDAR sensor(s) 1664, and/or any number of camera(s). In at least one embodiment, ACC system may include a longitudinal ACC system and/or a lateral ACC system. In at least one embodiment, longitudinal ACC system monitors and controls distance to vehicle immediately ahead of vehicle 1600 and automatically adjust speed of vehicle 1600 to maintain a safe distance from vehicles ahead. In at least one embodiment, lateral ACC system performs distance keeping, and advises vehicle 1600 to change lanes when necessary. In at least one embodiment, lateral ACC is related to other ADAS applications such as LC and CW.

In at least one embodiment, CACC system uses information from other vehicles that may be received via network interface 1624 and/or wireless antenna(s) 1626 from other vehicles via a wireless link, or indirectly, over a network connection (e.g., over Internet). In at least one embodiment, direct links may be provided by a vehicle-to-vehicle ("V2V") communication link, while indirect links may be provided by an infrastructure-to-vehicle ("I2V") communication link. In general, V2V communication concept provides information about immediately preceding vehicles (e.g., vehicles immediately ahead of and in same lane as vehicle 1600), while I2V communication concept provides information about traffic further ahead. In at least one embodiment, CACC system may include either or both I2V and V2V information sources. In at least one embodiment, given information of vehicles ahead of vehicle 1600, CACC system may be more reliable and it has potential to improve traffic flow smoothness and reduce congestion on road.

In at least one embodiment, FCW system is designed to alert driver to a hazard, so that driver may take corrective action. In at least one embodiment, FCW system uses a front-facing camera and/or RADAR sensor(s) 1660, coupled to a dedicated processor, DSP, FPGA, and/or ASIC, that is electrically coupled to driver feedback, such as a display, speaker, and/or vibrating component. In at least one embodiment, FCW system may provide a warning, such as in form of a sound, visual warning, vibration and/or a quick brake pulse.

In at least one embodiment, AEB system detects an impending forward collision with another vehicle or other object, and may automatically apply brakes if driver does not take corrective action within a specified time or distance parameter. In at least one embodiment, AEB system may use front-facing camera(s) and/or RADAR sensor(s) 1660, coupled to a dedicated processor, DSP, FPGA, and/or ASIC. In at least one embodiment, when AEB system detects a hazard, AEB system typically first alerts driver to take corrective action to avoid collision and, if driver does not take corrective action, AEB system may automatically apply brakes in an effort to prevent, or at least mitigate, impact of predicted collision. In at least one embodiment, AEB system, may include techniques such as dynamic brake support and/or crash imminent braking.

In at least one embodiment, LDW system provides visual, audible, and/or tactile warnings, such as steering wheel or seat vibrations, to alert driver when vehicle 1600 crosses lane markings. In at least one embodiment, LDW system does not activate when driver indicates an intentional lane departure, by activating a turn signal. In at least one embodiment, LDW system may use front-side facing cameras, coupled to a dedicated processor, DSP, FPGA, and/or ASIC, that is electrically coupled to driver feedback, such as a display, speaker, and/or vibrating component. In at least one embodiment, LKA system is a variation of LDW system. LKA system provides steering input or braking to correct vehicle 1600 if vehicle 1600 starts to exit lane.

In at least one embodiment, BSW system detects and warns driver of vehicles in an automobile's blind spot. In at least one embodiment, BSW system may provide a visual, audible, and/or tactile alert to indicate that merging or changing lanes is unsafe. In at least one embodiment, BSW system may provide an additional warning when driver uses a turn signal. In at least one embodiment, BSW system may use rear-side facing camera(s) and/or RADAR sensor(s) 1660, coupled to a dedicated processor, DSP, FPGA, and/or ASIC, that is electrically coupled to driver feedback, such as a display, speaker, and/or vibrating component.

In at least one embodiment, RCTW system may provide visual, audible, and/or tactile notification when an object is detected outside rear-camera range when vehicle 1600 is backing up. In at least one embodiment, RCTW system includes AEB system to ensure that vehicle brakes are applied to avoid a crash. In at least one embodiment, RCTW system may use one or more rear-facing RADAR sensor(s) 1660, coupled to a dedicated processor, DSP, FPGA, and/or ASIC, that is electrically coupled to driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert driver and allow driver to decide whether a safety condition truly exists and act accordingly. In at least one embodiment, vehicle 1600 itself decides, in case of conflicting results, whether to heed result from a primary computer or a secondary computer (e.g., first controller 1636 or second controller 1636). For example, in at least one embodiment, ADAS system 1638 may be a backup and/or secondary computer for providing perception information to a backup computer rationality module. In at least one embodiment, backup computer rationality monitor may run a redundant diverse software on hardware components to detect faults in perception and dynamic driving tasks. In at least one embodiment, outputs from ADAS system 1638 may be provided to a supervisory MCU. In at least one embodiment, if outputs from primary computer and secondary computer conflict, supervisory MCU determines how to reconcile conflict to ensure safe operation.

In at least one embodiment, primary computer may be configured to provide supervisory MCU with a confidence score, indicating primary computer's confidence in chosen result. In at least one embodiment, if confidence score exceeds a threshold, supervisory MCU may follow primary computer's direction, regardless of whether secondary computer provides a conflicting or inconsistent result. In at least one embodiment, where confidence score does not meet threshold, and where primary and secondary computer indicate different results (e.g., a conflict), supervisory MCU may arbitrate between computers to determine appropriate outcome.

In at least one embodiment, supervisory MCU may be configured to run a neural network(s) that is trained and configured to determine, based at least in part on outputs from primary computer and secondary computer, conditions under which secondary computer provides false alarms. In at least one embodiment, neural network(s) in supervisory MCU may learn when secondary computer's output may be trusted, and when it cannot. For example, in at least one embodiment, when secondary computer is a RADAR-based FCW system, a neural network(s) in supervisory MCU may learn when FCW system is identifying metallic objects that are not, in fact, hazards, such as a drainage grate or manhole cover that triggers an alarm. In at least one embodiment, when secondary computer is a camera-based LDW system, a neural network in supervisory MCU may learn to override LDW when bicyclists or pedestrians are present and a lane departure is, in fact, safest maneuver. In at least one embodiment, supervisory MCU may include at least one of a DLA or GPU suitable for running neural network(s) with associated memory. In at least one embodiment, supervisory MCU may comprise and/or be included as a component of SoC(s) 1604.

In at least one embodiment, ADAS system 1638 may include a secondary computer that performs ADAS functionality using traditional rules of computer vision. In at least one embodiment, secondary computer may use classic computer vision rules (if-then), and presence of a neural network(s) in supervisory MCU may improve reliability, safety and performance. For example, in at least one embodiment, diverse implementation and intentional non-identity makes overall system more fault-tolerant, especially to faults caused by software (or software-hardware interface) functionality. For example, in at least one embodiment, if there is a software bug or error in software running on primary computer, and non-identical software code running on secondary computer provides same overall result, then supervisory MCU may have greater confidence that overall result is correct, and bug in software or hardware on primary computer is not causing material error.

In at least one embodiment, output of ADAS system 1638 may be fed into primary computer's perception block and/or primary computer's dynamic driving task block. For example, in at least one embodiment, if ADAS system 1638 indicates a forward crash warning due to an object immediately ahead, perception block may use this information when identifying objects. In at least one embodiment, secondary computer may have its own neural network which is trained and thus reduces risk of false positives, as described herein.

In at least one embodiment, vehicle 1600 may further include infotainment SoC 1630 (e.g., an in-vehicle infotainment system (IVI)). Although illustrated and described as a SoC, infotainment system 1630, in at least one embodiment, may not be a SoC, and may include, without limitation, two or more discrete components. In at least one embodiment, infotainment SoC 1630 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 1600. For example, infotainment SoC 1630 could include radios, disk players, navigation systems, video players, USB and Bluetooth connectivity, carputers, in-car entertainment, WiFi, steering wheel audio controls, hands free voice control, a heads-up display ("HUD"), HMI display 1634, a telematics device, a control panel (e.g., for controlling and/or interacting with various components, features, and/or systems), and/or other components. In at least one embodiment, infotainment SoC 1630 may further be used to provide information (e.g., visual and/or audible) to user(s) of vehicle, such as information from ADAS system 1638, autonomous driving information such as planned vehicle maneuvers, trajectories, surrounding environment information (e.g., intersection information, vehicle information, road information, etc.), and/or other information.

In at least one embodiment, infotainment SoC 1630 may include any amount and type of GPU functionality. In at least one embodiment, infotainment SoC 1630 may communicate over bus 1602 (e.g., CAN bus, Ethernet, etc.) with other devices, systems, and/or components of vehicle 1600. In at least one embodiment, infotainment SoC 1630 may be coupled to a supervisory MCU such that GPU of infotainment system may perform some self-driving functions in event that primary controller(s) 1636 (e.g., primary and/or backup computers of vehicle 1600) fail. In at least one embodiment, infotainment SoC 1630 may put vehicle 1600 into a chauffeur to safe stop mode, as described herein.

In at least one embodiment, vehicle 1600 may further include instrument cluster 1632 (e.g., a digital dash, an electronic instrument cluster, a digital instrument panel, etc.). In at least one embodiment, instrument cluster 1632 may include, without limitation, a controller and/or supercomputer (e.g., a discrete controller or supercomputer). In at least one embodiment, instrument cluster 1632 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 1630 and instrument cluster 1632. In at least one embodiment, instrument cluster 1632 may be included as part of infotainment SoC 1630, or vice versa.

Inference and/or training logic are used to perform inferencing and/or training operations associated with one or more embodiments. Details regarding inference and/or training logic are provided herein. In at least one embodiment, inference and/or training logic may be used in system FIG. 16C for inferencing or predicting operations based, at least in part, on weight parameters calculated using neural network training operations, neural network functions and/or architectures, or neural network use cases described herein.

Such components can be used to generate synthetic data imitating failure cases in a network training process, which can help to improve performance of the network while limiting the amount of synthetic data to avoid overfitting.

Figure 16D:
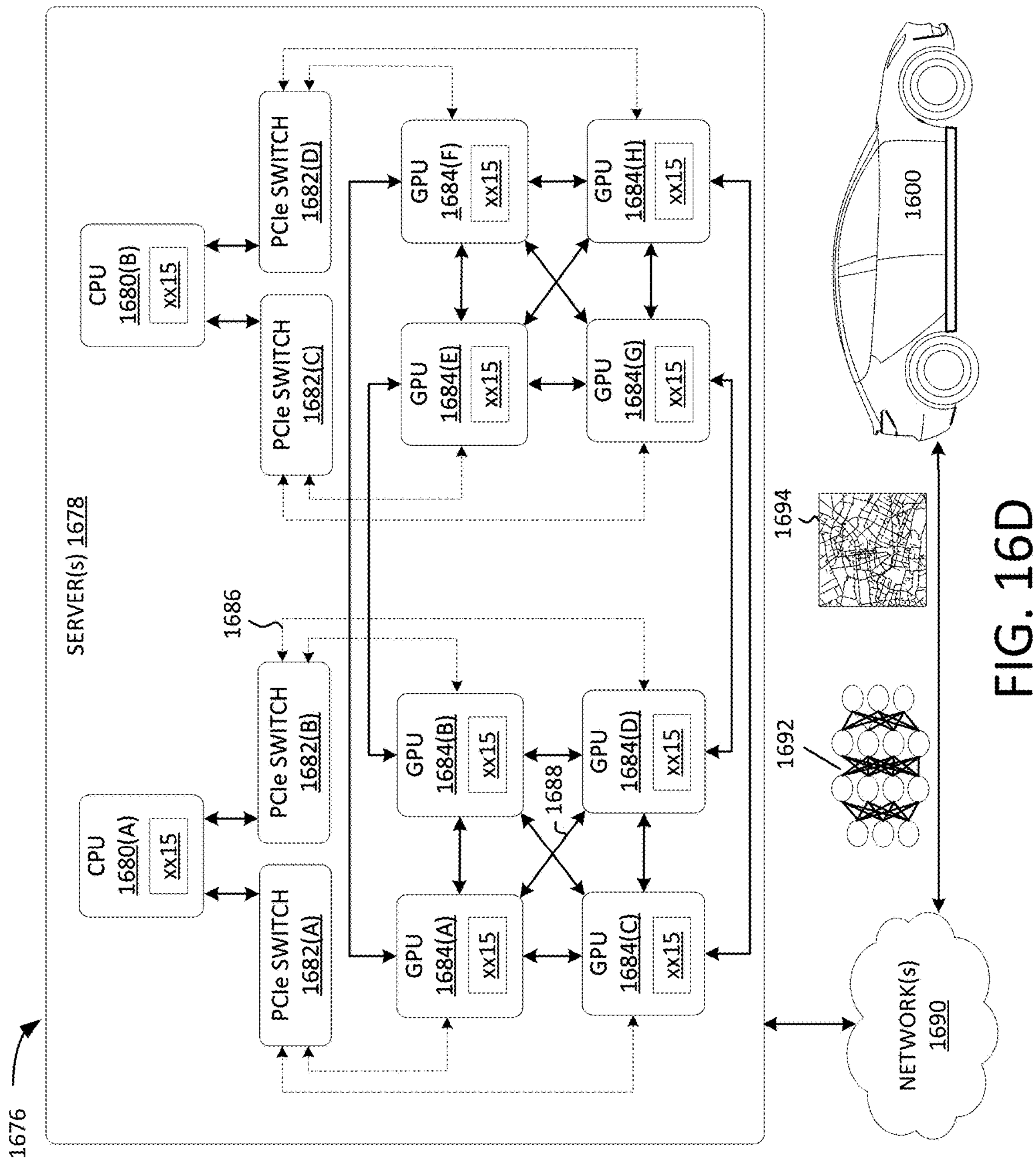
FIG. 16D illustrates a system for communication between cloud-based server(s) and the autonomous vehicle of FIG. 16A, according to at least one embodiment.

FIG. 16D is a diagram of a system 1676 for communication between cloud-based server(s) and autonomous vehicle 1600 of FIG. 16A, according to at least one embodiment. In at least one embodiment, system 1676 may include, without limitation, server(s) 1678, network(s) 1690, and any number and type of vehicles, including vehicle 1600. In at least one embodiment, server(s) 1678 may include, without limitation, a plurality of GPUs 1684(A)-1684(H) (collectively referred to herein as GPUs 1684), PCIe switches 1682(A)-1682(D) (collectively referred to herein as PCIe switches 1682), and/or CPUs 1680(A)-1680(B) (collectively referred to herein as CPUs 1680). GPUs 1684, CPUs 1680, and PCIe switches 1682 may be interconnected with high-speed interconnects such as, for example and without limitation, NVLink interfaces 1688 developed by NVIDIA and/or PCIe connections 1686. In at least one embodiment, GPUs 1684 are connected via an NVLink and/or NVSwitch SoC and GPUs 1684 and PCIe switches 1682 are connected via PCIe interconnects. In at least one embodiment, although eight GPUs 1684, two CPUs 1680, and four PCIe switches 1682 are illustrated, this is not intended to be limiting. In at least one embodiment, each of server(s) 1678 may include, without limitation, any number of GPUs 1684, CPUs 1680, and/or PCIe switches 1682, in any combination. For example, in at least one embodiment, server(s) 1678 could each include eight, sixteen, thirty-two, and/or more GPUs 1684.

In at least one embodiment, server(s) 1678 may receive, over network(s) 1690 and from vehicles, image data representative of images showing unexpected or changed road conditions, such as recently commenced roadwork. In at least one embodiment, server(s) 1678 may transmit, over network(s) 1690 and to vehicles, neural networks 1692, updated neural networks 1692, and/or map information 1694, including, without limitation, information regarding traffic and road conditions. In at least one embodiment, updates to map information 1694 may include, without limitation, updates for HD map 1622, such as information regarding construction sites, potholes, detours, flooding, and/or other obstructions. In at least one embodiment, neural networks 1692, updated neural networks 1692, and/or map information 1694 may have resulted from new training and/or experiences represented in data received from any number of vehicles in environment, and/or based at least in part on training performed at a data center (e.g., using server(s) 1678 and/or other servers).

In at least one embodiment, server(s) 1678 may be used to train machine learning models (e.g., neural networks)

based at least in part on training data. In at least one embodiment, training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 1690, and/or machine learning models may be used by server(s) 1678 to remotely monitor vehicles.

In at least one embodiment, server(s) 1678 may receive data from vehicles and apply data to up-to-date real-time neural networks for real-time intelligent inferencing. In at least one embodiment, server(s) 1678 may include deep-learning supercomputers and/or dedicated AI computers powered by GPU(s) 1684, such as a DGX and DGX Station machines developed by NVIDIA. However, in at least one embodiment, server(s) 1678 may include deep learning infrastructure that use CPU-powered data centers.

In at least one embodiment, deep-learning infrastructure of server(s) 1678 may be capable of fast, real-time inferencing, and may use that capability to evaluate and verify health of processors, software, and/or associated hardware in vehicle 1600. For example, in at least one embodiment, deep-learning infrastructure may receive periodic updates from vehicle 1600, such as a sequence of images and/or objects that vehicle 1600 has located in that sequence of images (e.g., via computer vision and/or other machine learning object classification techniques). In at least one embodiment, deep-learning infrastructure may run its own neural network to identify objects and compare them with objects identified by vehicle 1600 and, if results do not match and deep-learning infrastructure concludes that AI in vehicle 1600 is malfunctioning, then server(s) 1678 may transmit a signal to vehicle 1600 instructing a fail-safe computer of vehicle 1600 to assume control, notify passengers, and complete a safe parking maneuver.

In at least one embodiment, server(s) 1678 may include GPU(s) 1684 and one or more programmable inference accelerators (e.g., NVIDIA's TensorRT 3). In at least one embodiment, combination of GPU-powered servers and inference acceleration may make real-time responsiveness possible. In at least one embodiment, such as where performance is less critical, servers powered by CPUs, FPGAs, and other processors may be used for inferencing. In at least one embodiment, inference and/or training logic are used to perform one or more embodiments. Details regarding inference and/or training logic are provided elsewhere herein.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably as far as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

receiving a request for one or more virtual assets of a virtual asset data store to be included in a virtual scene, wherein the request comprises first characteristic data including one or more characteristics associated with the requested one or more virtual assets, and wherein at least a portion of the virtual assets of the virtual asset data store is associated with tags obtained from an output of an artificial intelligence (AI) model;

obtaining a set of tags for the requested one or more virtual assets based on the first characteristic data and second characteristic data indicating one or more characteristics associated with at least one additional virtual asset included in the virtual scene, wherein the set of tags comprises articulation data indicating one or more of a stationary state or a dynamic state of at least one component of a real-world object corresponding to the requested one or more virtual assets relative to another component of the real-world object;

determining, based on the tags associated with the virtual assets of the virtual data store, whether the virtual asset data store identifies a virtual asset that satisfies one or more criteria with respect to the obtained set of tags for the requested one or more virtual assets; and responsive to determining that the virtual asset data store identifies the virtual asset that satisfies the one or more criteria, providing the virtual asset for inclusion in the virtual scene in accordance with the request.

2. The method of claim 1, further comprising:

responsive to determining that the virtual asset data store does not identify a virtual asset associated with a set of tags that satisfies the one or more criteria, providing the first characteristic data to an asset generation engine to generate the virtual asset;

obtaining the generated virtual asset from the asset generation engine; and providing the generated virtual asset for inclusion in the virtual scene in accordance with the request.

3. The method of claim 2, wherein the asset generation engine comprises a generative AI model.

4. The method of claim 3, wherein one or more outputs of the generative AI model comprise a model file that, when executed, generates a rendering of an animation of the virtual asset according to the one or more of the stationary state or the dynamic state indicated by the articulation data of the obtained set of tags.

5. The method of claim 1, wherein obtaining the set of tags for the requested one or more virtual assets comprises:

providing at least one of the first characteristic data or the second characteristic data as input to the AI model, wherein the AI model is trained to predict one or more tags for a virtual asset based on given characteristic data;

obtaining one or more outputs of the AI model; and extracting at least one tag of the set of tags from the obtained one or more outputs.

6. The method of claim 5, further comprising:

providing articulation data associated with the requested one or more assets as an additional input to the AI model with the at least one of the first characteristic data or the second characteristic data.

7. The method of claim 1, wherein determining whether the virtual asset data store identifies a virtual asset that satisfies one or more criteria with respect to the obtained set of tags for the requested one or more virtual assets comprises:

identifying an entry of the virtual asset data store that corresponds to the virtual asset, wherein the identified entry comprises a set of tags associated with the virtual asset; and determining whether a degree of similarity between the set of tags associated with the virtual asset and the obtained set of tags for the requested one or more virtual assets exceeds a similarity threshold.

8. The method of claim 1, wherein the virtual asset provided for inclusion in the virtual scene comprises a three-dimensional (3D) asset.

9. The method of claim 1, wherein the request is received via an instance of an application running on a first client device connected to a platform and the virtual asset provided for inclusion in the virtual scene was created by a user via another instance of the application running on a second client device connected to the platform.

10. The method of claim 1, further comprising:

updating the virtual asset data store to include a mapping between the obtained set of tags and the virtual asset.

11. A system comprising:

a memory device; and a processing device coupled to the memory device, the processing device to perform operations comprising:

receiving a request for one or more virtual assets of a virtual asset data store to be included in a virtual scene, wherein the request comprises first characteristic data including one or more characteristics associated with the requested one or more virtual assets, and wherein at least a portion of the virtual assets of the virtual asset data store is associated with tags obtained from an output of an artificial intelligence (AI) model;

obtaining a set of tags for the requested one or more virtual assets based on the first characteristic data and second characteristic data indicating one or more characteristics associated with at least one additional virtual asset included in the virtual scene, wherein the set of tags comprises articulation data indicating one or more of a stationary state or a dynamic state of at least one component of a real-world object corresponding to the requested one or more virtual assets relative to another component of the real-world object;

determining, based on the tags associated with the virtual assets of the virtual data store, whether the virtual asset data store identifies a virtual asset that satisfies one or more criteria with respect to the obtained set of tags for the requested one or more virtual assets; and responsive to determining that the virtual asset data store identifies the virtual asset that satisfies the one or more criteria, providing the virtual asset for inclusion in the virtual scene in accordance with the request.

12. The system of claim 11, wherein the operations further comprise:

responsive to determining that the virtual asset data store does not identify a virtual asset associated with a set of tags that satisfies the one or more criteria, providing the first characteristic data to an asset generation engine to generate the virtual asset;

obtaining the generated virtual asset from the asset generation engine; and providing the generated virtual asset for inclusion in the virtual scene in accordance with the request.

13. The system of claim 12, wherein the asset generation engine comprises a generative AI model.

14. The system of claim 13, wherein one or more outputs of the generative AI model comprise a model file that, when executed, generates a rendering of an animation of the virtual asset according to the one or more of the stationary state or the dynamic state indicated by the articulation data of the obtained set of tags.

15. The system of claim 11, wherein obtaining the set of tags for the requested one or more virtual assets comprises:

providing at least one of the first characteristic data or the second characteristic data as input to the AI model, wherein the AI model is trained to predict one or more tags for a virtual asset based on given characteristic data;

obtaining one or more outputs of the AI model; and extracting at least one tag of the set of tags from the obtained one or more outputs.

16. The system of claim 15, wherein the operations further comprise:

providing articulation data associated with the requested one or more assets as an additional input to the AI model with the at least one of the first characteristic data or the second characteristic data.

17. The system of claim 11, wherein determining whether the virtual asset data store identifies a virtual asset that satisfies one or more criteria with respect to the obtained set of tags for the requested one or more virtual assets comprises:

identifying an entry of the virtual asset data store that corresponds to the virtual asset, wherein the identified entry comprises a set of tags associated with the virtual asset; and determining whether a degree of similarity between the set of tags associated with the virtual asset and the obtained set of tags for the requested one or more virtual assets exceeds a similarity threshold.

18. The system of claim 11, wherein the virtual asset provided for inclusion in the virtual scene comprises a three-dimensional (3D) asset.

19. The system of claim 11, wherein the operations further comprise:

updating the virtual asset data store to include a mapping between the obtained set of tags and the virtual asset.

20. A non-transitory computer readable storage medium comprising instructions for a server that, when executed by a processing device, cause the processing device to perform operations comprising:

receiving a request for one or more virtual assets of a virtual asset data store to be included in a virtual scene, wherein the request comprises first characteristic data including one or more characteristics associated with the requested one or more virtual assets, and wherein at least a portion of the virtual assets of the virtual asset data store is associated with tags obtained from an output of an artificial intelligence (AI) model;

obtaining a set of tags for the requested one or more virtual assets based on the first characteristic data and second characteristic data indicating one or more characteristics associated with at least one additional virtual asset included in the virtual scene, wherein the set of tags comprises articulation data indicating one or more of a stationary state or a dynamic state of at least one component of a real-world object corresponding to the requested one or more virtual assets relative to another component of the real-world object;

determining, based on the tags associated with the virtual assets of the virtual data store, whether the virtual asset data store identifies a virtual asset that satisfies one or more criteria with respect to the obtained set of tags for the requested one or more virtual assets; and responsive to determining that the virtual asset data store identifies the virtual asset that satisfies the one or more criteria, providing the virtual asset for inclusion in the virtual scene in accordance with the request.

* * * * *